US011010943B1

(12) United States Patent
Bajic

(10) Patent No.: US 11,010,943 B1
(45) Date of Patent: May 18, 2021

(54) METHOD AND SYSTEM FOR DIGITAL COLORING OR SEGMENTING OF MULTI-COLOR GRAPHICS

(71) Applicant: Ivan Bajic, San Diego, CA (US)

(72) Inventor: Ivan Bajic, San Diego, CA (US)

(*) Notice: Subject to any disclaimer, the term of this patent is extended or adjusted under 35 U.S.C. 154(b) by 0 days.

(21) Appl. No.: 17/126,057

(22) Filed: Dec. 18, 2020

(51) Int. Cl.

| G06T 11/00 | (2006.01) |
|---|---|
| G06T 11/40 | (2006.01) |
| G06T 13/80 | (2011.01) |
| G06T 7/11 | (2017.01) |
| G06T 7/90 | (2017.01) |
| G06K 9/46 | (2006.01) |
| G06T 7/136 | (2017.01) |

(52) U.S. Cl.
CPC ............ *G06T 11/40* (2013.01); *G06K 9/4652* (2013.01); *G06T 7/11* (2017.01); *G06T 7/136* (2017.01); *G06T 7/90* (2017.01); *G06T 11/001* (2013.01); *G06T 13/80* (2013.01); *G06T 2200/24* (2013.01)

(58) Field of Classification Search
CPC combination set(s) only.
See application file for complete search history.

(56) References Cited

U.S. PATENT DOCUMENTS

| 7,102,649 B2 | 9/2006 | Kotani et al. |
| 8,335,377 B2 | 12/2012 | Furukawa et al. |
| 9,153,052 B2 | 10/2015 | Ameline et al. |
| 2011/0175916 A1* | 7/2011 | Noris ................. G06K 9/00416 345/441 |
| 2013/0236091 A1* | 9/2013 | Ubillos .................... H04N 9/70 382/163 |
| 2015/0109323 A1* | 4/2015 | Johnson .................. G06T 11/60 345/594 |
| 2015/0235389 A1* | 8/2015 | Miller ................ G06Q 30/0627 345/594 |
| 2018/0047198 A1* | 2/2018 | Walters ................... G06T 19/00 |

OTHER PUBLICATIONS

GIMP Plugin Registry. "Multifill and Flatten" [online]. GIMP Plugin Registry, 2009 [retrieved on May 26, 2018]. Retrieved from the Internet: <URL: registry.gimp.org/node/13251>.

(Continued)

*Primary Examiner* — Wesner Sajous

(57) ABSTRACT

A method and system for digitally coloring, compositing, selecting, or segmenting, anti-aliased or grayscale or multi-color line art or graphics, uses a set of acquired "image points" with properties such as coordinates, color, "paint" and "flow" status, etc. According to preferred embodiments of the invention, "unpainted" and "painted" "image points" are acquired by a processing device, which iterates through an ordered set of "reference colors", in descending order. For each "reference color", the device determines "unpainted image points" for which: the point's color is "greater than or equal to" the current "reference color", except for "lesser flow" or "list" status, and: the point is "threshold adjacent" to a "painted image point". The point's status thus changes to "painted", and the point takes the color or "segment affiliation" of the "threshold adjacent" point, with optional prioritization. The user can adjust "image point" properties, e.g. when performing color flatting.

12 Claims, 41 Drawing Sheets

(56) References Cited

OTHER PUBLICATIONS

GIMP Plugin Registry. "Flatting Tools" [online]. GIMP Plugin Registry, 2009 [retrieved on May 26, 2018]. Retrieved from the Internet: <URL: registry.gimp.org/node/14051>.
Sykora et al. "LazyBrush: Flexible Painting Tool for Hand-drawn Cartoons". Computer Graphics Forum, v.28 n.2 (2009), pp. 599-608, Blackwell Publishing, UK and USA.
Smith, A.R. "Tint fill". ACM SIGGRAPH Computer Graphics, v.13 n.2, pp. 276-283, ACM, New York, NY, USA, 1979.
Fishkin, K.P. and Barsky, B.A. "A family of new algorithms for soft filling". ACM SIGGRAPH Computer Graphics, v.18 n.3, pp. 235-244, ACM, New York, NY, USA, 1984.
Stern, G. "SoftCel: an application of raster scan graphics to conventional cel animation". ACM SIGGRAPH Computer Graphics, v.13 n.2, pp. 284-288, ACM, New York, NY, USA, 1979.
Wallace, B. "Merging and transformation of raster images for cartoon animation". ACM SIGGRAPH Computer Graphics, v.15 n.3, pp. 253-262, ACM, New York, NY, USA, 1981.
Levoy, M. "Area Flooding Algorithms" [online]. SIGGRAPH 81 Two-Dimensional Computer Animation course notes. Web copy of 1981 document with 1982 corrections, web page last updated May 12, 2015 [retrieved on May 26, 2018]. Retrieved from the Internet: <URL: graphics.stanford.edu/papers/area-flooding-sig82course/area-flooding-sig82course.pdf>.
Porter, T. and Duff, T. "Compositing Digital Images". ACM SIGGRAPH Computer Graphics, v.18 n.3, pp. 253-259, ACM, New York, NY, USA, 1984.

* cited by examiner

--PRIOR ART--

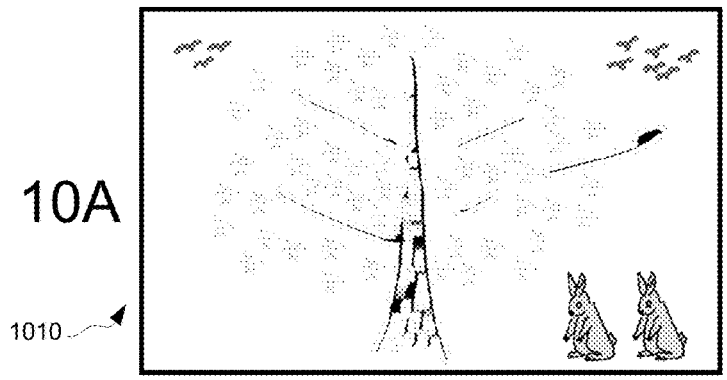
FIG. 10A
1010
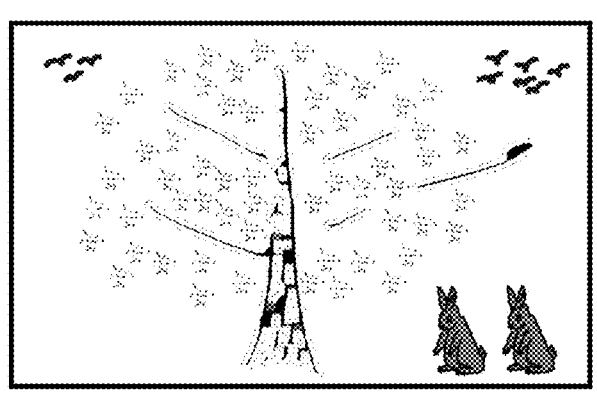
1013  FIG. 10B
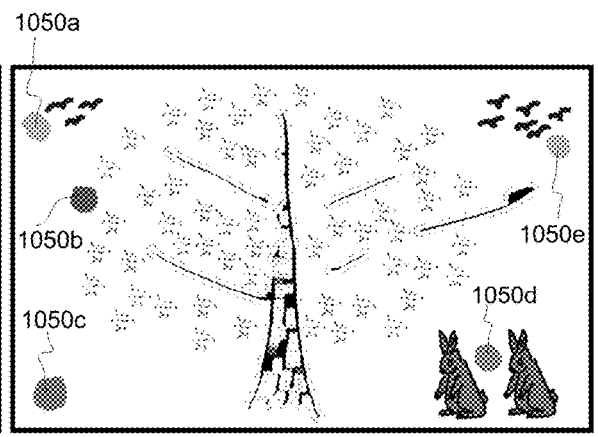
1020  FIG. 10C
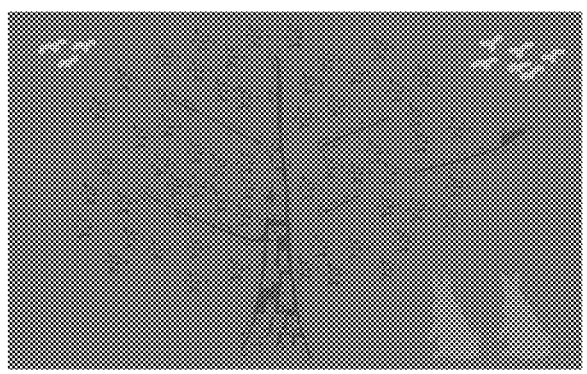
1030  FIG. 10D
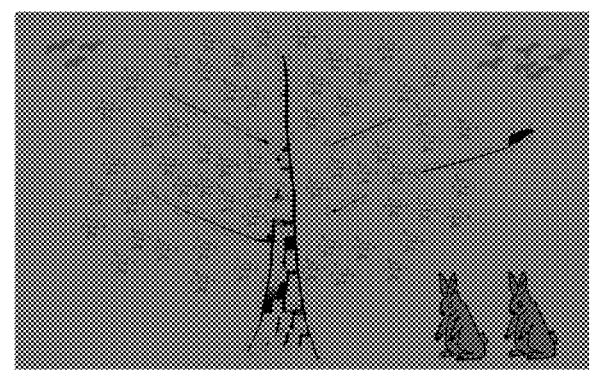
1021  FIG. 10E

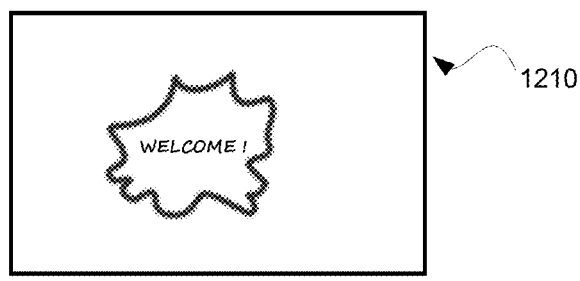
FIG. 12A
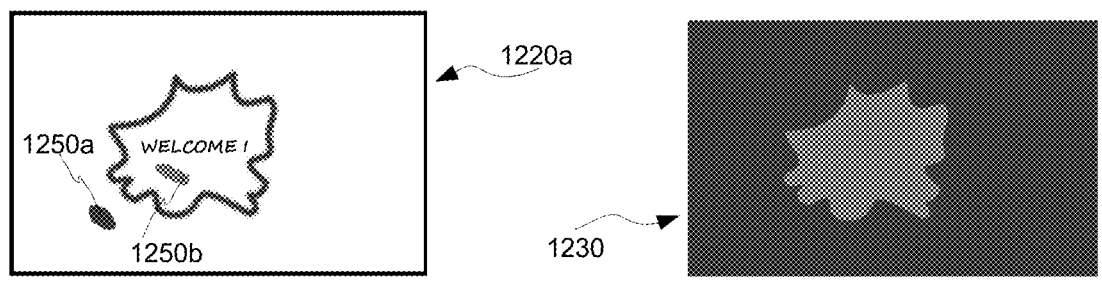
FIG. 12B
FIG. 12C
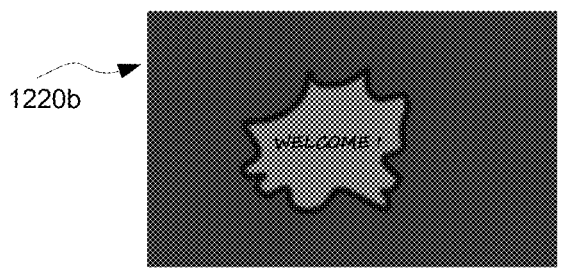
FIG. 12D
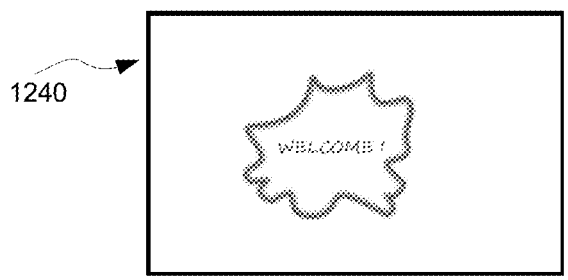
FIG. 12E

```
// "SNAP TO LINE ART" CURSOR EFFECT, CODE/PSEUDOCODE.
// IN:    x,y = the UPB cursor's coordinates, or the UPB's reference
//              coordinates in general.
//              For example, the user clicks using a UPB's
//              GUI cursor, at coordinates x,y.
// OUT:   xx,yy = the new reference coordinates for the UPB's effect,
//              shifted to "darker" (or, lower index) pixels
//              [or shifted to "lighter" (or, higher index) pixels].

// This example assumes the two UPB "assumptions" shown in FIG. 37.
// This sample code assumes the line art layer is grayscale, or
//     multicolor, with the grayscale colors or color index from
//     BASE (ex, 0, or -10, or etc.) to TOP (ex, 255, or etc.)

double weights[ 0..(TOP-BASE) ]   //or: pre-set array, don't recalc here
for i = BASE to TOP
{
    int new_ix = i - BASE;
    double weight_of_color_i = pow(TOP-BASE+1-new_ix, 3);
    //or: pow(new_ix+1, 3), to weight to "lighter"/higher colors.
    //or: can use a different calculation or different weighting.
    weights[ new_ix ] = weight_of_color_i;
} int x = getCursorX( );   int y = getCursorY( );
double calcx=0, calcy=0
double sumw = 0
for each coordinate pair tx,ty
{
    if coord tx,ty is not on the "graphic", skip it.
    int getc = LineArtLayer.getColor(tx,ty)
    int gc = the grayscale number, or
              the color index, for the color getc
    double T = weights[ gc - BASE ]
    sumw = sumw + T
    calcx = calcx + (tx - x) * T
    calcy = calcy + (ty - y) * T
} if (sumw != 0) {calcx = calcx/sumw;   calcy = calcy/sumw;} int xx = round(calcx + x);   int yy = round(calcy + y);

//Especially if sumw != 0 :
//Now, put or apply the UPB (for example, its center or reference point)
//at the new, shifted reference coordinates (xx,yy),
//not necessarily at the cursor's/reference's literal coordinates (x,y).
```

FIG. 36

```
// "SNAP TO LINE ART" CURSOR EFFECT, CODE/PSEUDOCODE.
// IN:    x,y = the UPB cursor's coordinates, or the UPB's reference
//             coordinates in general.
//             For example, the user clicks using a UPB's
//             GUI cursor, at coordinates x,y.
// OUT:   xx,yy = the new reference coordinates for the UPB's effect,
//             shifted to darker pixels [or to lighter pixels].

// This example assumes the preferred mode that the UPB extends
//     around its reference location, with a shape and size
//     preferably chosen by the user.
// This example assumes the UPB's "analysis region" is at and/or
//     around the cursor/reference location (x,y), as a collection of
//     one or more coordinate pairs (tx,ty).
// This sample code assumes the line art layer is grayscale,
//     with grayscale colors 0-255.

// NOTE: To weight to lighter pixels instead of darker pixels, replace
//     the "256-gsc" with "1+gsc".
// NOTE: Current weighting uses a power of 3, but user can change it to
//     a power of 2, or 1, or larger, based on the amount of effect
//     desired, such as for less or more weighting for the
//     darker pixels.

double powers[0..256]  //or: pre-set array, don't need to recalc it here
for i = 0 to 256
    { powers[ i ] = ( i * i * i ) }
    //or, can change this, to a different weight calculation int x = getCursorX( );   int y = getCursorY( );
double calcx=0, calcy=0
double sumw = 0
for each coordinate pair tx,ty
{
    if coord tx,ty is not on the "graphic", skip it.
    int gsc = LineArtLayer.getColor(tx,ty)
    int g = 256 - gsc    //or, 1+gsc, to weight to lighter colors.
    double T = powers[ g ]
    sumw = sumw + T
    calcx = calcx + (tx - x) * T
    calcy = calcy + (ty - y) * T
} if (sumw != 0) {calcx = calcx/sumw;   calcy = calcy/sumw;} int xx = round( calcx + x );   int yy = round( calcy + y )

//Especially if sumw != 0 :
//Now, put or apply the UPB (for example, its center or reference point)
//at the new, shifted reference coordinates (xx,yy),
//not necessarily at the cursor's/reference's literal coordinates (x,y).
```

FIG. 37

```
// "SNAP TO LINE ART" CURSOR EFFECT, CODE/PSEUDOCODE.
// IN:    x,y = the UPB cursor's coordinates, or the UPB's reference
//              coordinates in general.
//              For example, the user clicks using a UPB's
//              GUI cursor, at coordinates x,y.
// OUT:   xx,yy = the new reference coordinates for the UPB's effect,
//              shifted to darker pixels [or to lighter pixels].

// This example assumes the two UPB "assumptions" shown in FIG. 37.
// This sample code assumes the line art layer is grayscale,
//      with grayscale colors 0-255.

double powers[0..256]  //or: pre-set array, don't need to recalc it here
for i = 0 to 256
    { powers[ i ] = ( i * i * i ) }
    //or, can change this, to a different weight calculation int x = getCursorX( );   int y = getCursorY( );

int mini = 999;   int maxi = -999;
for each coordinate pair tx,ty
{
    if coord tx,ty is not on the "graphic", skip it.
    int gsc = LineArtLayer.getColor(tx,ty)
    if (gsc < mini) mini = gsc
    if (gsc > maxi) maxi = gsc
}
if (mini == 999), STOP.

double calcx=0, calcy=0
double sumw = 0
double scale = 1
if (maxi > mini), scale = 255.0 / (maxi - mini)
for each coordinate pair tx,ty
{
    if coord tx,ty is not on the "graphic", skip it.
    int gsc = LineArtLayer.getColor(tx,ty)
    gsc = (int)( (gsc - mini) * scale );
    int g = 256 - gsc    //or, 1+gsc, to weight to lighter colors.
    double T = powers[ g ]
    sumw = sumw + T
    calcx = calcx + (tx - x) * T
    calcy = calcy + (ty - y) * T
}
calcx = calcx/sumw;   calcy = calcy/sumw;
int xx = round( calcx + x );   int yy = round( calcy + y );

//Now, put or apply the UPB (for example, its center or reference point)
//at the new, shifted reference coordinates (xx,yy),
//not necessarily at the cursor's/reference's literal coordinates (x,y).
```

FIG. 38

```
// "SNAP TO LINE ART" CURSOR EFFECT, CODE/PSEUDOCODE.
// IN:    x,y = the UPB cursor's coordinates, or the UPB's reference
//              coordinates in general.
//              For example, the user clicks using a UPB's
//              GUI cursor, at coordinates x,y.
// OUT:   xx,yy = the new reference coordinates for the UPB's effect,
//              shifted to nearest darkest [or nearest lightest] pixel.

// This example assumes the two UPB "assumptions" shown in FIG. 37.
// This sample code assumes the line art layer is grayscale,
//      with grayscale colors 0-255.

int x = getCursorX( );   int y = getCursorY( );

int min_gsc = 999
int mindistc = 999999
int newx = -1;  int newy = -1;
for each coordinate pair tx,ty
{
    if coord tx,ty is not on the "graphic", skip it.
    int gsc = LineArtLayer.getColor(tx,ty)   //re nearest darkest pixel
    // or, to shift to nearest lightest pixel, use:
    // int gsc = 255 - LineArtLayer.getColor(tx,ty)

if ( gsc < min_gsc )
    {
        mindistc = (tx - x)*(tx - x) + (ty - y)*(ty - y)
        min_gsc = gsc; newx=tx; newy=ty;
    }
    else if ( gsc == min_gsc )
    {
        int currdistc = (tx - x)*(tx - x) + (ty - y)*(ty - y)
        if ( currdistc < mindistc )
            { newx=tx; newy=ty; mindistc=currdistc; }
    }
} if (min_gsc == 999), STOP.

int xx = newx;   int yy = newy;

//Now, put or apply the UPB (for example, its center or reference point)
//at the new, shifted reference coordinates (xx,yy),
//not necessarily at the cursor's/reference's literal coordinates (x,y).
```

METHOD AND SYSTEM FOR DIGITAL COLORING OR SEGMENTING OF MULTI-COLOR GRAPHICS

COPYRIGHT AUTHORIZATION

Copyright authorization statement according to 37 CFR 1.71: A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

It is further noted that all content contained in the Figures (including photographs and paintings) are created and owned by the Inventor; the Inventor thus has full rights to include the content in the Figures.

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A COMPUTER PROGRAM LISTING APPENDIX

Not Applicable.

BACKGROUND OF THE INVENTION

1. Field of the Invention

The present invention, as claimed, relates generally to computer-assisted coloring of digital graphics, and more particularly, to a method and system for computer-assisted coloring (including colorizing and/or flatting and/or texturing and/or gradienting), trapping or spreading, segmenting or selecting, or compositing, of multi-color (including anti-aliased or grayscale or black-and-white or two-color) line art, comics, animation, art, digital art or graphics, or digitally-scanned art or graphics, or digital data.

2. Description of Related Art, Part 1

In the fields of computer-based and digitally-based coloring of art and graphics (including comics, animation, and digital art in general), there has for decades been a need for computer-assisted coloring of anti-aliased line art and graphics (and more broadly, grayscale or multi-color line art and graphics), and there has in particular been a need for methods that are efficient, intuitive, and easy-to-use. In addition, there has similarly been a need for efficient, intuitive, and easy-to-use methods for coloring pure black-and-white (or more broadly, two-color) line art and graphics.

The digital coloring of "aliased" (also known as "non-antialiased" or "un-antialiased") line art and graphics (for example, pure black-and-white "bitmap" graphics, or graphics with distinct colors that result in "jaggy" and "stair-step" sharp edges) is, in current practice, laborious but generally easier to implement than the digital coloring of "anti-aliased" line art and graphics. Furthermore, the digital coloring of "anti-aliased" line art and graphics (for example, grayscale graphics, or graphics with gradations in colors that intentionally create an illusion of smooth lines and edges) has long posed a particularly difficult problem.

For artists who want to digitally color (or segment) line art or graphics, current approaches typically fall into a few categories: #1) soft fills, including tint fills, for flood-filling an anti-aliased-surrounded region (such as for cartoon-style animation frames), and which are sometimes based on the blending of colors, and with a limitation that they can not accomplish comics-style center-line trapping/spreading except in certain limited cases (such as for line art with a thin and darker zone in the precise center of each line, which is particularly not the case for the pure black-and-white line art common in the print-comics industry), and with a limitation that complex line art such as checkers or cross-hatching or text lettering can not be colored in bulk (because soft fills, as they were popularly implemented in industry and animation, fill a current region then stop when a lighter-colored boundary is encountered, similar to bucket fills or boundary fills and with the same limitations), and with a limitation that rippling or color fluctuations or mottles in the art or line art similarly causes an early halt to the coloring (which in particular is inapplicable to print-comics coloring, which requires full coloring of the pages, such as for trapping/spreading or "rich black" undercoloring), and with a limitation that (as commonly implemented in animation coloring systems in the background art) gaps in the line art must be plugged by the user by careful pixel editing prior to applying the soft fill; #2) software for coloring (sometimes alternatively referred to as "colorizing") of grayscale photographic images, but not necessarily applicable to line art; #3) software and "apps" for coloring "electronic coloring books", but limited to pure black-and-white line art, and limited to simple "bucket fills" for flood filling regions; #4) software and "apps" for coloring anti-aliased line art, but limited to simple "bucket fills" (or more recently, "threshold bucket fills", which ignore small gaps in the line art, such as by specifying a gap size, but with a limitation that the same threshold is applied to each gap around a region), and requiring the laborious "lasso-the-centers-of-lines" technique or the inaccurate "increase selection size" technique when comics-style coloring and trapping/spreading is desired; #5) software for coloring or "bucket filling" line art or animation, but applied only to vector graphics, not raster graphics and not photographs; #6) software for assisted coloring/flatting or trapping/spreading of comics line art, but applied only to pure black-and-white "aliased" line art and with a further limitation of not allowing user-selected colors for the items, and with a further limitation such that the interior spaces of complex line art details or the interior spaces of the "lettering" (for example, the lettering in "speech (or text) balloons") are unintentionally colored differently unless the artist first laboriously erases the complex details, or the lettering, prior to running the software; #7) software for assisted coloring or trapping/spreading of "anti-aliased" or grayscale comics and animation art or line art, but based on computational optimization of a complex function, which is sometimes non-intuitive or unpredictable for users (for example, regions or subregions might get colored or uncolored unexpectedly, or the gaps in U-shaped objects might get skipped, or low-contrast line art might get colored or skipped in unexpected ways, or multiple colors in a contiguous region (such as colors for highlights and/or shadows) might join in unpredictable ways or might get skipped), and sometimes difficult to implement as software due to the complexity, and sometimes insufficient for flatting/trapping such as for CMYK-printed comics (for example, in certain modes, sometimes causing colorfills to join at the extreme edges of a line, rather than in the center, or causing a colorfill to produce color fringes in a nearby region); #8) software for assisted coloring or segmenting of comics line art, where the coloring is intended for pattern regions, and where a computational approach is used for filling, but which is limited to black-and-white line art, and with a limitation that line art is sometimes incompletely filled; #9) steps for coloring/flatting and trapping/spreading pure black-and-white (or two-color) "aliased" line art, and with a limitation that in certain cases large numbers of small areas or mottles must be re-colored by the user, and with a limitation that the process is generally slow and laborious: first the user applies random-color or semi-random-color bucket-filling software or scripts to automatically bucket-fill each white region, and then afterward, repeatedly runs a built-in "distorts" filter or built-in "dilate" filter to extend the colors into the black line art (in the first case, selecting and deleting the black line art to turn it transparent, then running the built-in "distorts" filter (which is built in to some graphics-editing software products) to slightly extend the colored pixels into the transparent areas, then repeating the "distorts" filter until the colors join and thereby produce the flatted/trapped result; in the second case, repeating the "dilate" filter (with certain specific settings) until it extends the colored pixels into the black line art); #10) steps for coloring/flatting and trapping/spreading line art, using an "increase selection size" technique, typically for pure black-and-white line art for comics, and with the limitation that this will not properly flat/trap colors when the line art's lines are of irregular or differing thicknesses: the user "bucket fills" enclosed line art regions by using custom-selected colors (rather than random colors), then selects a colored region, then increases the size of the aliased selection by a couple of pixels; and #11) the approach presently preferred and used by professionals in the comics industry, for both aliased line art and anti-aliased line art: laborious, manual selection of items and manual bucket filling of these "aliased" selections, particularly by using the "lasso-the-centers-of-lines" technique for coloring/flatting and/or for trapping/spreading.

In the most common workflow used by comics professionals, color is only applied to pure black-and-white "aliased" line art, and furthermore is applied using a laborious, brute-force approach. In this common workflow, the pure black-and-white "aliased" line art is either produced digitally, or scanned digitally in pure black-and-white "bitmap" mode, or scanned digitally and then "thresholded" into pure black-and-white "bitmap" graphics. (This approach of course discards the lighter lines in the scanned art, and in general rejects the notion of processing art that contains grays, or gradations in color, or anti-aliasing, etc.) Specifically, these artists use their graphics-editing software's "lasso" tool (or its pixel-editing tool) to laboriously outline an element or region they want to color, and then "bucket fill" (typically on a layer different from the line art layer, i.e. on a "flats layer") the "aliased" lassoed selection, and then repeat this process for each item or region they want to color. The lassoing of items or regions is rather difficult, particularly for inexperienced artists, since these "flatters" (or "flats artists") typically use a workflow based on the fact that print comics are often produced using printing presses for which "misregistration" of the color plates is common (that is, a slight shifting in the different colors of the press). Specifically, the "flatters" do what is known in the comics industry as "trapping" (or "spreading") their colors. That is, when dragging the lasso tool, they ensure that they carefully and manually drag it in the centers of the art's lines, or as near to the centers of the art's lines as is possible for the artists, for each item they want to color. This is generally a tedious and laborious process.

(It should be noted that the terms "trapping" and "spreading" are each technical terms in the printing industry, but among comics artists these terms typically are synonymous and refer to the process of coloring line art (typically, on a colored "flats layer" rather than on the "line art layer") such that the adjacent colors touch, and furthermore touch directly underneath the black lines of the line art, preferably as near as possible to the centers of the lines. It should be further noted that some comics artists use and intend the term "flatting" as including the comics color "trapping/spreading" step.)

(It should be further noted that the "trapping" feature of some off-the-shelf graphics-editing software products is based on the printing industry definition, rather than on the more specific, comics industry definition.)

(It should be further noted that the "flatten" feature of common graphics-editing software products refers to stacking and combining layers into a single layer, in a process typically referred to as "flattening", and is completely different from the comics term "flatting".)

In a typical comics industry workflow, when the flatter artists apply color to the "flats layer" using the standard (and usually laborious) lasso-and-bucket-fill technique, they either lasso-and-fill each item, or else first lasso-and-fill larger regions then progress to lasso-and-fill increasingly narrower regions, often starting with regions representing distant objects and progressing to regions representing nearer objects. The latter is a flatting style that is sometimes referred to as "back-to-front flatting" in the comics industry. For completeness of discussion, the typical industry-standard approaches for combining the colored "flats layer (or layers)" with the "line art layer" will now be summarized. One approach is to set the "line art layer" to "Multiply mode", which then allows the colored "flats layer" to show underneath; and a second approach is to delete the white portions of a pure black-and-white, aliased "line art layer", which then similarly allows the colored "flats layer" to show underneath.

3. Description of Related Art, Part 2

In brief, there is a widespread need for a method and system for coloring, flatting, trapping, selecting, and/or segmenting, anti-aliased and/or grayscale and/or multi-color line art and digital graphics. Similarly, there is a widespread need for efficient, intuitive, and easy-to-use methods for doing such tasks on pure black-and-white (or two-color, in general) line art and digital graphics. It would, furthermore, be useful to be able to composite graphics with such techniques.

In particular, in either case (whether multi-color or two-color graphics), there is a need for something which: is intuitive, is easy to use and flexible, is fast and efficient or reasonably fast and efficient, allows intuitive control regarding coloring at the locations of gaps and discontinuities in the line art, and can easily and intuitively color complex line art and graphics (including for example cross-hatching or halftone patterns or "speech (or text) balloons" or spikes or mottled regions or patterned regions), and can easily and intuitively accommodate different flatting styles (for example, "back-to-front"-style flatting, and for example, what is herein referred to as "coloring-book"-style flatting, and what is herein referred to as "bucket-fill clean-up"-style flatting).

Thus, being able to color or flat or trap or segment such difficult art, would permit workflows that consist of more complex line art (particularly for digitally-distributed graphics such as numerous comics and animations, since these digitally-distributed works typically use wider-gamut RGB-based color systems rather than CMYK printing), and in addition, flatters and animators (and artists in general) would be able to more easily, quickly, and efficiently produce their work. For example, they would be able to easily color raster graphics, which are graphics that allow complex mottles, grain, and color nuances in the art and photographs, but which historically are difficult to color.

Furthermore, it would be beneficial for artists to be able to color or flat or trap or segment a region or item (particularly an anti-aliased region or item) by quickly and roughly circling/encircling or outlining it, rather than by carefully and laboriously dragging a "lasso" tool through the centers of the art's lines.

Furthermore, for the case of thin anti-aliased lines, it would be beneficial for an artist to be able to easily and intuitively produce results with computational accuracy and precision. The process is too tedious and/or imprecise when an artist tries to "lasso" such difficult lines, particularly when there are large numbers of such lines.

Furthermore, allowing rough encircling/outlining/selecting would permit easy item-selection or region-selection, in general, such as when using phones and similar touch-screen electronic devices, tablets, etc.

Furthermore, by allowing rough encircling/outlining of items or regions, the coloring or flatting or trapping or selecting or segmenting of line art or graphics could be easily accomplished on coarse-touch products (such as touch-screen electronics products), or with coarse-touch or semi-coarse-touch tools (such as computer mice).

Furthermore, allowing such rough encircling/outlining/selecting would for example offer a particularly useful capability for "art coloring" software (including phone and tablet "apps", such as for "electronic coloring books"), especially of the type intended for youngsters, since youngsters might be more inclined to use coloring software if it were to allow flexible or rough outlining, and if it were to offer more than simple "bucket fills" for region coloring. (Alternatively, the electronic coloring book creators or "art coloring" creators could benefit from an easy-segmentation technique for segmenting the parts of complex line art, which would then allow users to simply bucket-fill the pre-segmented color zones of the complex line art.)

Furthermore, "art coloring" software and apps would benefit from a capability of facilitated coloring of complex art—for example, art that includes complex cross-hatching or half-toning or anti-aliasing or grayscale shading, etc. (In contrast, typical "art coloring" software applications and apps for youngsters generally use line art that is sparse and simple, and general "art coloring" software and apps typically rely on bucket fills for region coloring.) Furthermore, allowing anti-aliased and/or grayscale line art and graphics for "electronic coloring book" software and apps, is something that would facilitate the user's coloring of photographs of line art or photographic images—such as the user's personally-photographed line art or photographic images. Furthermore, it would be useful if the software and apps were able to quickly and easily flat and trap such photographed art, rather than rely on the difficult "lasso-the-center-of-lines" or "increase-selection-size" techniques.

Furthermore, it would be beneficial to allow a "jump" capability that would permit segmentation (such as, for grouping or joining) of contiguous or non-contiguous items or regions, including in the context of AI, or such as for joining contiguous or non-contiguous (including partially obscured) regions as part of AI or machine processing.

Furthermore, allowing a "jump" capability would allow easy coloring of tangles, strands, etc., and would allow easy coloring of disjoint characters or elements.

Furthermore, it would be useful for artists to be able to color items, including disjoint or non-contiguous items or multiple comics characters, by simply putting a color near, not on or in, the item or the multiple items.

Furthermore, by allowing quick and easy coloring, flatting, and trapping of irregularly-shaped items, artists would be able to freely use more complex shapes for "speech/text balloons" and comics panels, such as for artistic effects and setting mood, and without slowing the flatting and/or trapping phase of the production process.

Furthermore, it would be beneficial to allow intuitive control in the presence of gaps and discontinuities in line art—for example, to let the user intuitively control the skipping or not skipping of particular gaps while coloring, or to let the user control how much color leaking is permitted in certain gaps. For example, the user may want some "small" gaps in the line art to counter-intuitively allow colors to "leak" across the gap, while some "large" gaps counter-intuitively act as walls or barriers that "halt or block" the fill colors from leaking across the gap.

Furthermore, it would be beneficial to not require artists to scan art at large sizes or high resolutions. Large scans use lots of computer RAM and disk space, and some computers can not handle graphics that are too large, and such RAM and disk resources are sometimes limited on mobile electronics products. Furthermore, it would be beneficial to allow artists to color or color/flat/trap small graphics—for example, artists who create web comics and typically need to produce work at 72 ppi (or 96 ppi), or animators who typically produce digital work at standard or somewhat small sizes, rather than the large 600 ppi (or 1200 ppi) line art resolutions and sizes typical in the print comics industry.

In particular, it would be beneficial to allow anti-aliased text and fine lines, especially considering the fact that small-sized graphics (such as web comics) rely on anti-aliasing in order for the text and lines to appear smooth rather than "jaggy" or "blocky". In particular, it would be beneficial for web comics artists to not be required to first scan their art into large, black-and-white "aliased" bitmap graphics. Instead, it would be beneficial if they could color web-sized comics directly, if desired, and furthermore it would be beneficial if they could retain any desired anti-aliasing in their smaller-sized line art. This would similarly apply to cases where an artist has only a small-sized original graphics file to work from, rather than a large scan.

Furthermore, it would be useful for artists to be able to quickly and easily color or color/flat/trap pencil scans, extremely thin grayscale lines, grayscale guiding lines, etc.—capabilities which are historically associated with manual and/or computational complexity.

BRIEF SUMMARY OF THE INVENTION

1. Features of the Invention

The prior section discussed some limitations of the background art's approaches, for artists who want to digitally color line art and graphics.

In brief, as discussed earlier, there is a widespread need for a method and system for coloring, flatting, trapping, selecting, and/or segmenting, anti-aliased and/or grayscale and/or multi-color line art and digital graphics, and in addition there is a need for an efficient, intuitive, and easy-to-use approach for tackling such problems on pure black-and-white (or two-color, in general) line art and digital graphics.

In particular, there is a need for something that tackles the problems, and accomplishes the goals, discussed in the prior section. The present inventions accomplish these goals, and furthermore tackle the problems and limitations in the background art, and furthermore offer extra features and added benefits, as will be discussed in this section and later sections.

The extra features include the following.

In certain cases, particularly if there are light-colored and/or anti-aliased lines in an area, it would be beneficial if the user could easily select which colors should get "priority" during the coloring of the lines and the line art, for example for: #1) regularity and uniformity of results, or for #2) special effects such as "checkerboard patterns", where the colors that fill the checkerboard's "reference/guiding lines" should be aligned and uniform and should touch perfectly in the corners without any gaps or irregularities caused by the line art's reference/guiding lines. This is a particularly important capability if the reference/guiding lines are not intended as part of the final product. The present inventions are able to accomplish these goals. In brief, the present inventions allow easy selection of color "priorities", such as for uniformity or for special effects (such as checkerboard patterns, or line-less final art, or guiding-line-less final art).

In addition, the present inventions allow the user to select items or regions by circling the cursor or brush near the lines—the user does not need to circle within the centers of the lines. Furthermore, when using "coloring-book"-style coloring or flatting, the user can in some cases simply put a "color blob" (for coloring an area) near an item or a group of disjoint items, rather than putting the "color blob" within the items or within each of the items in a group.

Furthermore, coloring anti-aliased items or regions can be used to segment or to select such anti-aliased items or regions, for example in complex line art or graphics.

Also, the present document discloses and discusses different "flow rules", for better results when coloring complex art or graphics. For example, the "flow rules" can be used to produce smooth "joins" between such complex regions, such as in the case of large regions of lighter and darker colors. (This topic is discussed in detail in different sections of the present document.)

2. Brief Summary, Part 1

Herein-disclosed methods start with the acquisition of a set of "image points", each with a "paint status" of either "unpainted image point" or "painted image point"—i.e., "unpainted" or "painted"—and then produce a set of "image points" with color and/or segment data representing a coloring, or flatting, or trapping, or selection, or segmentation, of the inputted data.

In addition, a GUI-based "Unpainted-Status Brush Tool" ("UPB") and "Painted-Status Brush Tool" ("PB"), disclosed herein, can be used to facilitate a user's work.

In addition, a "Snap to Line Art" effect/method, disclosed herein, can be used to quickly and easily position the "UPB and PB" tools—or, to position "lasso" points, or selection points in general.

3. Brief Summary, Part 2

The following summary—of the invention as claimed—will discuss exemplary embodiments of a method and system for digitally coloring, flatting, trapping, selecting, or segmenting, anti-aliased or grayscale or multi-color or two-color line art or graphics.

A method and system for digitally coloring, flatting, trapping, selecting, or segmenting anti-aliased or grayscale or multi-color or two-color line art or graphics, uses a set of acquired "image points", each with properties such as "coordinates" or "coordinate", "color", "segment affiliation", "priority", "paint status", and "flow status". According to a preferred embodiment of the invention, a set of "image points" with paint statuses of "unpainted image point" or "painted image point"—i.e., "unpainted" or "painted"—is acquired, by a processing device or a computer memory, and the processing device or a processor iterates through a user-selected or computer-selected ordered set of "reference colors", in descending order. For each "reference color" in the "iteration", the processing device determines a set consisting of all, or some, of the "unpainted image points" for which: the "unpainted image point's" color is greater than or equal to the current "reference color", according to a user-selected or computer-selected color ordering, or is less than the current "reference color" in the case of a status of "lesser flow" or in the case that the color is in a "color flow list", and for which: the "unpainted image point" is "threshold adjacent", within a chosen tolerance, to a "painted image point". If such conditions are met, the "unpainted image point's" status is changed to that of a "painted image point", and the "unpainted image point" takes on (or, takes on a function of) the color or segment affiliation or a property or properties of the threshold-adjacent "painted image point" (with the original color of the "unpainted image point" possibly being retained, such as for later use or processing), with optional user-selectable prioritization if there are multiple such adjacent "painted image points". According to a preferred embodiment, the user can adjust the "image point" properties (such as "paint status", "flow status", "color", "segment affiliation", etc.) as desired—for example, for performing "back-to-front"-style flatting.

In a preferred embodiment for grayscale or anti-aliased grayscale line art or graphics, the "reference colors" are grayscale colors, and the "iteration" proceeds from lighter to darker grayscale colors. In a preferred embodiment for complex grayscale or anti-aliased grayscale line art or graphics, one iteration proceeds from lighter to darker grayscale colors, while an additional iteration proceeds (simultaneously, semi-simultaneously, or sequentially) from darker to lighter grayscale colors. Or, for efficiency, herein-disclosed (and discussed in the next couple paragraphs) "standard flow" image points and "opposite flow" image points can be used.

The image point properties of "coordinates" or "coordinate", "color", and "segment affiliation", are generally self-explanatory, but are defined in a later section of this document. The image point property of "paint status" is, in a preferred embodiment, either "unpainted image point" or "painted image point"—or, in brief, either "unpainted" or "painted".

The image point property of "flow status" (discussed in detail in different sections of the present document), in a preferred embodiment, represents how colors and/or "segment affiliations" spread from "painted image points" to "unpainted image points". A "standard flow" status, means that an "unpainted image point" can be changed when its color is "equal to" the current "reference color" in the iteration, and/or when its color is "greater than" the current "reference color" in the iteration, according to user-selected or computer-selected color orderings. A flow status of "lesser flow" means that an "unpainted image point" can be changed in the case that its color is "less than" the current "reference color" in an iteration, according to a user-selected or computer-selected color ordering. A flow status of "fixed flow" means that a "painted image point" does not flow its color or segment affiliation to "unpainted image points". A flow status of "opposite flow" is a type of "lesser flow", and is designed for efficiency. That is, in brief, the color ordering is treated as if it is the opposite ordering, as compared to "standard flow". A flow status either of "multi-flow" or of "multi-multi-flow" (each discussed herein), is a combination of "standard flow" and "lesser flow", and produces powerful coloring results for complex line art or graphics.

In a preferred embodiment for coloring/flatting/trapping for print production, "threshold adjacency" is defined as common 4-adjacent pixel adjacency, or as common 8-adjacent pixel adjacency, or as "nearest painted image point". In an exemplary embodiment for digitally-produced and digitally-distributed animation, comics, graphics, etc., for which accurate flatting/trapping is not strictly necessary, the painting of "unpainted image points" can be sped up with broad "flood fills" following, or replacing, the painting of an "unpainted image point", in contrast to the strict pixel-adjacency criteria.

The image point property of "priority" (or "color priority" or "segment priority") is optional, and in particular can be used when the user wants smoother flatting/trapping "color joins" (between adjacent regions) in complex areas, or along line art "spikes", or etc., and can be used when the user wants to create "checkerboard"-style patterns whose squares or elements join accurately.

The herein-disclosed inventions allow different types of "flatting" styles, including the popular "back-to-front" flatting style, and also what is herein referred to as "coloring-book" flatting style. In particular, the "coloring-book" flatting style can be accomplished by using what are herein referred to as "blobs" (more particularly, in this case, "blobs" of "painted image points"). Alternatively, the industry-common "back-to-front" flatting style can be accomplished by performing the herein-disclosed methods' "iterations" on an image, then applying a herein-disclosed "Unpainted-Status Brush Tool" ("Unpaint Brush tool", or "UPB" tool) on elements or items or regions, then re-performing the method's iterations, etc.—with the disclosed methods' additional benefit of allowing rough swipes and circles and outlines (rather than careful and laborious selections and outlining with a lasso tool or pixel-editing tool), and optionally with the herein-disclosed "Snap to Line Art" effect/method which, for example, speeds up and simplifies the selections of regions or elements or items, such as for back-to-front flatting.

In addition, implementation-centric speed and efficiency tips and tricks, and user-centric tips and tricks, are discussed in more detail in different sections of this present document.

BRIEF DESCRIPTION OF THE SEVERAL VIEWS OF THE DRAWINGS

Exemplary embodiments of the present invention are illustrated by way of example in the accompanying drawings, in which like reference numbers indicate the same or similar elements, additionally in which the leftmost digit (or digits) of a reference number identifies the drawing in which the reference number first appears, and in which:

FIGS. 10A-10E illustrate an example of using the present disclosure to easily color characters/elements/items that consist of complex detached parts, and to color multiple disconnected characters/elements/items; in this case, by simply using five small "color blobs" ("PIP blobs") to color two groups of birds, a group of rabbits, and a tree object consisting of a large number of disjointed/disconnected elements.

FIGS. 12A-12E illustrate an exemplary workflow in the context of (what is herein referred to as) "coloring-book"-style flatting, particularly in which anti-aliased or grayscale or multi-color (or two-color) graphics are colored, flatted, and trapped (i.e., colors touch in the centers of the lines, as is shown), in this case by simply using two small "color blobs" ("PIP blobs", or "segmentation blobs", each herein disclosed).

FIGS. 14A-14F illustrate an example of using the present disclosure to color line art and graphics containing large gaps and discontinuities, by using quick and rough encircling, in this case applied to grayscale and gradient graphics.

FIGS. 27A-27F illustrate an exemplary workflow and approach, for using "back-to-front"-style flatting to color (or segment) art, including photographic images.

FIGS. 33A-33E demonstrate that the present disclosure's techniques are robust, in this case by showing a segmentation specified by way of a thick white rope (rather than black line art); and furthermore illustrate how to use the coloring or segmentation in order to composite multiple items, in this case multiple photographic images.

FIG. 35A-35E show the herein-disclosed compositing feature used to easily create anaglyph "3D" effects in images, comics, animation, etc.

FIG. 36 is a "computer program listing" of an exemplary embodiment of the herein-disclosed "Snap to Line Art" feature, for the case of multi-color (including grayscale, and anti-aliased) graphics.

FIG. 37 is a "computer program listing" of an alternative exemplary embodiment of the disclosed "Snap to Line Art" feature, for the case of grayscale graphics (including anti-aliased graphics, and including black-and-white graphics).

FIG. 38 is a "computer program listing" of an alternative exemplary embodiment of the disclosed "Snap to Line Art" feature, for the case of grayscale graphics (including anti-aliased graphics, and including black-and-white graphics).

FIG. 39 is a "computer program listing" of an alternative exemplary embodiment of the disclosed "Snap to Line Art" feature, for the case of grayscale graphics (including anti-aliased graphics, and including black-and-white graphics).

DETAILED DESCRIPTION OF THE INVENTION

Figure 1:
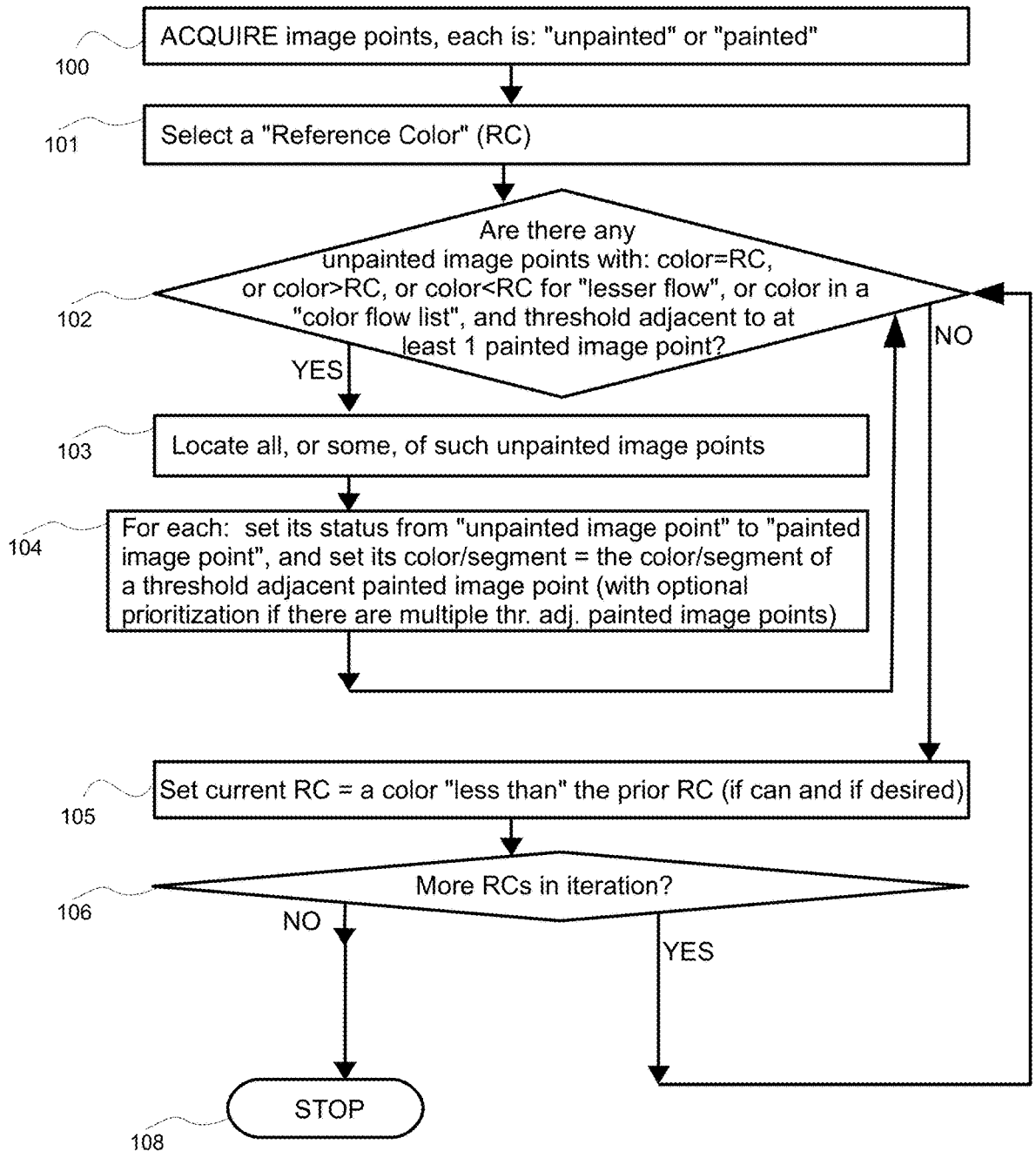
FIG. 1 is a flow sheet diagram for a method according to a preferred embodiment of the disclosed inventions, for the case of multi-color graphics.

The "next couple dozen" subsections will focus on new terminology and definitions which are used in the present document, and will include extra tips, disclosures, discussions, comments, and preferred-modes discussions.

1. New Terminology and Definitions

"Image points"—Herein-disclosed methods start with the inputting or acquisition of a set of data elements, these data elements herein referred to as "image points". In common embodiments of the disclosed inventions, the "image points" can be implemented as literal image pixels. But, the term "image point", as used herein, is not just limited to (for example) a pixel and its x-coordinate and y-coordinate—rather, the term can include multiple properties (such as the herein-disclosed "coordinates" or "coordinate", "color", "segment affiliation", etc.). When an "image point" is implemented as a literal graphics pixel, then for example, its color can be an RGB color (Red-Green-Blue) or RGBA color (RGB-Alpha) representing or encoding the pixel's (herein-disclosed) "paint status", or (herein-disclosed) "color", or (herein-disclosed) "segment affiliation", etc. (For example, a grayscale color might mean that the pixel represents a (herein-disclosed) status of "unpainted image point", and a non-grayscale color might mean that the pixel represents a (herein-disclosed) status of "painted image point", and in either case represents a "color" property equal to the pixel's literal RGB color. Similarly, (herein-disclosed) "opposite flow" might be encoded with an RGB green channel of "19" for the pixel, and (herein-disclosed) "multi-flow" might be encoded with an RGB green channel of "18" for the pixel.) In broader terms, rather than implementing an "image point" as a literal graphics pixel, an "image point" could for example be implemented as a set of array data elements, tracking (herein-disclosed) properties such as x-coordinate, y-coordinate, paint status, color, segment affiliation, flow status, etc. Or, for example, an "image point" could be associated with a numerical index that corresponds to a list where each list item contains a set of current image point properties. Or, for example, an "image point" could be represented as an "object" in an object-oriented programming language, where the object has properties such as: ipt.x, ipt.y, ipt.paintStatus, ipt.color, ipt.segment, ipt.flowStatus, ipt.jumpDistance, ipt.flowDirection, etc. In brief, there are large numbers of possible implementations.

(It should be noted that, in the present disclosure, for ease of discussion, the "image points" are said to possess the herein-discussed "properties". But, it is considered within the spirit and scope of the present inventions if the properties are instead, for example, applied to an image point's "color" property rather than to the image point itself. For clarity-of-claiming purposes, the properties will be said to be properties of the image point itself. But, for example, the "flow status" property might be implemented as a property of the image point's "color" property. Such scenarios or design-arounds are intended as within the spirit and scope of the present inventions.)

"Paint Status, and Types"—An "image point" has what is herein referred to as a "paint status". In a preferred embodiment, the "paint status" is either "unpainted" (thus the point is an "unpainted image point", or "UPIP") or "painted" (thus the point is a "painted image point", or "PIP"). The terms "unpainted image point" and "painted image point" are also used herein as "paint status". In brief, the "PIPs" spread their colors and/or segment affiliations, to the "UPIPs". This is the mechanism by which, for example, an anti-aliased, grayscaled comics page or animation frame can be colored fully, in the context of the present inventions.

"Coordinates Property"—An "image point" has what is herein referred to as a "coordinates" or "coordinate" property. In a preferred embodiment, this represents the literal x-coordinate and y-coordinate of a pixel in a graphics image. In alternative embodiments, the property could represent some type of different identifier, but preferably location information. For example, rather than an x-coordinate and y-coordinate, the "image point" might include a number representing a flattened-array offset that corresponds to x and y coordinates, or it might include an index position for a list containing coordinates.

"Color Property"—An "image point" might include what is herein referred to as a "color" property. In a preferred embodiment, this represents a literal color (such as an RGB or RGBA or grayscale color) of a pixel in a graphics image. In alternative preferred embodiments, the property could represent a group association, segment affiliation, color index, or etc. In more complex implementations of the present inventions, an "image point" will track two color properties: a color for UPIP status, and a color for PIP status. E.g., for 1-layer herein-disclosed "UPB" or "PB" tools.

"Segment Affiliation Property"—An "image point" might include what is herein referred to as a "segment affiliation" property. In a preferred embodiment, this represents a numerical code representing a group affiliation of a pixel, but in alternative embodiments this can for example represent different data such as the color of a pixel. Image segmentation is a well-known task in the field of computer graphics, and the "segment affiliation" property is herein used to reflect that task (according to preferred uses of the property, in the context of the present inventions). Of course, alternatively, color can be used to encode "segment affiliation" (for example, blue might represent a background segment, and red might represent a foreground segment such as a particular character or object or item).

Furthermore, the term "segment affiliation" is used herein to better represent the fact that although colored/flatted regions of comics and animations are typically a single solid color, it is possible that instead, in the context of the present inventions, an artist might want a character's shirt to display as a graphics texture or multi-colored pattern or halftone pattern or etc., in which case the notion of a regional "color" is misleading. Thus, the artist can use what the present document herein refers to as "segment affiliation"—such as a numerical code representing, for example, a textured shirt. In this way, a "segment affiliation" property, rather than a literal color property, can be used to color an item or region—in particular, color it with numerous literal colors if desired, such as with textures, gradients, etc. (This segment-based coloring or multi-coloring can occur right away, such as when the "segment affiliation" is assigned to an image point, or later, such as after the graphics processing is complete.)

For example, a pixel with a "segment affiliation" code representing a "shirt", might get a literal color based on its location/coordinates in addition to its segment affiliation, and possibly based on its location as compared to nearby segment pixels or nearby different segments. For example, the color of the "shirt pixel" (in the textured "shirt" region) might then be lightened or darkened or tinted based on its proximity to light sources or shadows; or for example, pixels might get gradually lightened or darkened or tinted as the pixels extend rightward from the left edge of a particular segment region. Or, for example, for a "green screen" or "chroma key" segmentation of a character's shirt, the alpha component of an RGBA-colored "shirt" pixel might be decreased if the pixel is near the edge of the "segment affiliation" region, in order to produce better blending/compositing between background and foreground pixels.

"Interior Region, Interior PIPs"—The typical user will often use the herein-disclosed "UPB tool" to bound or encircle a group of "image points". The thus-enclosed region is herein referred to as an "interior region", or "interior bounded region". The enclosed "image points" are referred to as "interior image points". Typically, the region will consist of "painted image points" ("PIPs"), which are then referred to as "interior PIPs", or "inner PIPs".

2. New Terminology and Definitions

"Flow Status, and Types"—An "image point" might contain what is herein referred to as a "flow status". The image point property of "flow status", in a preferred embodiment, represents how colors and/or segment affiliations spread from "painted image points" ("PIPs") to "unpainted image points" ("UPIPs"). A "standard flow" status, such as for a PIP, means that an UPIP can be changed (or preferably, its color property and "paint status" property can be changed) when that UPIP's color is "equal to" the current (herein-disclosed) "reference color" in the (herein-disclosed) "iteration", and/or when its color is "greater than" the current "reference color" in the "iteration", according to a user-selected or computer-selected color ordering, and preferably according to the user's preferences. A flow status of "lesser flow" (such as for a PIP) means that an UPIP can be changed (or preferably, its color property and paint status property can be changed) in the case that its color is "less than" (or "less than or equal to") the current "reference color" in an "iteration", according to a user-selected or computer-selected color ordering. A flow status of "fixed flow" means that a PIP does not flow its color or segment affiliation to UPIPs. (This type of flow status is for example useful for quickly setting fine pixel details or for quickly plugging line art gaps without requiring extra line art.) A flow status of "opposite flow" is a type of "lesser flow", and is designed for efficiency (for example, it doesn't require use of multiple herein-disclosed "reference color iterations")—for example, with "opposite flow", if the current "reference color" is grayscale=250, then an UPIP with a color of grayscale=5 (essentially the opposite color of grayscale=250 in a typically-chosen grayscale colorspace, since "255−250=5") can take colors/affiliations from (preferably adjacent or "threshold-adjacent", herein disclosed) PIPs. A flow status of "multi-flow" and "multi-multi-flow" are each a combination of "standard flows" and "lesser flows", and in particular, produces powerful coloring results for complex line art or graphics. ("Flow status", and the particular types, will be discussed in more detail in later sections of this document.)

As with "opposite flow", "multi-flow" is used for efficiency by not requiring the user to explicitly create an additional "reference colors" list. For example, if the current "reference color" is grayscale=250, then with "multi-flow", an UPIP with a color of grayscale=5 or grayscale=250 can take colors/affiliations from (preferably adjacent or "threshold-adjacent") PIPs. Alternatively, "opposite flow" and "multi-flow" can be based on, for example, opposite "reference colors" iteration indexes (including scaling and/or offsets for the indexes), rather than opposite RGB color numbers as in these current quick examples.

An extra type of herein-disclosed flow status is "extension flow", which allows colors/segments to flow from PIPs to UPIPs according to a preferably-increasing/broadening color threshold, or color difference, according to a particular base color, or alternatively, according to a preferably-increasing/broadening color threshold, or color difference, according to the color distance or difference (user or computer defined, preferably according to a color "ordering") between a current PIP and UPIP. Preferably, the increasing/broadening threshold is a color distance (user or computer defined) between the current UPIP's color and a particular base color or colors, with the threshold computed according to the current "reference color" in the "iteration".

3. New Terminology and Definitions

"Priority Property"—An "image point" might optionally include what is herein referred to as a "priority" property. In general, this optional property specifies which colors and/or segments should get "priority" during the coloring process—and can particularly be used for producing uniformity and regularity of results, and/or special effects: for example, it can be used, in the context of the present inventions, to generate smoother colorings (such as smoother edges of colored regions), smoother color "joins" between adjacent colors or regions (particularly in complex areas of line art), smoother color "joins" along "line art" lines or along line art "spikes" or etc., and particularly can be used when the user wants to create "checkerboard"-style patterns/effects whose squares or elements join accurately and consistently, particularly in cases where the guiding lines are "artist's blue lines" (herein disclosed) which should not show up in the final product. (Examples of these scenarios are presented and discussed in more detail in this document.)

In brief, when an "unpainted image point" ("UPIP") takes on the color or "segment affiliation" of a (herein-disclosed) threshold-adjacent "painted image point" ("PIP"), often multiple PIPs are contenders, and optionally the "tie" can be settled by a "priority" property assigned to the PIPs. For example, consider the case of an UPIP pixel, with some of its four sides and four corners touching or adjacent to PIP pixels, with different colors for each PIP pixel. In such a case, which color or segment affiliation should the UPIP take on? The "tie" could be broken randomly, but in complex artworks this can create slightly rough edges along the places where different color regions touch or join. Instead, by assigning a "priority" to the PIPs—for example by explicit selection by a user, or for example by simply prioritizing their colors (e.g., prioritizing their colors based on their RGB color channels, or based on the integer represented by their RGB bits)—a consistent join can be accomplished. (Note that the "tie" could of course alternatively be broken by using a combination or weighted combination of the properties, particularly the color/segment properties, but this would likely be a rarer choice by users in the context of typical comics or animation coloring, where such edge-color blending is not used.)

"Color Priority, Segment Priority"—The "priority" property can be more specifically characterized, by what is herein referred to as "color priority" and as "segment priority". The term "color priority" indicates that, for example, a "painted image point's" ("PIP's") color has been assigned a priority by the user (or computer). The term "segment priority" indicates that, for example, a PIP's segment affiliation has been assigned a priority by the user (or computer). Of course, if in practice when processing a graphic which combines different types of priorities, such as color priorities and segment priorities, the user (or computer) can assign color-and-segment priority rules in order to process a "tie" condition such as in the "tie" example described here.

4. New Terminology and Definitions

"Threshold Adjacency"—In a typical embodiment, particularly for flatting and trapping graphics for print production, what is herein referred to as "threshold adjacency" is simply defined as common (i.e., known in the art) 4-adjacent pixel adjacency, or as common 8-adjacent pixel adjacency, or as "nearest painted image point" adjacency. According to a typical embodiment of the present inventions, when an "unpainted image point" ("UPIP") takes on the color or segment affiliation of a "painted image point" ("PIP"), the PIP is (preferably according to the user's preferences) either 4-adjacent to the UPIP, or is 8-adjacent to the UPIP, or is the nearest PIP to the UPIP.

(It should be noted that 4-adjacency has certain benefits compared to 8-adjacency, in certain cases. In particular, if there are thin diagonal lines in the line art, 8-adjacency, as with 8-adjacent bucket fills, might result in a PIP's color/segment "leaking" through the diagonal line, which may or may not be what the user intends. In contrast, 4-adjacency bucket fills, or PIP color/segment flows in the context of the present inventions, are blocked in such cases, and the thin diagonal line has a "barrier" effect.)

In addition, in an alternative but preferred embodiment for complex coloring, "threshold adjacency" can be pixel adjacency according to a user-selected threshold or tolerance. (This is actually the reason for the term "threshold" in the herein-defined term "threshold adjacency".) For example, a PIP's color or segment affiliation can "jump" to an UPIP at a user-selected distance of "10 pixels", rather than just a distance of "1 pixel", if the user chooses such a "threshold adjacency". For example, this option allows colors/segments to "jump across" color barriers or unpainted-points barriers that would otherwise block such flows—thereby for example allowing a background color to "jump across" thin strands (or thick strands, as in FIG. 23A)—in order to color a nearby section of background. Furthermore, particularly for complex line art or grayscale photos, the user can allow (herein-disclosed) painted "blobs" to jump across barriers, by associating each of one or more "blobs" of PIPs, with an additional "jump distance" property. For example, the image points in a "color blob" representing a "background" color or region can be set with a "jump distance" property of, say, "30 pixels" adjacency, rather than a default of, say, "1 pixel" adjacency. The background colors can then jump, early, across barriers such as strands, to fully color the background area before the remaining "color blobs" enter those regions. In such cases, the user can preferably further specify or select a pixel template that specifies the locations and/or directions of the, say, 30-pixel jump—for example, the user might select a square-shaped jump section, or a circularly-shaped jump section, or an 8-direction jump pattern, or a 4-direction jump pattern, or etc.

Similarly, FIGS. 8A-8D show how the user can easily and completely color, flat, and trap, complex line art or art—in this example, a disjointed (and anti-aliased) artwork. Specifically, in this case, the user simply sets three small "background"-color "blobs" to 1-pixel jumps, and sets a single small foreground-color "blob" to a 30-pixel-radius jump (and with a "flow status" of "opposite flow"). The result, as shown, is a complete coloring, flatting, and trapping, of a disjointed (and anti-aliased) artwork. (This technique is of course similarly applicable to disjoint items and to multiple comics characters, in general.)

"Jump Distance Property"—This is discussed in the prior paragraphs.

"Flow Direction Property"—In an embodiment of the inventions, this optional property specifies whether a "painted image point" ("PIP") should flow its color/affiliation based on 4-adjacency, 8-adjacency, "nearest-painted-image-point" adjacency, the implementing software's default-setting adjacency, threshold adjacency (such as in combination with the "jump distance" property), mask-or-template based adjacency, or etc. For example, according to the user's preference, a "blob" region of red-painted PIPs might flow to 4-adjacent "unpainted image points" ("UPIPs"), whereas a blue-painted "blob" region might flow to 8-adjacent UPIPs (such as if the red-painted blob is in a region surrounded by 1-pixel-thin lines, and the user wants to block erroneous color leaks).

5. New Terminology and Definitions

"Blobs, and Types"—The present document will newly define a term, "blob", to refer to one or more associated pixels, typically adjacent or contiguous pixels, sharing some characteristic, such as color, segment affiliation, association, etc. It is noted that the term "blob" is sometimes used in the related art/field, for a particular meaning which is different than for the present inventions, therefore the present document will often use the terms "PIP blob" ("painted image points blob") and "UPIP blob" ("unpainted image points blob") in the context of the present inventions, and will herein use the term "blob" as a shortcut for "PIP blob" and/or for "UPIP blob", and will typically use the term "color blob" to refer to "PIP blob". In preferred embodiments of the herein-disclosed inventions, the term "blob" refers to a group of one or more contiguous pixels, where each adjacent pair is either 4-adjacent or 8-adjacent, representing "painted image points" (or "unpainted image points") sharing an association, such as sharing a common color or segment affiliation. In more specific terms, "color blob" can refer to a group of "painted image points" (or "unpainted image points") associated by a common "color" property, and "segment blob" or "segmentation blob" can refer to a group of "painted image points" (or "unpainted image points") associated by a common "segment affiliation" property.

(It should be noted that the term "scribble" is often used in the related art/field, to refer to contiguous pixels sharing a color, typically in the form of a line or squiggly line. In contrast, the present document will herein use the present new definition of "blob" (or "color blob", or "segmentation blob"), rather than "scribble", to more clearly indicate that the herein-disclosed methods often use large common-colored or associated regions, for which the term "scribble" would be misleading. This is particularly the case when the user implements the herein-disclosed methods or systems and desires "back-to-front"-style flatting. In such a case, the "blobs" of "painted image points" (or "unpainted image points") are often quite large in practice, and thus do not resemble "scribbles".)

6. New Terminology and Definitions

"Broad Colorspace"—The term "colorspace" is well known in the art/field, and can for example refer to an RGB-based colorspace, RGBA colorspace, 24-bit 3-channel grayscale colorspace, 8-bit single-channel grayscale colorspace, bitmap (pure black-and-white) colorspace, CIE colorspace, or etc. The term "broad colorspace" will be used herein, since the disclosed methods and systems can be implemented by inputting and/or outputting data in multiple different colorspaces. For example, a comics page or animation frame might be inputted as a "line art layer" in 8-bit grayscale colorspace, while the herein-disclosed "artist's blue lines layer/image" might be inputted in 24-bit 3-channel grayscale colorspace, while the "color blobs" representing inputted "painted image points" might be inputted as a 32-bit RGBA colorspace file. For these reasons, the term "colorspace" can be misleading in the context of the present inventions. For that reason, the present document will use the term "broad colorspace", which represents one or more colorspaces, and preferably, in addition, a set of rules for transforming between the possibly-multiple colorspaces. In the most common implementations, the "broad colorspace" could be RGBA colorspace, and the "image points" could all be transformed to and tracked in RGBA colorspace, regardless of the input colorspaces. For example, an "image point" (as discussed earlier, a pixel, in the simplest implementation of the herein-disclosed methods and systems) might switch between being an "unpainted image point" and a "painted image point", thus resulting in a switch between 8-bit grayscale="24" and 32-bit RGBA="24,24,24,255".

"Reference Colors"—The present disclosure herein uses the new term "reference colors". In a preferred embodiment of the present inventions, the "reference colors" are colors in a user-selected colorspace or "broad colorspace". In a preferred embodiment, the user "orders" these reference colors (i.e., sets a sequence or ordering). Without loss of generality, the disclosure herein uses the terms "greater than", "equal to", and "less than", when referring to colors in color orderings. It is considered within the spirit and scope of the present inventions if an implementer of the inventions uses different terms, such as "left, same, or right", or if the implementer flips the terms or the ordering by for example ordering colors by "less than" first rather than "greater than" first.

"Reference Colors Iteration"—The present disclosure uses the term "iteration" or "reference colors iteration" to refer to an iteration through a set of (the herein-disclosed) user-selected or computer-selected "reference colors". Without loss of generality, the "iteration" is said to proceed from "greater than" colors in a color ordering, to "less than" colors in the color ordering. E.g., descending or non-ascending. Alternatively, the iteration might proceed from so-called "less than" colors to so-called "greater than" colors, but such design-arounds are intended as within the spirit and scope of the present inventions. Furthermore, the color ordering is user-selected (or computer-selected) and arbitrary, it is not necessarily based on the color's color channels. For example, one user's color ordering might characterize lighter grayscale colors as "greater than" colors, and darker grayscale colors as "less than" colors—in such a case, the "descending" iteration could range, for example, from gsc=255 to gsc=0 ("gsc" short for "grayscale"), in sequence. But, alternatively, the user's color ordering might declare darker colors to be "greater than" colors in the ordering, and lighter colors to be "less than" colors in the ordering—in such a case, the "descending" iteration could range, for example, from gsc=10 to gsc=210, in sequence. (The disclosed "opposite flow" status permits a more computationally efficient implementation of such a scenario, in certain cases.) As an additional example, for example if processing or segmenting a "green screen" or "chroma key" frame of an action film, greener colors might be chosen as the "greater than" colors, and less-green colors might be chosen as the "less than" colors. (As an easier implementation, the "green screen" or "chroma key" frame can be pre-processed, such as by replacing each pixel in the green screen frame image, with a grayscale color representing its amount of perceptual green-ness, or representing its RGB or CIE color distance from "green". Then, the herein-disclosed methods can be easily applied to that grayscale image, to segment the different parts and pixels of the grayscale image, thus to thereby segment the parts and pixels of the original "green screen" or "chroma key" frame image. Furthermore, since the method data can be processed as, for example, array data rather than literal image data, the grayscale "nearness" integers can be of a high dynamic range and tracked in an array, if desired. In such a case, software or GUI implementing the method could, for example, display the high dynamic range on the user's computer screen, according to some chosen dynamic range reduction process.) As an additional example, if there are literally-blue "artist's blue lines" (defined herein) included in a grayscale comics artwork page, as is often the case in the comics industry, and if the user doesn't want to turn the blue lines to grayscale (although that would actually be an easier option for such cases), then the blue pixels' colors and the grayscale colors might be ordered according to (for example) their brightness, when one of the herein-disclosed methods is implemented. As an additional example, if the comics page or inputted work isn't grayscale, but is for example shades of red and blue, then the color ordering might characterize redder colors as "greater than" and bluer colors as "less than". As an additional example, if processing a fully-colored photo, the photo's colors can be ordered according to certain items or regions in the photo, or for computational ease, can be pre-processed or reduced, such as to grayscale, and (for example) possibly weighted according to additional segmentation criteria, prior to implementation of the herein-disclosed methods.

(It should be noted that although in practice most users may, for ease, opt to process a color photo as a grayscale image, the present inventions are defined generally, in terms of ordering and processing non-grayscale colors. This is important since, for example, in some cases a photo's colors might transform to equal grayscale colors, which would then yield bogus results for the coloring or segmentation process. For example, standard computer graphics use only "256" different shades of gray, but a color photo typically contains thousands or millions of different colors, which therefore guarantees that different colors will transform to the same grayscale color. Similarly, a photo or graphics image might contain only a few colors, but those few colors might transform to equal grayscale colors, such as can frequently happen for brightly-colored cartoons.)

It should be noted that iterations that proceed irregularly and out of sequence, but which contain a subset that is a descending-order sequence, are considered within the spirit and scope of the present inventions. For example, if an iteration first processes a "reference color" of gsc=255, then a reference color of gsc=250, then a reference color of gsc=210, then returns to again process the reference color of gsc=255 or perhaps process a reference color of gsc=222, then such an iteration or design-around is intended as within the spirit and scope of the present inventions (and more specifically, the invention as claimed), since the iteration "comprises" a descending sequence (according to the "ordering"). Similarly, it is intended as within the spirit and scope of the present inventions, if the user's color ordering and reference colors are willfully irregular, such as to in effect recreate, for example, an iteration of gsc=255 then gsc=254 then gsc=253. In particular, for example, if an iteration comprises three or more grayscale colors in decreasing lightness, or three or more grayscale colors in increasing lightness, then the iteration is intended as within the spirit and scope of the present inventions (and more specifically, the invention as claimed). Furthermore, design-arounds that willfully replace or transform the at least three increasing or decreasing grayscale colors, with for example irregular reds or blues, is intended as within the spirit and scope of the invention as claimed. Furthermore, design-arounds such as performing a one-element iteration for a gsc=255 reference color, then performing a one-element iteration for a gsc=254 reference color, then performing a one-element iteration for a gsc=253 reference color, are intended as within the scope of the present inventions, since such iterations are in effect an iteration though sequential grayscale colors, in particular attempting to design around the preferred or exemplary modes of the present inventions.

"Reference Colors Iterations List"—The term "reference colors iterations list" or "reference colors list" refers to a collection of "reference colors" in an "iteration", in association with the ordering, i.e. an ordered list of "reference colors" as used in the "iteration".

7. New Terminology and Definitions

"Color Flow List, Multi-Multi-Flow"—The term "color flow list" will be used herein to refer to a list of colors which allows for customized or complex flows, particularly in association with the type of flow status which is herein referred to as "multi-multi-flow". In brief, a "color flow list" is, in a preferred embodiment, a list of colors in a user-selected colorspace or "broad colorspace". The "color flow list" allows customized flows, in addition to the "standard", "opposite", etc., flows. A "color flow list" can specify color flows in different ways. In a preferred embodiment, a user can select or specify or create a new "blob" (such as a "color blob" or "segment blob") that is spread across multiple "unpainted image points" ("UPIPs") that comprise multiple different colors—for example, the user might specify a "blob" which is spread across a mottled section containing UPIPs with, for example, grayscale colors "230, 231, and 250". The selected region, in a preferred embodiment, is then turned from UPIPs to "painted image points" ("PIPs"), thereby creating a "blob" with a user-selected color or segment affiliation, and further creating a blob-associated "color flow list" containing the grayscale colors "230, 231, and 250". There are now different ways that the user can select criteria for these new PIPs to flow or spread their colors or segment affiliations to the line art's UPIPs. In one alternative, the "blob" can immediately flow its color or segment affiliation to any (preferably adjacent or threshold-adjacent) UPIPs whose colors are the grayscale colors of "230, or 231, or 250" (basically, this acts as an instant, or non-instant, as desired, fully-custom bucket fill). In a different alternative approach, the "blob" can flow its color/segment to UPIPs, only when the current "reference color" is equal to or less than a color of gsc=230, which is the "least" color in the "blob", according to an exemplary user-selected color ordering. In a different alternative approach, the "blob" can flow its color/segment to UPIPs, when the current "reference color" is equal to or less than a color of gsc=250, which is the "largest" color in the "blob", according to an exemplary user-selected color ordering. In a different alternative approach, the "blob" pixels that originally had a color of gsc=250, can start to flow their painted color or segment when the current "reference color" is gsc=250 or less, and the "blob" pixels that originally had a color of gsc=231, can start to flow their painted color or segment when the current "reference color" is gsc=231 or less, and the "blob" pixels that originally had a color of gsc=230, can start to flow their painted color or segment when the current "reference color" is gsc=230 or less.

In brief, in preferred modes, a flow status of "multi-multi-flow" applies to a "PIP blob" whose coordinates intersect with the coordinates of UPIPs, or former UPIPs, for which the UPIPs' colors, or former colors, are not just a single color, i.e. such as in FIGS. 29A-29D.

Furthermore, the concepts of "opposite flow", "multi-flow", etc., can be applied to a "color flow list". For example, if the current "reference color" is gsc=250, then the exemplary "color flow list" of "grayscale 230, 231, 250", in conjunction with "opposite flow" status, applied to the current exemplary "blob", could result in UPIPs with color gsc=5 (preferably, UPIPs threshold-adjacent to the "blob") obtaining flows of colors/segments from the blob's PIPs, since "255−250=5". Similarly, for example, if the current "reference color" is gsc=250, then the exemplary "color flow list" of "grayscale 230, 231, 250", in conjunction with "multi-flow" flow status, applied to the current exemplary blob, could result in UPIPs with color gsc=5 or gsc=250 obtaining flows of colors or segments from (preferably threshold-adjacent to the UPIPs) PIPs.

In brief, a "color flow list", in effect, associates at least one (preferably, more than one) color, or identifier in general, with a "blob", such as in conjunction with the "flow" statuses disclosed and discussed in this document. Furthermore, an "opposite flow" or "multi-flow" (or "extended flow") does not necessarily need to be based on flowing opposite colors (e.g., based on literal opposite RGB and/or color channel numbers, such as in the "255−250=5" example), it could alternatively for example be based on flowing colors with opposite position indexes in the "reference colors" list (e.g., list of "reference colors" in the "iteration").

8. New Terminology and Definitions

"Flatting, and Types"—Prior sections of this document discuss "flatting", such as in the context of the comics industry. In particular, "back-to-front" flatting was discussed. It should be noted that there are no "official" terms for the different flatting styles, but an industry-popular and common technique is sometimes referred to by artists as "back-to-front flatting". Therefore, this term will be used herein, for that style of flatting. A key difference is that the herein-disclosed and herein-discussed flatting methods (including in the case of "back-to-front flatting"), yield new benefits and features in the context of the present inventions, for example they do not require the artist to carefully and laboriously and pixel-accurately position a lasso tool in the centers of the art's lines when outlining items. Specifically, the herein-disclosed methods permit "back-to-front flatting" to be accomplished with quick and rough outlining, and rough swipes for the circling/encircling and outlining of items—and the herein-disclosed methods are particularly easy and efficient for users when the methods are furthermore used in combination with the "Snap to Line Art" feature which is disclosed in a later section of the present document, and which for example allows fast and efficient user selections of the "back-to-front" regions or areas or elements or items when "back-to-front flatting" is chosen.

An alternative approach to flatting is to color the comic or art as if it were a "coloring book". The herein-disclosed methods allow what will be herein referred to as "coloring-book"-style flatting, but with the benefit that, with the herein-disclosed methods, the user need only put a few key "blobs" on the image, such as for coloring animation frames or comics pages, and does not need to carefully and laboriously color the items or regions with a lasso tool and bucket-fill tool, and does not need to carefully and laboriously ensure that the lasso tool is placed in the center of the art's lines when flatting/trapping is desired, and furthermore gets the benefits and features of the herein-disclosed methods. For example, refer to FIGS. 8A-8D, which shows that, with the present disclosure, a few simple color blobs can color and trap disjointed and disconnected art.

An alternative approach for flatting is herein referred to as "bucket-fill clean-up" flatting. This is particularly useful for rapidly flatting and/or trapping large images and/or anti-aliased images, since the resulting effect of the bucket fills is to quickly create large "color blobs". With this approach, a user can opt to bucket-fill, or threshold bucket-fill, different regions or parts of the line art or graphics, including in the case of anti-aliased graphics (which are known to halt "bucket fills" too early), and with the benefit that the user can use custom colors rather than random computer-generated colors, and with the benefit that the user does not need to rely on the inaccurate "increase selection size" approach for the trapping or for the coloring of the bucket-fill's early-halted areas.

Furthermore, with the herein-disclosed "opposite flows" and "multi-flows" and "multi-multi-flows" and "extension flows", complex art and line art can be colored or colored/flatted or colored/flatted/trapped quickly and easily, sometimes with just a few color blobs (as shown in multiple Figures herein). Examples and discussions are included in the present document.

Furthermore, the herein-disclosed methods and the present document's disclosure, allow not just "back-to-front flatting", but also what is herein referred to as "hybrid flatting", in which the artist can easily and efficiently do what might be referred to as "front-to-back" flatting, in addition to or in combination with "back-to-front flatting", or the artist can easily do an arbitrary combination, which in effect might then be referred to as, for example, "semi-front to back to semi-back to front to center" flatting—i.e., fully customized flatting. (Examples and discussion are included in the present document.)

Of course, the user can for example combine the present inventions' "back-to-front flatting", with the present inventions' "coloring book"-style flatting, particularly when processing complex line art or graphics. For example, if the user is coloring line art of a "traffic light", the user might use "back-to-front flatting" to color the large structure, then use the herein-disclosed UPB to swipe a thick line across the lights, then use "coloring-book"-style flatting to put a "color blob" in each of the lights. The user can then apply one of the herein-disclosed coloring methods.

9. New Terminology and Definitions

"Line Art, Line Art Layer, Art Layer"—The present inventions allow for different possible inputted data sets. The herein-used term "line art layer", in the context of the present inventions, refers to an image, or data collection such as an array, containing data encoding a work of line art or digital graphics, which the user would like to color, in its entirety or in part. For referential ease, the term "layer" is borrowed from the more-specific term used in some common graphics-editing software packages, but in the context of the present inventions the inputted data can be, for example, an array, or raw text, or binary numbers data, it does not necessarily need to be a literal "layer" of the kind used in the common graphics-editing software packages.

It should be noted that, in the context of the present inventions, the term "line art" and "line art layer" are used herein without loss of generality, therefore they could alternatively represent, for example, a grayscale photo, or grayscale comics art, or grayscale animation art, or a color photo, etc., or any desired graphics work that the user intends to color and/or segment by implementing the present inventions. That is, it does not necessarily need to represent literal line art. The "line art layer" as referred to herein, in the context of the present inventions, could alternatively be referred to, more accurately, as the "art layer". Instead, for referential ease, the term "line art" and "line art layer" is used, including in generality, since those terms are the commonly-used terms in the comics or animation industry to refer to the artwork that requires coloring, which is usually literal line art in the context of the comics or animation industry.

"Flats Layer"—Similarly, the herein-used term "flats layer", in the context of the present inventions, refers to an image or data collection representing the different colors and/or segments and/or "blobs" associated with the present inventions. For referential ease, the term "flats layer" is borrowed from the more-specific term which is commonly used by comics artists when these artists refer to a color-tracking layer in the context of common graphics-editing software packages.

"Blobs Layer"—The herein-used term "blobs layer" or "blob layer" or "color blobs layer" or "segment blobs layer", refers (in a preferred embodiment) to an image or data collection representing the "painted image points" and/or "blobs" ("color blobs" and/or "segmentation blobs") associated with the present inventions. For ease, or for resource efficiency, the user might use the "flats layer" as a "blobs layer or layers". Herein, the term "flats/blobs layer" is short for "flats layer and/or blobs layer".

"Artist's Blue Lines, Blue Lines, Artist's Blue Lines Layer, Blue Lines Layer"—The term "blue lines layer" or "blue line layer" or "artist's blue lines layer", is a term used herein to refer to an image or data collection representing additional or supplemental "line art". This layer can be employed, for example, to specify additional line art details such as gap-filling lines (for filling or fixing gaps or discontinuities in the original line art), or checkerboard lines, or guiding lines, or perspective lines, etc., which are used for coloring or segmentation purposes but which should not appear in the final "production graphic". Similarly, this layer can be employed, for example, to specify white areas which then, in effect, delete portions of the "line art layer's" lines.

The term "artist's blue lines" is used herein to refer to "line art" lines or pixels or pixel regions that should preferably not show up in the final "production graphic"—for example, supplementary or additional "line art lines" outlining adjoining sections that artists should color with different colors, or for example lines establishing gap-blocking lines or checkerboard outlines. In brief, the pixels representing the "artist's blue lines" are, in practice, in preferred modes, added onto the "line art layer", explicitly or implicitly, as if they were a part of the first and original "line art layer". In some cases, it might be useful to keep the line art lines and the "artist's blue lines" as different layers, such as for a user's ease of reference while working, or such as for easily showing or outputting or printing the final "production graphic". (For referential ease, the term "artist's blue lines" here is a reference to the light blue lines, often called "non-photo blue lines", that artists commonly use to indicate regions or rough areas but which should not show up in the final product. Note that artists also sometimes use red lines for this purpose.) The term "circular blue lines" is used herein to refer to "artist's blue lines" that are (typically but not necessarily) circular in shape, which allow for easy fixing of "gaps" in the line art, such as in FIGS. 20A-20E.

"Working Layer"—This preferred layer for GUI-based software implementations was used for the prototypes of the present inventions. In a preferred mode, the "working layer" is shown on the screen as the user works. For example, it can show a combination (such as a "Multiply mode" combination) of the "line art layer", the "artist's blue lines layer" (which is preferably added to the line art layer, unless for example the user wants to examine the final "production graphic", without the "artist's blue lines"), the current "flats layer", and the current "paint status layer". The display of such combinations facilitates the user's work. In GUI-based software implementations of the present inventions, the user is preferably allowed to select which info, and/or image points info, and/or layer info is displayed on the "working layer", and is preferably allowed to select how the layers are combined. For example, the user might want the "working layer" to show a "Multiply mode" combination of specific chosen layers, or show a "Screen mode" combination, or show a color "tint" combination. Or, the use might want the "paint status layer's" current UPB-set "unpainted image points" shown as corresponding pixels of the line art, or might want the "paint status layer's" current UPB-set "unpainted image points" shown as an XOR color or an opposite color, or might want the "paint status layer's" current UPB-set "unpainted image points" shown as a highlight or as a tint of the line art layer, or etc.

"Paint Status Layer, Unpaint Tracking Layer"—This optionally-implemented layer facilitates tracking the work of the UPB. (Facilitates for the programmer and/or the user.) It can for example be implemented as a black-and-white layer where white pixels represent the pixels set to "unpainted status" by the currently-used UPB, and black pixels represent the pixels not affected by the currently-used UPB. Or, it could show the unpainted and painted statuses of the image points, e.g. if the same color is used for image points with common paint statuses. In addition, this layer allows easy tracking of the user-editing of the pixels that the current UPB was applied to, such as allowing such pixels' paint status to be canceled or reinstated as chosen by the user—for example, to track cancellation of unpainted status, by changing white pixels to black pixels in the "paint status layer", and/or to track the setting of unpainted status for corresponding image points, by changing black pixels to white pixels in the layer. In addition, a "paint status layer" uses computer resources, but allows easy display of unpainted and/or painted pixels on the "working layer". For example, the "working layer" can easily show a raster graphics layer-combination, by simply combining the "paint status layer" with the "line art layer" and the "flats layer". Of course, the "paint status layer" itself can show up on the "working layer" as is, if the user chooses. This is sometimes a useful feature, particularly when processing complex line art.

"Production Graphic, Production Image"—The present disclosure/document will herein use the term "production graphic" or "production image" to easily refer to the intended final graphics image in an exemplary workflow. For example, the final image that is intended for distribution, publication, or production. This term is herein used in order to distinguish the production image from the earlier images that are used or produced/generated during the artist's workflow, such as the line art graphics images, or the "flats layers" graphics images, etc. (E.g., shown in the Figures.) In a typical workflow for comics, the production graphic/image is a "Multiply mode" combination of the line art layer and the colored flats layer. In the present document's Figures descriptions and discussions, the term "production graphic/image" easily specifies which of a Figure's numerous images is the intended "production result" of the exemplary workflow shown in that Figure.

10. New Terminology and Definitions

"Spikes"—The term "spike" herein refers to a portion of line art where the line art forms a spike, sharp point, thin line, extra-thin line, etc. For example, a comic character's hair is sometimes represented as numerous spikes, with some characters' spikes thicker and some thinner. The present inventions are able to color spikes, and offer the artist control regarding the extent and style of the coloring of spikes (examples are discussed in a different section of this document). Furthermore, for a common scenario where the line art's spikes contain gaps, the present inventions' gap-processing capabilities allow the artist a large amount of control regarding the coloring of the gap-containing spikes (examples are discussed in a different section of this document). For particularly complex line art, the herein-discussed and herein-disclosed "multi-flow" status and/or "opposite flow" status can offer easy coloring of spikes, including complex and/or grayscale spikes (examples are discussed in a different section of this document). In such cases, for better results in complex areas, the user might sometimes opt to pre-adjust the grayscaling, such as for example darkening or lightening a certain range of grayscale colors in the line art, to ensure that the "multi-flow" coloring hits the gray parts of the spikes before the "standard flow" coloring. This approach is generally quicker and easier for the user than if the user were to try to figure out "color flow lists" (herein disclosed) for such complex line art. Examples are discussed in this document.

"Gap"—This term is actually a standard term in the related art/fields, but is used herein. The present document will use the term "gap (in the context of line art)" or "gap in the line art", to refer to a section of discontinuity in the line art or input graphics. For example, a comics page might render a circle as a fully continuous line representing a circle, but often, the line is discontinuous and contains some breaks or gaps in the line, either due to the artist's intentional or unintentional work, or due to slight errors when the art was scanned to a digital graphics file. Gaps in line art are problematic for typical bucket fills, because the bucket fill "leaks" through the "gaps", for example causing a color to erroneously leak from one character into a different character. In contrast, as will be discussed in later sections of the present document, the herein-disclosed methods allow the user to easily and intuitively specify skipping or not skipping certain gaps, or control how much leaking is permitted in certain gaps, etc. For example, the user may want some small gaps in the line art to allow colors/segments to "leak" across the gap, while some large gaps instead act as barriers that halt or block the colors/segments flows. (Examples are discussed in detail in different sections of the present document.)

It should be noted that sometimes a quick and easy way to close line art gaps, is to simply apply a blur filter, such as a Gaussian filter, to the line art. After the coloring process, the original line art graphic can then be used again.

11. New Terminology and Definitions

"Unpainted-Status Brush Tool"—The present document discloses a special software tool herein referred to as the "Unpainted-Status Brush Tool", additionally referred to herein as the "Unpaint Brush Tool" (UPB) or "Unpaint Brush" (UPB) or, in the general case, "Status Brush Tool" (SBT). In a preferred mode, this tool is implemented as a Graphical User Interface (GUI) tool for software applications, displayed on a computer screen as a selection cursor or pixel-selection cursor or pointer cursor or brush cursor. In a preferred mode, the screen displays the graphical data that the user is processing, such as: the line art layer, and/or the flats layer, and/or the current state of the production graphic (usually a "Multiply mode" combination of the "line art layer" and the "flats layer"), with for example "unpainted image points" shown as grayscale line art or as a tint, and with for example "painted image points" shown as the "Multiply mode" combination of the "line art layer" and the "flats layer"; and/or a combination of the "line art layer" and the "flats layer", with the "line art layer" superimposed with the painted "color blobs" of the "flats layer"; and/or a pixel map of the locations of the "painted image points" and "unpainted image points", especially the painted and unpainted points according to a currently-used UPB. In a preferred mode, the user selects the size and/or shape of the UPB (or for ease, uses a default size and shape), and the user manipulates the UPB by way of a mouse, touch-screen, tablet or phone screen, artist's electronic tablet, or etc. When activated, such as by the user pressing a mouse button or pressing a mouse button while dragging the UPB cursor, the UPB sets the "paint status" of each of the thus-selected pixels to a status of "unpainted image point". The user can thereby create a "blob" of "unpainted image points"—for example, the user can create a contiguous region (or, alternatively, a scattered-pixel region) of "unpainted image points", such as in the shape of a "simple and not-closed curve", or in the shape of a "closed curve" (such as a "simple and closed curve" or a "not-simple and closed curve"), or in the shape of a "not-simple and not-closed curve", etc. (The first type of curve is particularly useful for touch-up coloring and for "coloring-book"-style flatting, and the remaining three types of curves are particularly useful for "back-to-front"-style flatting.)

"Painted-Status Brush Tool"—Similarly, the user can create a "blob" of "painted image points" with a herein-disclosed "Painted-Status Brush Tool" (PB), alternatively referred to herein as a "Painted Brush" (PB) tool. In a preferred mode, the PB can allow the user to select a color and/or segment affiliation for the selected image points (or can allow the computer to select a color and/or segment affiliation, for example from a set of random colors or sequential palette colors or random palette colors, etc.). In addition, such properties of the selected image points can be set by flood fills, or pixel editing, or flood fills within a specific color and/or segment affiliation, or flood fills within a specific color/affiliation but bounded by "unpainted image points" (herein, "x-fill"), or flood fills within multiple colors/affiliations but bounded by "unpainted image points" (herein, "z-fill"), or etc. In brief, a "z-fill" colors (e.g., flood fills) image points that possess unequal colors but it stops at UPIPs, an "x-fill" colors (e.g., flood fills) image points that possess a particular color but it stops at UPIPs.

Examples—In this exemplary embodiment, a user selects the UPB tool from a set of GUI tools in an exemplary comics/animation-coloring software application which implements the herein-disclosed methods. The user then presses a mouse button and drags the UPB cursor to encircle an element of the line art, then releases the mouse button. According to the user's preference, the software can show, or not show, the points that were changed to "unpainted image point" ("UPIP") status. The user might then choose to flood fill, with a new color property, one or more of the "painted image points" ("PIPs") within the encircled region. Or, the user might choose to set new color properties on the PIPs, by using a pixel editor tool. The user might then click a button or press a key that causes the software application to apply one of the herein-disclosed graphics-coloring methods. Alternatively, after the user encircles a region with the UPB, the computer can for example automatically flood fill the region that is within the new UPIPs, with a pre-selected color/affiliation (for example, pre-selected by user or computer). Or, for example, the computer can flood fill one or more of the particular PIP colors within the encircled region. Alternatively, the user can use the PB to set the new PIP colors, either prior to using the UPB, or after using the UPB.

(Of course, if for example a pixel's RGB or RGBA color is used to represent the associated image pixel's "paint status" and "color" properties, such as was discussed in a prior section, then standard brush and/or fill tools such as those in common graphics-editing software packages, can produce the same effect as the PB, in which case such alternative approaches and design-arounds are considered within the spirit and scope of the present inventions. That is, applying a pixel editor to accomplish the same result as the PB, in the context of the present inventions, is considered a design-around within the spirit and scope of the present inventions.)

12. New Terminology and Definitions

"The x-fill"—This herein-disclosed effect was useful in prototype implementations of the present inventions. In brief, in preferred modes, an "x-fill" is a flood fill that applies a current color choice (or segment affiliation choice, or set of properties) to a group of image points. In preferred embodiments, it is applied to a particular region of "painted image points" ("PIPs") sharing a set of properties (typically color or segment affiliation). In preferred embodiments, the "x-fill" applies new properties (typically color or segment affiliation) in a flood fill that is bounded by PIPs with different properties than the particular region's shared properties (typically color or segment affiliation), and by "unpainted image points". It is particularly useful for "back-to-front" or "hybrid" flatting.

"The z-fill"—This herein-disclosed effect was useful in prototype implementations of the present inventions. In brief, in preferred modes, a "z-fill" is a flood fill that applies a current color choice (or segment affiliation choice, or set of properties) to a group of image points. In preferred embodiments, it is applied to a particular region of "painted image points" with possibly-different properties among them (typically color or segment affiliation). In preferred embodiments, the "z-fill" applies new properties (typically color or segment affiliation) in a flood fill that is bounded by "unpainted image points". It is particularly useful for "back-to-front" or "hybrid" flatting.

"The X-fill"—This herein-disclosed effect was useful in prototype implementations of the present inventions. In brief, in preferred modes, an "X-fill" acts similar to an "x-fill", but instead applies "unpainted status" to the affected image points, rather than applying image point properties such as color or segment affiliation.

"The Z-fill"—This herein-disclosed effect was useful in prototype implementations of the present inventions. In brief, in preferred modes, a "Z-fill" acts similar to a "z-fill", but instead applies "unpainted status" to the affected image points, rather than applying image point properties such as color or segment affiliation.

"The J-Brush"—This is an extra name for the UPB. In preferred modes, the UPB can be applied (preferably according to the user's choice) at a current cursor location (with optional application of the herein-disclosed "Snap to Line Art" effect/method, i.e. StoLA) or with a "line to" from a prior cursor location.

"The K-Brush"—This is an extra name for the PB. In preferred modes, the PB can be applied (preferably according to the user's choice) at a current cursor location (with an optional StoLA effect/method if the user chooses) or with a "line to" from a prior cursor location.

"The L-Brush"—This is a combination of the "J-Brush" and "K-Brush". It is particularly useful for coloring "spikes" and details. In preferred modes, the "L-Brush" is a UPB with a smaller PB within it. In preferred modes, the "L-Brush" can be applied (preferably according to the user's choice) at a current cursor location (with an optional StoLA effect if the user chooses) or with a "line to" from a prior cursor location. Of course, software implementation should preferably not allow the UPB part of the "L-Brush" to unpaint the PB part, particularly for the user's currently-in-process use of the "L-Brush".

"The L2-Brush"—This is similar to the "L-Brush", but now the smaller brush applies temporary line art, such as temporary "artist's blue lines". This is particularly useful for quick and tight coloring of gappy and rough line art.

"The L3-Brush"—This brush is similar to the UPB (or to the PB), but with the extra effect of setting image point properties at its edges or outer boundary or inner boundary, according to the current properties of those image points. For example, its outer edge might set those image points to "painted" status and might set their "flow status". In particularly useful embodiments for grayscale line art processing, such as for grayscale photographs, after the current selections of the UPB (or PB), its outer edge pixels turn to "painted" status (with either selected or arbitrary color or segment affiliation), where the currently-darker grayscale colors get "opposite flow" status and the currently-lighter grayscale colors get "standard flow" status. This is particularly useful for tighter "color joins" when coloring photographs or line art with lots of different and/or similar colors.

"The L4-Brush"—This is similar to the UPB, but it does and does not affect certain image points, preferably specified by the user. For example, it might apply a UPB effect on yellow pixels, but not on red pixels, or not on non-yellow pixels. This is particularly useful when coloring areas with fine details. Preferably, the user can specify which image points (or image point characteristics) the brush affects, and which it does not affect.

"The L5-Brush"—In preferred modes, this tool is used for quick touch-ups of "painted image points". In particular, a user first clicks on a "painted image point", then "spreads" its properties (particularly its color or segment affiliation) to different image points. It is often useful for the applied effect to be limited to image points (such as a region or group of image points) with a certain selected color or segment affiliation or similar association.

"The L6-Brush"—Lets user toggle between a standard "lasso" tool and a "UPB".

13. New Terminology and Definitions

"Snap to Line Art"—The term "snap to line art" or "snap to line art effect/method" is used herein to refer to a herein-disclosed feature for a preferred mode for extra-fast and extra-rough selection of the line art's elements/areas/regions/items by the user. Specifically, as the user manipulates a (herein-disclosed) GUI-based or computer-interaction-based "Unpainted-Status Brush Tool", the brush's "unpainting" of image points (that is, setting their paint status property to "unpainted') is possibly applied at a location different from that of the user's actual selection. Exemplary embodiments of the "Snap to Line Art" feature are disclosed in this document, particularly in the Figures. In a preferred embodiment, the user, by way of a mouse or tablet or similar selection hardware, clicks and/or drags a special GUI-based brush tool (the "Unpainted-Status Brush Tool") across the line art, and the nearest line or weighted line or section of line art or region of line art is computed, and then the UPB is applied to the new and/or weighted location, not at the actual location of the user's GUI tool.

14. Exemplary and Preferred Embodiments of the "Snap to Line Art" Effect/Method The "Snap to Line Art" effect/method is a part of a preferred mode for the case when the present inventions are implemented as GUI-based software. In brief, the "Snap to Line Art" ("StoLA" for short) effect/method allows the user to easily position or drag the UPB at or around the line art, or approximately or near the line art, but the effect/method automatically applies the UPB at a different position such as at a better location (such as centered on the nearest line of line art), particularly when the user is encircling/outlining regions or items quickly and roughly. Furthermore, this effect/method applies equally to any chosen region of line art or graphics, including complex regions of line art or graphics, not just to literal "lines" of line art.

There are numerous ways to implement this effect/method, some of which are listed here as examples, including recommended/preferred approaches, including exemplary program code/pseudocode (e.g., FIGS. 36-39, the text of which is considered incorporated by reference here).

The user, when using GUI-based software, in a preferred mode, can—as desired—select to enable or disable the "Snap to Line Art" effect/method, depending on how much control the user currently wants to exert on the UPB, and how much the user wants the UPB to automatically shift to, for example, the line art lines. Furthermore, the user can select the type of StoLA effect/method, some examples of which are discussed in this section.

The StoLA effect/method, in brief, in a preferred mode, alters a user's cursor position coordinate (x,y) to a new position coordinate (xx,yy), which is for example weighted to the line art's lines. For example, a cursor's coordinate position can be weighted to a new location based on the darker pixels of the line art. Alternatively, the user can select to weight it to a new location based on the lighter pixels of the line art (for example, if the line art has light-colored lines on a dark-colored area). The StoLA effect/method can therefore be weighted based on darkness, lightness, or a combination, as the user or the programmer chooses.

In a preferred mode of the StoLA effect/method, weighting is based on the darkness (or alternatively, lightness) of pixels near the GUI cursor, in an "analysis region" whose shape (either connected or disjointed) and/or size—and/or location, preferably based on the user's cursor position—is either user-selected or computer-selected. An exemplary embodiment of this, using cubic-power weighting of pixels (which, in the context of the present inventions, tends to nicely balance "user control" and "automatic shifting"), is herein disclosed and shown in the sample program code/pseudocode in FIGS. 36-38. The code/pseudocode uses a power term, and a power of "3", but in preferred implementations the user is allowed to—when desired—select to change this power term, depending on how much "stickiness" or weighting the user currently chooses for the StoLA effect/method. For example, the GUI software's default might be power "3", as shown, but the user can alternatively choose a power of "2", or "1", to decrease the amount of the StoLA effect's/method's "stickiness/attraction-to-lines" and its weighting to darker pixels. Or, the user can increase the power term, to increase the amount that the UPB shifts to darker pixels. Or alternatively, the user can for example choose to multiply the grayscale color of a pixel by a scaling term, and/or add an offset term, and then apply a power.

(If a power term is implemented for the StoLA effect/method, then implementers should note that, as the power term increases, and/or as the size of the analysis region increases, the computations can yield numbers that are large and therefore need to be implemented with careful consideration of the data types used in the program code. In such cases, the prior-mentioned scaling/offset term is a useful option, for lowering powers.)

Furthermore, the "analysis region", in which the line art pixels are considered and then preferably weighted, does not need to be the same size or shape as the UPB. Preferably, the user or computer selects an analysis region that is larger than the lines of the line art, for best results, but the UPB does not need to do this. For example, the UPB might be a square or circle of size "5 pixels", while the StoLA effect's/method's "analysis region" is for example much larger, such as "25 pixels". Typically, preferably, the UPB will similarly be the same or larger size than the line art's line thickness, at the location of use.

The sample code/pseudocode (e.g., FIGS. 37-38) is designed to weight for darker pixels, but omitting the "256-gsc" terms, then replacing them with "1+gsc" terms, causes the effect/method to weight to lighter pixels instead.

The sample code/pseudocode (e.g., FIGS. 36-39) assumes grayscale line art, which is the most common case for comics and animation, but multi-colored line art can similarly be weighted or processed, according to the colors rather than the grayscale colors, according to the user's or programmer's preferences (e.g., FIG. 36). In addition, for example, rather than a grayscale color number as the metric for position shifting, the software could instead use a metric based on the RGB components, for example weighting position based on lower green color components or lower green color perception (such as for "green screen" or "chroma key" graphics processing), or weighting based on a chosen combination of RGB components.

Note that the term "Snap to Line Art" refers to a typical use, but the effect/method is not limited to lines or line art lines. It can be applied to any analysis region, such as a region containing large sections of dark or light pixels, not just literal line art lines.

The sample code/pseudocode uses power-based weighting, to weight the darkness, or lightness, of pixels in the analysis region. Alternatively, the pixels in the analysis region can be weighted according to the nearest darkest pixel to the cursor (such as when the user is coloring/flatting next to a large section of black colors), or to the nearest darkish pixel according to a user-selected or computer-selected threshold, or to the nearest area of largest color contrast in the analysis region (such as when the user is coloring/flatting next to a complex and/or large region of black and white colors), or etc. Or, extra-weight dark or light pixels by nearness to the cursor. Alternatively, the pixels are not weighted, or are averaged, such as with a weight of "1" for all pixels, and a simple center point is computed. For example, a "center of mass" computation can be employed, with lightness or darkness of a pixel representing the pixel's "mass". Alternatively, the pixels are not weighted, and the nearest darkest point is used as the new, shifted location—such as when the user is coloring/flatting next to a large section of black colors. Alternatively, rather than setting the analysis region to, for example, a fixed 10-by-10 region of pixels around the UPB cursor, the analysis region can iterate across an increasing set of sizes, to calculate for example the nearest pixel based on these combinations, or to weight the set of combinations, or etc. For example, to weight pixels by their nearness to the cursor, in addition to weighting by the pixels' darknesses or lightnesses.

The sample code/pseudocode (FIGS. 36-39) references a "UPB cursor" in particular, as a preferred mode, but the StoLA process/effect/method can be applied to any cursor, pointer, reference point, etc., including for example a "PB cursor". Furthermore, the StoLA effect/method can be used to position a standard lasso tool, such as the lasso tool in common graphics-editing software applications/products. For example, to better position a lasso tool when flatting or trapping line art or graphics.

An extra application is to use the StoLA effect/method to facilitate region or item selection when using a smartphone, tablet, etc. Specifically, it allows rough encircling and selections, in general, not just in the context of coloring line art or graphics.

The user is preferably permitted to select snapping to different types of art or lines or colors or intensities, such as snapping to "artist's blue lines", perspective lines, or etc. The StoLA effect/method can also be used to assist with the placing of standard "lasso" tools, such as in the centers of lines, or placing "lasso" points. In addition, the user preferably is permitted to choose which layer or layers are used for the StoLA effect.

15. Exemplary Approaches for Inputting and Outputting Data Sets

Herein-disclosed methods start with the acquisition of a set of "image points", each with a "paint status" of either "unpainted image point" or "painted image point"—i.e., "unpainted" or "painted"—and then produce a set of "image points" with color and/or segment data representing a coloring, or flatting, or trapping, or selection, or segmentation, of the inputted data.

There are numerous possible ways to input starting data into a computer, prior to implementing the herein-disclosed methods. In one exemplary approach, a single graphics image can be inputted. For example, a graphics image with anti-aliased grayscale pixels tagged as "unpainted image points", representing portions of an original "line art" image, and colored pixels tagged as "painted image points", representing coloring and/or segmentation suggestions. (For efficiency in the most common workflows, grayscale colors could mean "unpainted" status, and non-grayscale colors could mean "painted" status.) One of the herein-disclosed coloring methods is then implemented, resulting in, for example, a single image with flatted and trapped colors. This resulting "flats layer" can then be combined with the original "line art layer", such as by using the common "Multiply mode" approach, in order to produce the final, colored, "production image" result. Or, the line art layer and flats layer can be retained as two layers—such as for the final "production image" result for CMYK print production of comics.

In a different exemplary approach, the user inputs multiple graphics images, each containing different sets of method-related data. For example, the first graphics image to be inputted can be an anti-aliased "line art layer" grayscale image representing a comic frame or page, or an animation frame, or photo, etc., which a user wants to color. Next, for example, the user can input a second grayscale image, representing "artist's blue lines" that are intended as "line art" lines or pixels or pixel regions that should affect the coloring but which should not show up in the final "production image". For example, supplementary or additional line art lines that outline adjoining sections that artists should color with different colors, or that establish gap-blocking lines or checkerboard outlines. In brief, the pixels representing the "artist's blue lines" (for example, grayscale pixels might mean "artist's blue line", and white pixels might mean "ignore", or perhaps an "alpha=0" might mean "ignore" which would then allow specification of black, gray, and/or white "artist's blue lines") are then added onto the "line art layer", as if they were a part of the first and original line art layer. Next, for example, the user can input a third image, representing the "painted image points" and/or "blobs" (such as herein-defined "color blobs") for the method. For example, a pixel with "alpha=255" might mean a "color blob"; and a pixel with "alpha=0", or with a color equal to some specific color, might mean "ignore". The "painted image points", or the "blobs", can then be added onto the prior layer representing the line art lines plus "artist's blue lines". A herein-disclosed method is then implemented, which results in the inputted and combined image being transformed into the colored, flatted, trapped, or segmented, output result. This resulting "flats layer" can then be combined with the original line art layer, for example such as with the "Multiply mode" technique, to generate the final "production image" result.

In a different exemplary approach, the method's "painted image points" can be tracked on a "flats layer", rather than adding them to the prior images, thus keeping the line art layer and "artist's blue lines layer" intact, such as for reference purposes.

In a different exemplary approach, the "artist's blue lines" pixels are not inputted as grayscale, but instead are simply added as literally blue-colored pixels to the "reference colors" "iterations list", at ordered locations representing, for example, their grayscale intensity, or a scaling of their grayscale intensity (for example darker or lighter than their grayscale intensity).

In a different exemplary approach, the inputted "line art layer" already contains the "artist's blue lines". After implementation of a herein-disclosed method, the resulting "flats layer" is then "Multiply mode" combined with the original line art layer, not with the inputted "line art plus artist's blue lines" layer.

In a different exemplary approach, rather than track the method's computations on a "flats layer" or on multiple layers, the "Multiply mode" final product can be tracked throughout the implementation of the method, for example by tracking the status properties, color properties, multiply mode colors, etc., for each pixel, in a properties-tracking array, rather than by processing the input and output images directly. The array's final tracked properties and statuses can then be outputted in any form desired, such as a graphics image based on the flats and "blobs" properties, or based on the combined final "Multiply mode" result, or etc.

16. System Terminology and Definitions

The term "processing device" refers to any data-processing apparatus or system or computer capable of implementing an embodiment of the method(s) specified herein. A processing device can be a general purpose computer or system that becomes a specific purpose computer or system when implementing an embodiment of the specified method(s). It can be a single apparatus, such as a general purpose computer, or it can comprise a plurality of component processing devices, including distributed or networked computers or systems. The processing device can comprise any suitable architecture consistent with implementing the method(s). In general, a processing device or data processing system is defined as an arrangement of a processor or processors in combination with either memory or peripherals, or both, performing data processing. (A peripheral is defined as a functional unit that transmits data to or receives data from a computer to which it is coupled, such as keyboards, monitors, printers, disk and tape drives, etc.)

The term "processor" refers to an apparatus or system, whether general purpose or customized to a specific purpose, whether local or distributed, capable of performing the computational steps of the specified method(s), and is defined in general as a functional unit that interprets and executes instruction data. Examples include but are not limited to: a single CPU with single or multiple cores, a plurality of CPUs each with either single or multiple cores, one or more GPU/GPGPUs, one or more FPGAs, one or more ASICs, or any combination of such elements. In a preferred embodiment, a combination of such processing elements will be used to implement the specified method(s). The term "processor" is used to refer to any such combinations.

It is to be understood that the present invention(s) can be implemented in various forms of hardware, software, firmware, special purpose processes, or a combination thereof.

The term "memory" or "computer memory" refers to a functional unit to which data can be stored and from which data can be retrieved. Examples include random-access memory (RAM), read-only memory (ROM), etc. In a preferred embodiment, the herein-disclosed system's "memory" will comprise multiple types of memory or computer memory, such as computer RAM, CPU registers, GPU global DRAM, GPU shared RAM, etc.

The term "display device" refers to an apparatus or system capable of displaying the method(s)'s computed colors or data, whether they then be in numerical form, alphanumerical form, binary form, graphical or visual form, or etc. Examples include printers, computer monitors, display screens, projectors, etc.

The term "storage device" refers to an apparatus or system capable of temporary or permanent storage of color information or data computed by the herein-disclosed system(s) or method(s). Examples include hard drives, compact discs, physical or digital film, RAM memory, ROM memory, etc.

The term "output device" refers to an apparatus or system capable of acquiring color information or data computed by the herein-disclosed system(s) or method(s). Examples include display devices, storage devices, and also computers or processors.

The terms "input interface" and "output interface" are defined as in the art. In general, an "input interface" is any combination of means, such as electronic or graphical, by which a processor or processing device are connected to an input device (such as a keyboard, disk drive, or general data source) so that data can be transferred to the processor or processing device. In general, an "output interface" is any combination of means, such as electronic or graphical, by which a processor or processing device are connected to an output device (such as a disk drive, computer monitor, or printer) so that data can be transferred from the processor or processing device to the output device.

Figure 5:
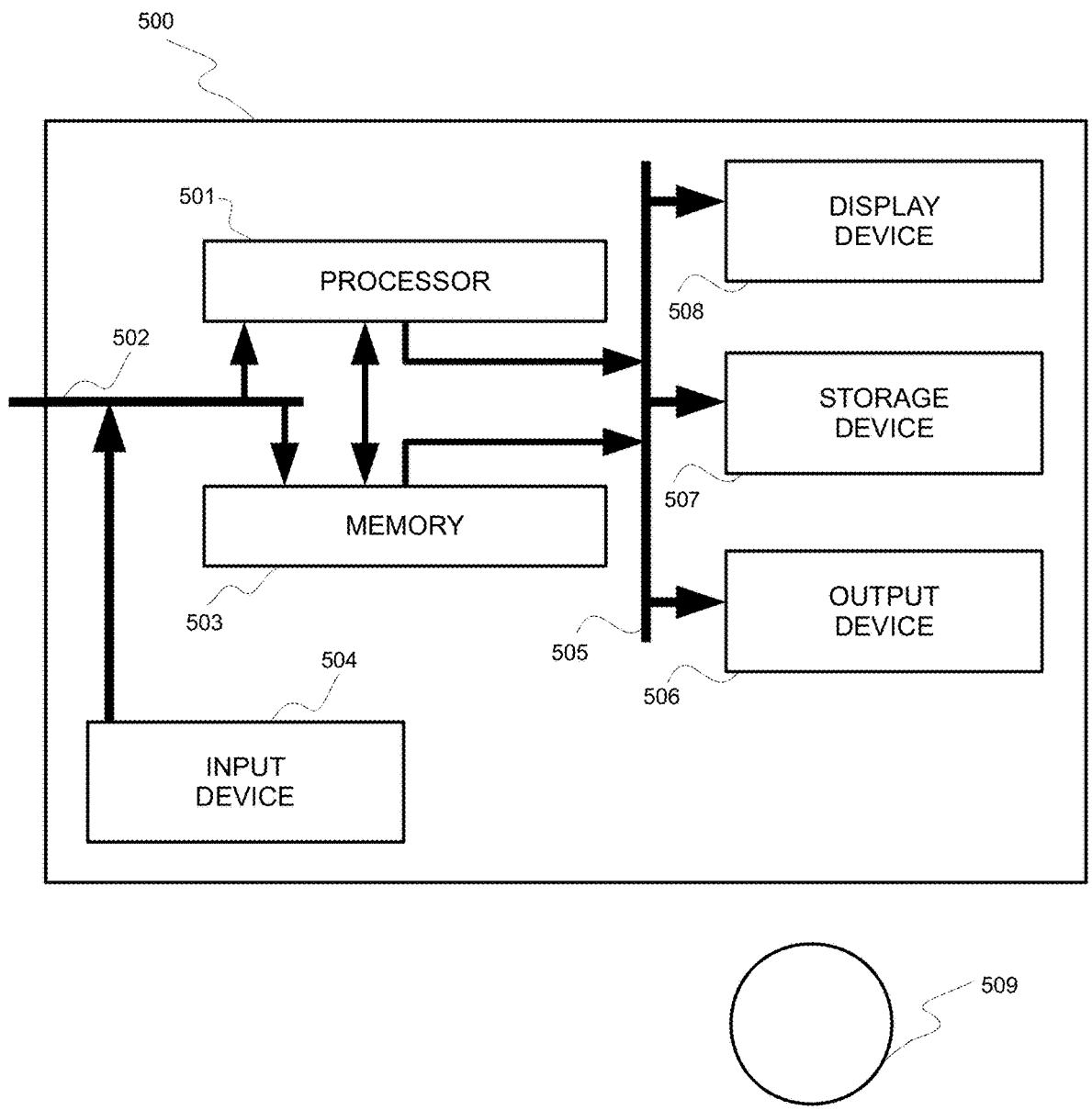
FIG. 5 is a block schematic diagram of a preferred system for implementing the herein-disclosed methods, according to an embodiment of the disclosed inventions.

The arrows in FIG. 5 that are associated with the input interface and the output interface are intended to represent the general direction of data flow, and for ease do not represent the two-way communication that is typically necessary with processors, input interfaces, output interfaces, input devices, and output devices.

17. Extra Implementation Tips, and Comments

The present inventions can be implemented as software, but speeding up the software will depend on the programming language or scripting language used, and on the hardware used. For example, multi-dimensional arrays are extremely slow and inefficient in some programming languages, linked lists are inefficient in certain programming languages, etc. Therefore, this section will discuss speedup and efficiency tips which will work in general.

Since the present inventions contain lots of independent tasks (such as analyzing a UPIP/pixel for adjacent PIPs/pixels, or flowing a PIP's/pixel's color or "segment" property to nearby UPIPs/pixels), the present inventions can be parallelized easily, for example as threaded tasks running on multiple processor cores, or as tasks or computations running in extreme parallel on a GPU.

Flattening multi-dimensional arrays into single-dimensional arrays, offers significant software speedups in programming languages that do not automatically flatten arrays. In such cases, x-and-y coordinates can be replaced by flattened array indexes, and simple calculations can transform the array indexes to x-and-y coordinates when needed.

Significant speedups can be obtained by tracking only the edges and borders of PIP regions/blobs and UPIP regions/blobs, or by tracking only image points that are current candidates for processing such as in the case of the herein-disclosed "jump"-related properties.

Colors, such as RGB or RGBA colors, and herein-disclosed method-related properties, such as "paint status" or "jump distance", can sometimes be processed efficiently by being replaced by a list index which references a list where such properties are stored. Furthermore, if the list index ordering is arranged to correspond to the "priority property" ordering of the associated colors/segments, then "priority" computations are more efficient since they can be based on the list index.

Significant speedups can be obtained by tracking an image point's UPIP and PIP colors simultaneously, for example in the same set of RAM locations rather than in different arrays (for example, by using an 8-byte "long" data type to store two 3-byte colors and two extra bytes of status properties, or to store two 4-byte colors), then also using a bit to track "paint status" (for example in the same set of RAM locations) in order to specify whether that image point is currently acting as a UPIP or a PIP. In prototype software, this eliminated the need for lots of image point copying and lots of array accesses. This also facilitates tasks such as complex herein-disclosed "extension flow" computations, such as when the color/segment flow depends on a PIP's original UPIP "line art" color.

In addition to a "paint status" bit, and bits to represent an image point's properties, significant speedups can be obtained by using bits to track which directions a PIP can currently flow its color/segment to, or to efficiently track whether a UPIP is adjacent to a PIP and might therefore need to absorb its color/segment. For example, if a second PIP is placed to the north of a first PIP, the first PIP can use a "north-tracking" bit which is set to "1", to signify that the first PIP is halted or blocked in that direction (such as for non-"jumping" flows). Then, determining whether the PIP can be ignored for future processing, or to determine which directions it can flow, simply requires a single rapid bit op (for example, against a 4-bit or 8-bit number, with a "halting or blocking bit" for each 4-adjacent or 8-adjacent direction), and a single rapid equality test.

When tracking the outer edges of PIP blobs or UPIP blobs, significant speedups were obtained in prototype software, particularly in the context of "coloring-book"-style flatting with large unpainted areas or large numbers of UPIPs, by storing the next set of edge-pixel prospects (such as their flat array indexes), in multiple lists, with a list for each flow direction. To compute the next outer edge, a merge (similar to a merge sort's merge step) was performed on the multiple lists, with duplicate pixels discarded during the merge. This process increases computation multi-fold, but these extra computations were outweighed by the benefits of the resulting speedups, especially for "coloring-book"-style flatting with large unpainted areas, and the merge furthermore ensured consistent processing sequences for PIPs and UPIPs. In practice, a user can be allowed to select which of these styles of speedup they prefer, based on their current workflow. (For example, the user may select to enable/use this technique in GUI-based software implementations of the present inventions, when using "coloring-book"-style flatting with large unpainted areas.) (It should be noted that "coloring-book"-style flatting can be speeded up easily on the user's end, by using the herein-disclosed "bucket-fill clean-up"-style flatting technique, such as to lower the number of "unpainted image points" which must be painted.)

Coloring/segmentation results were better in practice when there was a consistency to the processing sequence of PIPs, UPIPs, and color/segment flows. For example, flowing PIP colors/segments randomly was fast, but often resulted in awkward "color joins" in the case of complex line art. Instead, better results were obtained by processing PIPs and UPIPs in a consistent sequence, such as sequenced by their x-and-y coordinates, or by tracking the outer edges of PIP blobs and processing the PIP blobs sequentially.

Prototype software was successfully implemented in multiple ways, for example by focusing on PIPs and where to flow them to, and for example by focusing on UPIPs and what flows to them. Furthermore, the prototypes were successfully implemented in multiple ways with multiple different structures: stack structures, queue structures, list structures, hash tables, array-based list structures, etc. An implementer's particular choices will depend on the programming language or scripting language chosen and on the computer hardware chosen. For example, non-array structures are inefficient and slow in certain programming languages. Also for example, scripting languages often lack the efficient structures and parallel-processing that are allowed in some programming languages.

Extremely large speedups can be obtained by performing a flood fill when a UPIP is painted to a PIP. The flood fill expands from the UPIP, and affects UPIPs that would be affected by the PIP's flow if the PIP were "threshold adjacent". This approach is better suited to line art that doesn't require accurate "color joins" when different PIP blobs are contained in the same enclosed regions, or to line art that doesn't contain different PIP blobs in the same enclosed regions (for example, cartoon-style line art), or to line art that doesn't require accurate trapping (for example, digitally-distributed comics or animations), or etc.

In regard to the herein-disclosed "StoLA" effect/method: if a power term is implemented for the StoLA effect/method, then implementers should note that, as the power term increases, and/or as the size of the analysis region increases, the computations can yield numbers that are large and therefore need to be implemented with careful consideration of the data types used in the program code. In such cases, the herein-disclosed scaling/offset term is a useful option, for lowering powers.

It should be further noted that "two-color" line art is herein intended as including cases and design-arounds such as "black and transparent/alpha", rather than the typical "black and white" two-color line art. For example, the RGBA color of "0,0,0,255" (black-colored opaque pixel) can be reasonably considered distinct from the RGBA color of "0,0,0,0" (black-colored transparent pixel); and a design-around that changes black-and-white line art to, for example, black-and-transparent line art, prior to processing, is considered within the spirit and scope of the present inventions.

18. Extra Tips and Comments

The "production image/graphic" does not need to be a combination of the line art layer and the computed flats layer, e.g. it might be just the computed flats layer. This is a particular art style in comics, art, etc.

Using the herein-disclosed UPB, PB, StoLA effect, or etc., in conjunction with pure black-and-white art or line art, is well suited to comics, etc., plus it offers herein-disclosed new capabilities in the art processes.

For the case of art containing large darker regions next to large lighter regions (which is common in some comics art styles), or shadows next to lighter regions, it is recommended that, in general, "opposite flow" flow status be used for coloring the darker regions. This will offer better color joins between the regions.

The disclosed coloring/segmenting methods can be used to segment an image or art; the segmentation can then be used to easily select sections for color or effects processing, such as color tinting or color effects or image effects for a color photo, or parts/segments of it.

The disclosed "flow status" offers better-fit colorings or segmentations in the case of complex-colored graphics. For example, using "opposite flow" and "standard flow" statuses, for better edges, such as in areas with complex coloring.

The disclosed "extension flow" offers easy coloring of complex-colored graphics, such as complex art or line art or photographs. The user still just roughly and quickly encircles the items.

The herein-disclosed compositing techniques can be applied to images, frames of motion images, etc. For example, compositing frames from a line-art-style puppet, or frames from a line-art-style object model or city model (put PIP-like blobs, for auto processing), etc., for efficient animation, i.e. no rotoscoping is necessary. With a "Multiply mode" combination for compositing, such as discussed for FIG. 34, shadows or highlights or textures can be kept, for interesting effects.

19. Exemplary Embodiments of the Inventions

In the simplest embodiments of the herein-disclosed inventions, the line art is grayscale (with possible anti-aliasing) or pure black-and-white, and the user only wants "standard flow" PIPs, for example for coloring graphics when lighter regions are bounded by darker borders (such as for cartoon-style line art). Software implementations are particularly fast in this case, since there is no need for computation of jumps, complex flow statuses, etc.

In a typical simple embodiment, the user inputs the grayscale (or pure black-and-white) line art, and specifies one or more colored/non-grayscale "PIP blobs", placed either on the same image or on a different image/layer. In the simplest embodiment, with a single image/layer, the grayscale (or pure black-and-white) line art pixels are considered the UPIPs, and the user's specified colored pixels (non-grayscale, or non-black-and-white) are the PIPs.

Figure 2:
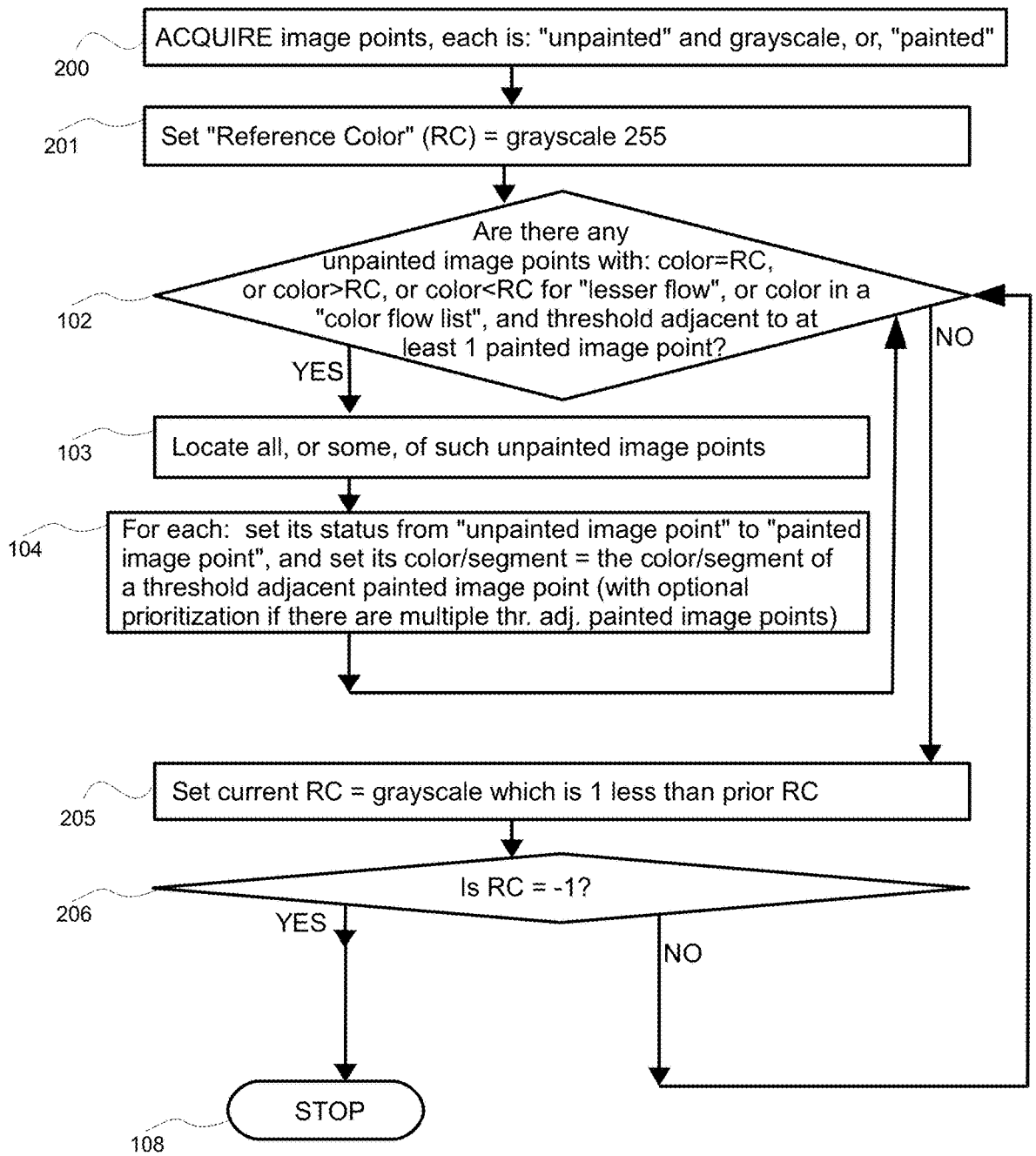
FIG. 2 is a flow sheet diagram for a method according to a preferred embodiment of the disclosed inventions, for the case of grayscale graphics, including anti-aliased graphics, and including black-and-white graphics.

Refer now to FIG. 2 which is a flow sheet diagram for a method according to a preferred embodiment of the disclosed inventions, for the case of grayscale graphics, including anti-aliased graphics, and including black-and-white graphics.

The coloring/flatting/trapping process proceeds, as shown in FIG. 2, after the acquisition (200) of the user's image points, which are either UPIPs (in the simplest case, grayscale pixels) or PIPs (in the simplest case, non-grayscale pixels), according to the user's choices. In an exemplary embodiment of this preferred mode for grayscale line art, with the standard grayscale color range of "0" to "255", a "reference color" ("RC", in the Figures) is then set (201) to the color "grayscale=255 (white)" (or, similarly, set to an integer "255").

The software (or firmware, hardware, processor, etc.) then determines (102) whether there are any UPIPs whose grayscale color (or integer) equals the "iteration's" "current reference color" (or its integer), or whose grayscale color (or integer) is greater than the "current reference color" (or its integer)—or, whose grayscale color (or its integer) is consistent with the definitions of the "flow statuses" and "color flow lists" as defined herein, in the more complex case of the user wanting PIPs with "lesser flow" statuses (such as "opposite flow", "multi-flow", "multi-multi-flow", etc.) or wanting PIPs with "color flow lists". The user can in general choose one or more of these criteria, but in a preferred mode (particularly as a software default), all of these criteria are considered, particularly the first two (which are sufficient for "standard flow" PIP processing). The software (or processor, etc.) further determines (102) whether any such UPIPs are also "threshold adjacent" to at least one PIP, with "threshold adjacency" preferably chosen by the user. As a simple and preferred software default, "threshold adjacency" is, for all PIPs, either 4-adjacency or 8-adjacency, according to the user's choice. (In more complex workflows, as discussed earlier, the user can for example specify which PIPs should "flow" their properties to UPIPs based on 4-adjacency, which PIPs should "flow" based on 8-adjacency, which PIPs should "flow" based on nearest-PIP adjacency, etc., and the user can set the disclosed "jump" properties for PIPs' flows.)

If there are no UPIPs that meet the criteria, then the "current reference color" is decreased (205) to a darker gray, for example by decreasing the "current reference color" integer from "255" to "254".

But, if the decrease (205) takes the "current reference color" out of range (206) for the image points, such as by decreasing below "grayscale=0" (or, alternatively, decreasing below a user-selected or computer-selected lower range), such as by decreasing to "grayscale=−1", then the current coloring/processing can stop (108). The result is a set of image points that are "painted", according to coloring/flatting/trapping consistent with the user's choices of UPIPs, PIPs, and image point properties.

In contrast, if the decrease (205) does not take the "current reference color" out of range for the image points, then the coloring process can continue with the new "current reference color", and jump back to the determination step's test (102).

At any stage of the process, if the determination step's test (102) is affirmed, and therefore currently there are in fact UPIPs with appropriate color properties and which are each "threshold-adjacent" to at least one PIP, then the next step is to locate (103) some or all of such criteria-meeting UPIPs. ("Locating" includes processing directly without explicit location, for example if such points are tracked in, for example, a list structure. This was a speedup used in some prototypes of the present inventions.) In a preferred embodiment, and in a preferred default setting (such as for software implementations), all such criteria-meeting UPIPs are located/processed, and are processed preferably in a regular and consistent sequence, e.g. top-left to lower-right, for uniformity of results.

Alternatively, only "some" of the criteria-meeting UPIPs are located/processed—for example, if the user chooses to not process some of them, or for example, in a preferred mode for the flood-fill-based speedups (discussed herein) when a pixel changes from UPIP to PIP. That is, the flood-fill that starts at the pixel that changes from UPIP to PIP, will potentially process and color and transform numerous image points from UPIPs to PIPs, regardless of whether or not these transformed UPIPs were in the latest set of criteria-meeting UPIPs.

For each of the (some or all) criteria-meeting UPIPs that are chosen to be currently processed, a processing step (104) for criteria-meeting UPIPs is implemented. In a preferred embodiment, the following steps are performed for each of the currently-chosen criteria-meeting UPIPs: that particular UPIP's "paint status" is changed from "unpainted" to "painted" (this is the preferred UPIP, but in general and broad terms, any UPIP could get processed), and its color and/or segment affiliation (and/or any chosen property, in general) is set to that of one of its "threshold-adjacent" PIPs. If there are multiple PIPs that are "threshold adjacent" according to the user's or computer's selection of "threshold adjacency", then the particular UPIP can take on the color/affiliation based on the PIPs's "priority properties". Software implementations can use a default "priority property", such as prioritizing PIPs according to their color components, or a color index, etc. Such default priorities are recommended if the user does not explicitly select PIP priorities, since priorities create smoother "color joins" by their consistent selections of color/segment flows. After the chosen set of (some or all) criteria-meeting UPIPs are processed, the implementation preferably returns to the determination step (102).

20. Exemplary Embodiments, for GUI

In the simplest embodiments of the herein-disclosed inventions, in the context of GUI-based software for users, the steps proceed largely as discussed in the prior section and as shown in FIG. 2. That discussion will not be repeated in this section, but is here incorporated by reference.

Figure 4:
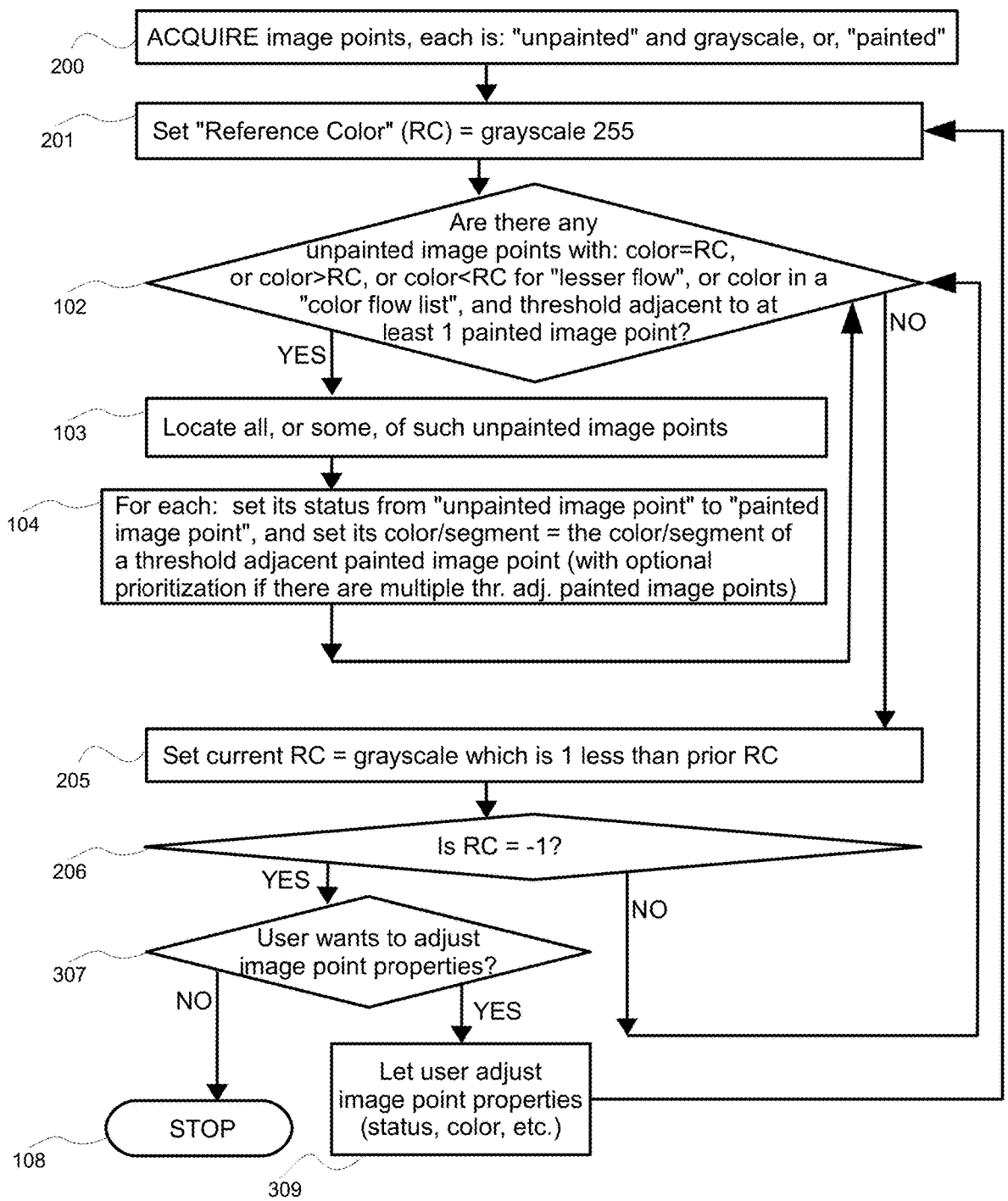
FIG. 4 is a flow sheet diagram for a method according to an alternative exemplary embodiment of the disclosed inventions, for the case of grayscale graphics, including anti-aliased graphics, and including black-and-white graphics, and particularly for GUI-based implementations.

Refer now to FIG. 4 which is a flow sheet diagram for a method according to an alternative exemplary embodiment of the disclosed inventions, for the case of grayscale graphics, including anti-aliased graphics, and including black-and-white graphics, and particularly for GUI-based implementations.

The coloring/flatting/trapping process proceeds, as discussed in the prior section and as shown in FIG. 2. The difference now, as shown in FIG. 4, is that after the test (206) for an out-of-range "current reference color", if it is determined that it is indeed out of range, then rather than stopping the steps (108), the user is offered an option or a chance (307) to manipulate the image points and their properties—such as by using the UPB and/or PB, such as in the context of "back-to-front"-style flatting. If it is determined that the user does not want to continue, the process stops (108). But, if the user does accept the option to continue, accepting either explicitly (for example, by a selection to continue) or implicitly (for example, by selecting and using the UPB and/or PB), then the user is permitted to alter or adjust (309) the image points and/or their properties. When the user's adjustments are complete, the user can preferably re-run the color-processing routine from the early steps (201), to repeat the process, to yield a next coloring/flatting/trapping. This is particularly appropriate for "back-to-front"-style flatting.

21. General Embodiments of the Inventions

In the general embodiments of the herein-disclosed inventions, the line art is not necessarily grayscale (or black/white), and can possibly include multiple different non-grayscale colors in any colorspace (such as RGB, RGBA, CIE, etc.), anti-aliasing, etc.

In a typical embodiment, the user inputs the line art (which is not necessarily grayscale, i.e. might be multicolored), and specifies one or more "PIPs" or "PIP blobs" and one or more "UPIPs" or "UPIP blobs". That is, the user sets a "paint status" for some of the image points, each as "painted status" or "unpainted status". Typically, the user will select some "PIPs", then UPIPs are non-PIPs.

Refer now to FIG. 1 which is a flow sheet diagram for a method according to a preferred embodiment of the disclosed inventions, for the case of multi-color graphics.

The coloring/flatting/trapping process proceeds, as shown in FIG. 1, after the acquisition (100) of the user's image points, which are either UPIPs or PIPs, according to the user's choices. Based on the colorspace or "broad colorspace" of the UPIPs and PIPs, a "reference color" is then set as chosen (101), e.g. chosen either by the computer (e.g., based on the colors of the inputted image points) or by the user.

The software (or firmware, hardware, processor, etc.) then determines (102) whether there are any UPIPs whose color equals the "iteration's" "current reference color" (according to a user-selected or computer-selected color ordering), or whose color is greater than the "current reference color"—or, whose color is consistent with the definitions of the "flow statuses" and "color flow lists" as defined herein, in the more complex case of the user wanting PIPs with "lesser flow" statuses (such as "opposite flow", "multi-flow", "multi-multi-flow", etc.) or wanting PIPs with "color flow lists". The user can in general choose one or more of these criteria, but in a preferred mode (particularly as a software default), all of these criteria are considered, particularly the first two (which are sufficient for "standard flow" PIP processing). The software (or processor, etc.) further determines (102) whether any such UPIPs are also "threshold adjacent" to at least one PIP, with "threshold adjacency" preferably chosen by the user. As a simple and preferred software default, "threshold adjacency" is, for all PIPs, either 4-adjacency or 8-adjacency, according to the user's choice. (In more complex workflows, as discussed earlier, the user can for example specify which PIPs should "flow" their properties to UPIPs based on 4-adjacency, which PIPs should "flow" based on 8-adjacency, which PIPs should "flow" based on nearest-PIP adjacency, etc., and the user can set the disclosed "jump" properties for PIPs' flows.)

If there are no UPIPs that meet the criteria, then the "current reference color" is decreased (105), according to a user-selected or computer-selected color ordering. I.e., set the "current reference color" to a color "less than" the prior reference color (i.e., the prior reference color is technically current before the new "current reference color" is set), if can and if desired.

But, if the decrease (105) takes the "current reference color" out of range, or if the computer (or user, etc.) determines (106) that there are no more "current reference colors" to process (according to the user's or computer's choice of reference colors), then the current coloring/processing can stop (108). The result is a set of image points that are "painted", according to coloring/flatting/trapping consistent with the user's choices of UPIPs, PIPs, and image point properties.

In contrast, if the decrease (105) does not take the "current reference color" out of range for the image points, or if the computer (or user, etc.) determines (106) that there are more "current reference colors" to process (according to the user's or computer's choice of reference colors), then the coloring process can continue with the new "current reference color", and jump back to the determination step's test (102).

At any stage of the process, if the determination step's test (102) is affirmed, and therefore currently there are in fact UPIPs with appropriate color properties and which are each "threshold-adjacent" to at least one PIP, then the next step is to locate (103) some or all of such criteria-meeting UPIPs. ("Locating" includes processing directly without explicit location, for example if such points are tracked in, for example, a list structure. This was a speedup used in some prototypes of the present inventions.) In a preferred embodiment, and in a preferred default setting (such as for software implementations), all such criteria-meeting UPIPs are located/processed, and are processed preferably in a regular and consistent sequence, e.g. top-left to lower-right, for uniformity of results.

Alternatively, only "some" of the criteria-meeting UPIPs are located/processed—for example, if the user chooses to not process some of them, or for example, in a preferred mode for the flood-fill-based speedups (discussed herein) when a pixel changes from UPIP to PIP. That is, the flood-fill that starts at the pixel that changes from UPIP to PIP, will potentially process and color and transform numerous image points from UPIPs to PIPs, regardless of whether or not these transformed UPIPs were in the latest set of criteria-meeting UPIPs.

For each of the (some or all) criteria-meeting UPIPs that are chosen to be currently processed, a processing step (104) for criteria-meeting UPIPs is implemented. In a preferred embodiment, the following steps are performed for each of the currently-chosen criteria-meeting UPIPs: that particular UPIP's "paint status" is changed from "unpainted" to "painted" (this is the preferred UPIP, but in general and broad terms, any UPIP could get processed), and its color and/or segment affiliation (and/or any chosen property, in general) is set to that of one of its "threshold-adjacent" PIPs. If there are multiple PIPs that are "threshold adjacent" according to the user's or computer's selection of "threshold adjacency", then the particular UPIP can take on the color/affiliation based on the PIPs' "priority properties". Software implementations can use a default "priority property", such as prioritizing PIPs according to their color components, or a color index, etc. Such default priorities are recommended if the user does not explicitly select PIP priorities, since priorities create smoother "color joins" by their consistent selections of color/segment flows. After the chosen set of (some or all) criteria-meeting UPIPs are processed, the implementation preferably returns to the determination step (102).

22. General Embodiments, for GUI

In the general embodiments of the herein-disclosed inventions, in the context of GUI-based software for users, the steps proceed largely as discussed in the prior section and as shown in FIG. 1. That discussion will not be repeated in this section, but is here incorporated by reference.

Figure 3:
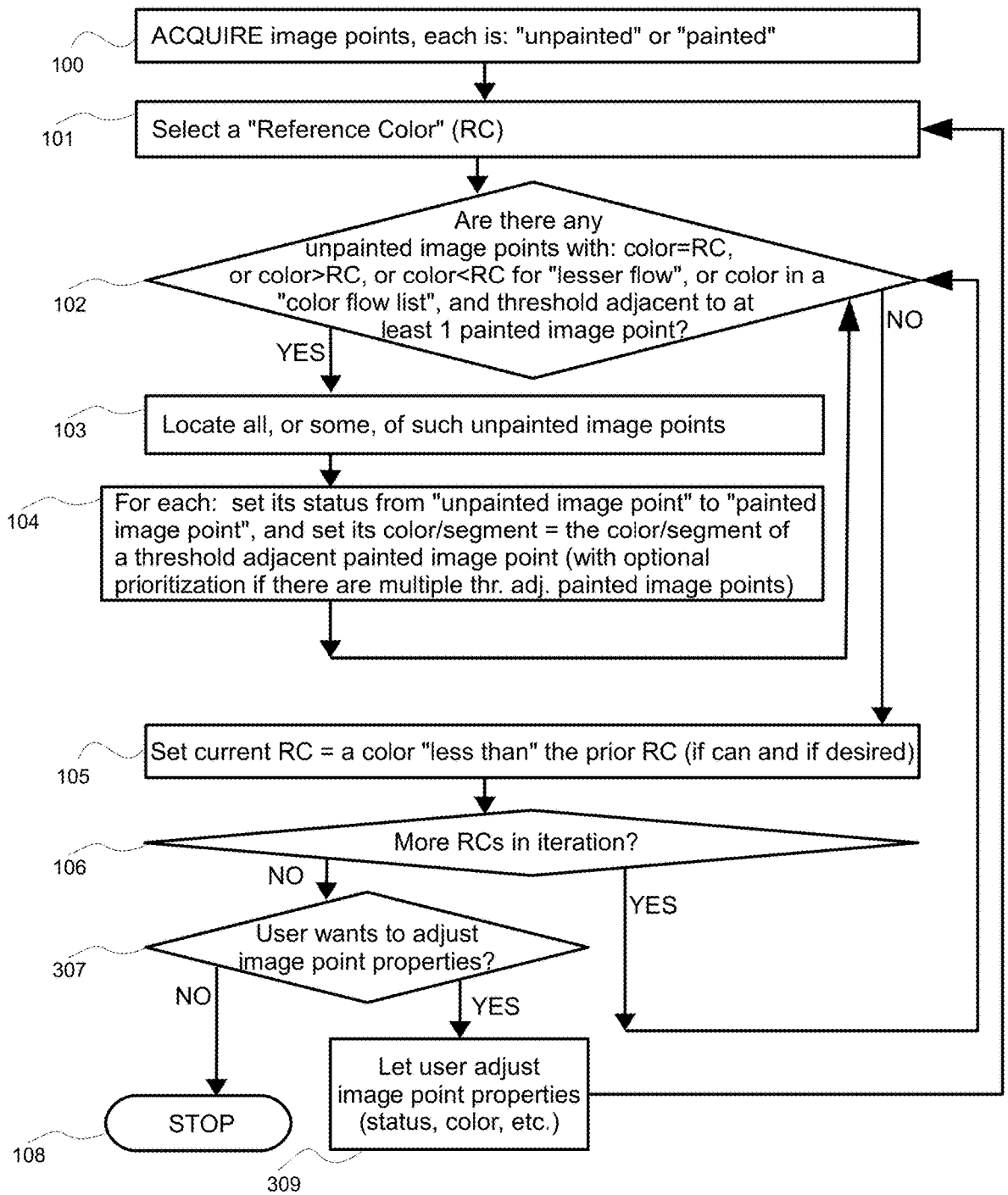
FIG. 3 is a flow sheet diagram for a method according to an alternative exemplary embodiment of the disclosed inventions, for the case of multi-color graphics, and particularly for GUI-based implementations.

Refer now to FIG. 3 which is a flow sheet diagram for a method according to an alternative exemplary embodiment of the disclosed inventions, for the case of multi-color graphics, and particularly for GUI-based implementations.

The coloring/flatting/trapping process proceeds, as discussed in the prior section and as shown in FIG. 1. The difference now, as shown in FIG. 3, is that after the test (106) for whether the user or computer wants to process an extra "current reference color" (e.g., after testing for an out-of-range "current reference color"), if it is determined that there are no more "current reference colors" to process (i.e., it is indeed out of range), then rather than stopping the steps (108), the user is offered an option or a chance (307) to manipulate the image points and their properties—such as by using the UPB and/or PB, such as in the context of "back-to-front"-style flatting. If it is determined that the user does not want to continue, the process stops (108). But, if the user does accept the option to continue, accepting either explicitly (for example, by a selection to continue) or implicitly (for example, by selecting and using the UPB and/or PB), then the user is permitted to alter or adjust (309) the image points and/or their properties. When the user's adjustments are complete, the user can preferably re-run the color-processing routine from the early steps (101), to repeat the process, to yield a next coloring/flatting/trapping. This is particularly appropriate for "back-to-front"-style flatting.

23. Preferred Embodiments of the System

FIG. 5 is a block schematic diagram of a preferred system for implementing the herein-disclosed methods, according to an embodiment of the disclosed inventions.

A set of "image points" data is acquired (100, 200) by a processing device (500), preferably by storing the data in a computer memory (503).

A "reference color" is selected (101, 201), either explicitly by a user (by way of an input interface (502) or an input device (504)), or by a computer (such as the processing device (500)) as a default or as computed on the processor (501) such as according to the inputted "image points" data. The "reference color" is preferably stored in the computer memory (503).

The processing device (500), particularly its processor (501), computes the test condition (102), and if applicable, computes/performs the location step (103) and performs/computes the update step (104). The results of the update step (104) are preferably stored in the computer memory (503).

If the results of the test condition (102) were "no", then a new "reference color" is computed on the processor (501) (or, e.g., inputted by the user), and preferably stored in the computer memory (503), as part of the "reference color" update step (105, 205). In a preferred mode, the new "reference color" is "less than" the prior "reference color", according to a user-selected or computer-selected (including for example a pre-set default) ordering of colors. In general and broad terms, the "reference color" update step (105, 205) can update to any desired new "reference color", such as for greater flexibility for the user, and such as to address competitor design-arounds. That is, a "less than" new color is a preferred mode, but is not required in actual practice, such as to allow unlimited flexibility for the user.

After, or as part of, the "reference color" update step (105, 205), the processing device (500) (or, e.g., the processing device by way of or intervention by the user) determines (106, 206) whether there are any more "reference colors" to consider. For example, if the grayscale "reference color" hits/equals "−1" (or, similarly, hits/equals a user-selected or computer-computed or computer-selected lower bound), or for example, if the "iteration" of user-selected or computer-selected "list" of "reference colors" is complete. If the new "reference color" is acceptable by being in a user-selected or computer-selected allowable range, then computation can return to the test condition (102). If there are no new acceptable "reference colors" to consider, then the coloring process can either stop (108) or continue by allowing the user to indicate explicitly or implicitly that the user would like to continue (307), such as by way of interaction with the processing device (500) such as by taking action by way of an input interface (502) or input device (504). If the user would like to continue, such as preferably to the earlier steps (101, 201), the user can be allowed to modify (309) the image points (by way of an input interface (502) or input device (504)), particularly by modifying their properties, particularly by modifying their color/affiliation properties and "paint status" properties. The user can for example use GUI-based tools, such as the herein-disclosed UPB or PB.

The method's resulting data are thus formed in the computer memory (503) or on an output device (506), and are optionally displayed on a display device (508) such as a computer screen, or stored on a storage device (507) such as a disc, etc. Optionally, the resulting data can be outputted to an output device (506) (such as an Internet server) by way of an output interface (505).

The computer program instructions (such as machine language code, object code, assembly language code, pseudocode, or high-level language code) implementing a herein-disclosed method, such as for a computer system, may be stored on a non-transitory computer-readable storage device (509).

24. Comparing to the Background Art/Field

Figure 6:
FIG. 6 shows, for comparison purposes, a "background/prior art" and industry-standard technique for coloring/flatting and trapping/spreading comics line art, which (as is shown) entails scaling or scanning the line art (in this case, a comics "speech/text balloon") to large size, thresholding it to pure black-and-white line art, then carefully dragging a lasso tool through the centers of the art's lines.

FIG. 6 shows, for comparison purposes, a "background/prior art" and industry-standard technique for coloring/flatting and trapping/spreading comics line art, which (as is shown) entails scaling or scanning the line art (in this case, a comics "speech/text balloon") to large size, thresholding it to pure black-and-white line art, then carefully—and laboriously—dragging a lasso tool through the centers of the art's lines. Specifically, it shows the large scan size and pure black-and-white thresholding (698), and a user's "lasso" tracing (699) through the centers of the art's lines.

Figure 7:
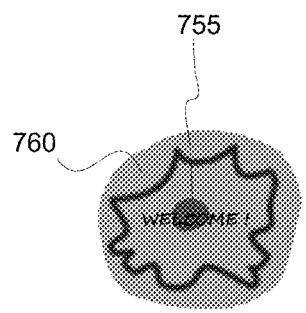
FIG. 7 shows, for comparison purposes, one of the herein-disclosed techniques for coloring/flatting and trapping/spreading line art and graphics, which (as is shown) does not require scaling to large size, and which (as is shown) allows anti-aliased and/or grayscale and/or multi-color line art, and which (as is shown) allows the user to flat/trap the line art by quickly and roughly encircling it with a broad brush tool which is herein disclosed.

FIG. 7 shows, for comparison purposes, one of the herein-disclosed techniques for coloring/flatting and trapping/spreading line art and graphics, which (as is shown) does not require scaling to large size, and which (as is shown) allows anti-aliased and/or grayscale and/or multi-color line art, and which (as is shown) allows the user to flat/trap the line art by quickly and roughly encircling it (760) with a broad brush tool which is herein disclosed. Furthermore, typically, the interior of the enclosed region is filled or colored with a desired color for the interior region (755). This inner filling or coloring can occur either before or after the region is encircled with the brush tool, and can be performed either by the user (such as by the herein-disclosed "x-fill" or "z-fill", or a bucket fill, or a pixel editor) or automatically by the software that is implementing the herein-disclosed methods (such as by detecting or computing the inner area enclosed by the user's brush tool—here, the UPB).

25. Discussion of the Inventions

FIGS. 8A-8D illustrate an example of using the present disclosure to easily color (including flatting and trapping/ spreading) disjointed or detached art elements or items or characters, including anti-aliased graphics, in this case by simply using four small "color blobs" ("PIP blobs", herein disclosed); and furthermore demonstrate coloring disjointed items (in this case, the word "welcome") by in this case simply using a single "color blob"; and furthermore demonstrate that the single "color blob" is just "near" the disjointed items, not necessarily inside each of them.

Furthermore, they demonstrate an application of the disclosed "opposite flow" and "jump" properties.

Figure 8A:
FIGS. 8A-8D illustrate an example of using the present disclosure to easily color (including flatting and trapping/spreading) disjointed or detached art elements or items or characters, including anti-aliased graphics, in this case by simply using four small "color blobs" ("PIP blobs", herein disclosed); and furthermore demonstrate coloring disjointed items (in this case, the word "welcome") by in this case simply using a single "color blob"; and furthermore demonstrate that the single "color blob" is just "near" the disjointed items, not necessarily inside each of them.

FIG. 8A depicts an exemplary instance of a user's line art—or alternatively, depicts a "line art layer" (810) containing/showing the user's line art—which in this case is grayscale and anti-aliased.

Figure 8B:
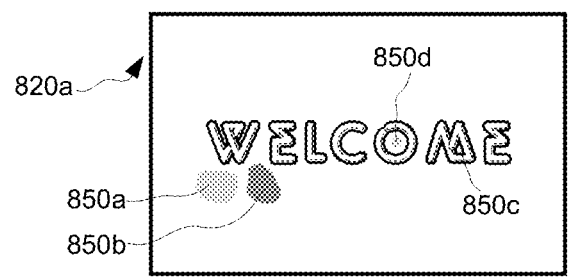

FIG. 8B depicts an instance of an exemplary software application's (software application implementing the herein-disclosed inventions) "working layer" (820*a*), in this case showing a combination of the "line art layer" and a "flats layer" or a "blobs layer". This combination shows the user's "red"-colored color blobs (850*a*, 850*c*, 850*d*) (which the user placed on the "flats layer" or "blobs layer"), set by use of a PB and/or a pixel editor, and shows the user's "purple"-colored color blob (850*b*) (which the user placed on the "flats layer" or "blobs layer"), which was set with "opposite flow" and a "jump distance" of about "30 pixels", set by use of a PB.

Figure 8C:
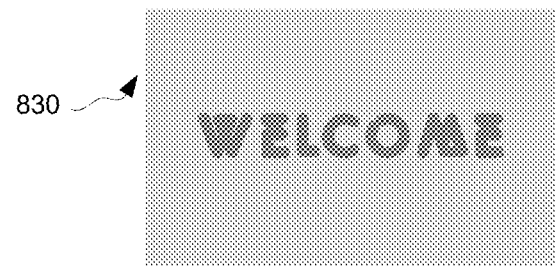

FIG. 8C shows the resulting "flats layer" (830) computed by an implementation of the present inventions. The first "purple" color blob, which was off position, was thus deleted here. The outer edge of each "text letter" has a subtle trapping effect, but not noticeable here.

Figure 8D:

FIG. 8D shows the "working layer" (820*b*), which shows the final "production image", which in this case, according to the user's choice, is a "Multiply mode" combination of the "line art layer" (810) and the current/computed "flats layer" (830).

It is noted that the entire—and disjointed—elements of the word "WELCOME" are colored/flatted/trapped by the single "purple" color blob. It is further noted that the "purple" color blob was simply placed near—not on or in—the disjointed word "WELCOME".

26. Discussion of the Inventions

FIGS. 9A-9D illustrate an example of using the present disclosure to easily color (or segment) complex grayscale or anti-aliased or multi-colored line art elements or items or characters, in this case by simply using two small "color blobs" ("PIP blobs"); and furthermore demonstrate an application of the herein-disclosed "multi-flow" flow status, which in this case is used to color/flat (or segment) an entire character by using only a couple of "PIP blobs".

In particular, they show that the "multi-flow" flow status can color an entire complex-colored character, by use of a single "color blob". In this example, a single "color blob" with "multi-flow" status was put in a complex-shaped and complex-colored character, and a single "color blob" (with "standard flow") was put in the background region. The complex line art was thus colored (or, similarly, segmented, such as for "green screen" or "chroma key" segmentation) quickly and easily, based on an input of just two small "color blobs".

Figure 9A:
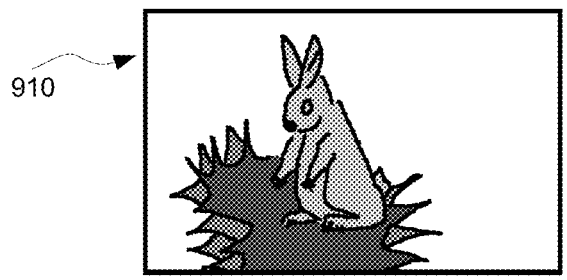
FIGS. 9A-9D illustrate an example of using the present disclosure to easily color (or segment) complex grayscale or anti-aliased or multi-colored line art elements or items or characters, in this case by simply using two small "color blobs" ("PIP blobs"); and furthermore demonstrate an application of the herein-disclosed "multi-flow" flow status, which in this case is used to color/flat (or segment) an entire character by using only a couple of "PIP blobs".

FIG. 9A depicts an exemplary instance of a user's line art—or, alternatively, depicts a "line art layer" (910) with the user's line art—which in this case is grayscale and/or multi-colored. (If multi-colored, the user can for example optionally choose to temporarily transform it to a grayscale or monochrome image, for easier computation, and for easier choices of "reference colors".)

Figure 9B:
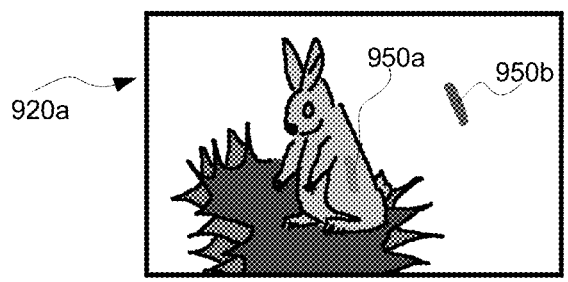

FIG. 9B depicts an instance of an exemplary software application's (implementing the herein-disclosed inventions) "working layer" (920*a*), in this case showing a combination of the "line art layer" and a "flats layer" or a "blobs layer". This combination shows the user's "red"-colored "color blob" (950*b*) (which the user placed on the "flats layer" or "blobs layer"), set by use of a PB and/or a pixel editor; and shows a "blue"-colored "color blob" (950*a*) (which the user placed on the "flats layer" or "blobs layer") with "multi-flow" flow status, set by use of a PB.

Figure 9C:
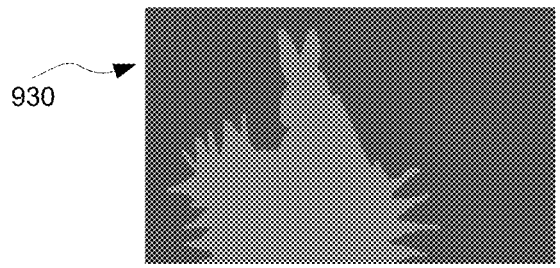

FIG. 9C shows the resulting "flats layer" (930) computed by an implementation of the present inventions.

Figure 9D:
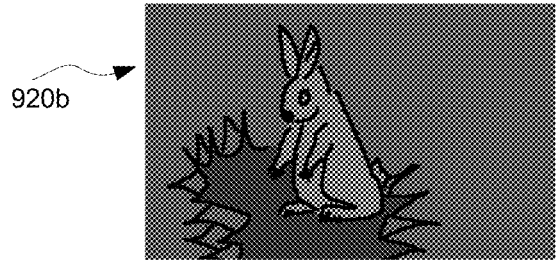

FIG. 9D shows the "working layer" (920*b*), which shows the final "production image", which in this case, according to the user's choice, is a "Multiply mode" combination of the "line art layer" (910) and the current/computed "flats layer" (930).

27. Discussion of the Inventions

The "L2-Brush" was defined herein earlier. Again, it is similar to the "L-Brush", is preferably smaller, and applies temporary line art such as temporary "artist's blue lines". This is particularly useful for quick and tight coloring of gappy and rough line art.

For example, the "L2-Brush" can yield a tighter coloring region when coloring sketch-like grayscale art containing numerous gaps. For example, when coloring a rough, sketch-like character, with numerous gaps and shadings. For example, such as with "back-to-front"-style flatting.

The steps proceed as with the UPB, therefore extra Figures and discussions will not be necessary here.

Similarly, for the herein-defined "L-Brush", "L3-Brush", "L4-Brush", "L5-Brush", "L6-Brush".

28. Discussion of the Inventions

FIGS. 10A-10E illustrate an example of using the present disclosure to easily color characters/elements/items that consist of complex detached parts, and to color multiple disconnected characters/elements/items; in this case, by simply using five small "color blobs" ("PIP blobs") to color two groups of birds, a group of rabbits, and a tree object consisting of a large number of disjointed/disconnected elements.

FIG. 10A depicts an exemplary instance of a user's line art—or alternatively, depicts a "line art layer" (1010) with the user's line art—which in this case is grayscale and anti-aliased and with numerous disjointed characters and elements.

FIG. 10B depicts the user's or computer's modification of the user's line art—or alternatively, depicts the "line art layer" but now with the modified line art (1013). In this case, the user chose to slightly darken the line art, for greater contrast prior to applying the coloring/flatting methods, in order for the "opposite flow" to more easily process the grayscale characters and the grayscale disjointed tree elements.

FIG. 10C depicts an instance of an exemplary software application's (implementing the herein-disclosed inventions) "working layer" (1020), in this case showing a combination of the current "line art layer" and a "flats/blobs layer". This combination shows the user's different-colored "color blobs" (1050*a*-1050*e*), which the user placed on the "flats/blobs layer", and which the user set by use of a PB and/or a pixel editor—and shows some "color blobs" (1050*a*, 1050*b*, 1050*d*, 1050*e*) with "opposite flow" flow status and a "jump distance", set by use of a PB.

FIG. 10D shows the resulting "flats layer" (1030) computed by an implementation of the present inventions. Note that the original "opposite flow" blobs, which were off position, are deleted here.

FIG. 10E shows a "working layer" (1021), which shows the final "production image", which in this case, according to the user's choice, is a "Multiply mode" combination of the original "line art layer" (1010)—not the modified "line art layer" (1013)—and the current/computed "flats layer" (1030).

It is noted that the disjointed characters in the different groups, and the disjointed tree elements, are colored by use of just five "color blobs". It is further noted that the "color blobs" are simply placed near—not necessarily on or in—the disjointed characters.

29. Discussion of the Inventions

FIGS. 11A-11G illustrate an exemplary workflow in the context of "back-to-front"-style flatting, in which anti-aliased or grayscale or multi-color graphics (in this case, for an irregularly-shaped comics "speech balloon") are colored, flatted, and trapped (i.e., colors touch in the centers of the lines, as is shown), by quickly and roughly encircling the line art using the herein-disclosed "Unpainted-Status Brush Tool (UPB tool)".

Figure 11A:
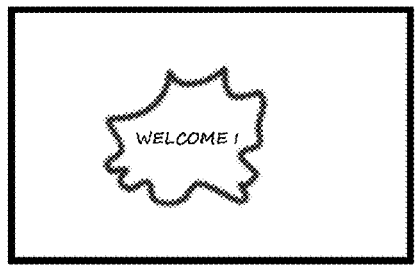
FIGS. 11A-11G illustrate an exemplary workflow in the context of "back-to-front"-style flatting, in which anti-aliased or grayscale or multi-color graphics (in this case, for an irregularly-shaped comics "speech balloon") are colored, flatted, and trapped (i.e., colors touch in the centers of the lines, as is shown), by quickly and roughly encircling the line art using the herein-disclosed "Unpainted-Status Brush Tool (UPB tool)".

FIG. 11A depicts an exemplary instance of a user's line art—or alternatively, depicts a "line art layer" (1110) with the user's line art which in this case is a grayscale and anti-aliased "speech balloon" for a comics page.

Figure 11B:
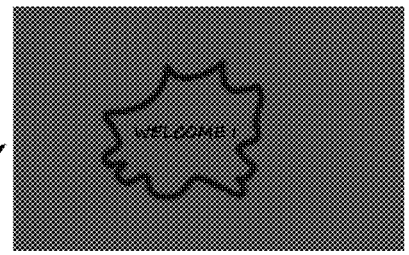

In preparation for "back-to-front" flatting, the exemplary user fills the "flats layer" (or "blobs layer") with a single base/starting color, "color blob". FIG. 11B depicts an instance of an exemplary software application's (implementing the herein-disclosed inventions) "working layer" (1120*a*), in this case showing a combination of the "line art layer" and the "flats/blobs layer". According to the user's choice, the combination is a "Multiply mode" combination of the specified layers.

Figure 11C:
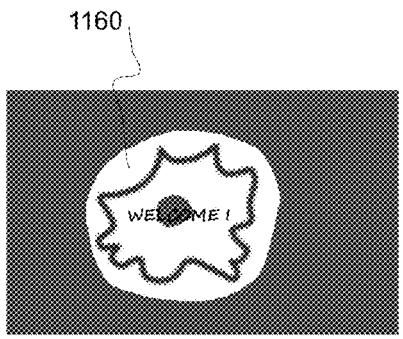

FIG. 11C shows the current "working layer" (1120*b*), which shows the aforementioned "Multiply mode" combination, but also shows (according to the exemplary user's preferences) a highlighted path/region (1160), which shows the pixels affected by the user's use of the "UPB tool"—specifically, the pixels that the user changes from PIPs to UPIPs, using the UPB. That is, the Figure shows the location of a user-chosen and user-specified "UPIP blob". Alternatively, for an exemplary software application, the path/region can be tinted, or not shown, or etc., based on the user's preferences.

Figure 11D:
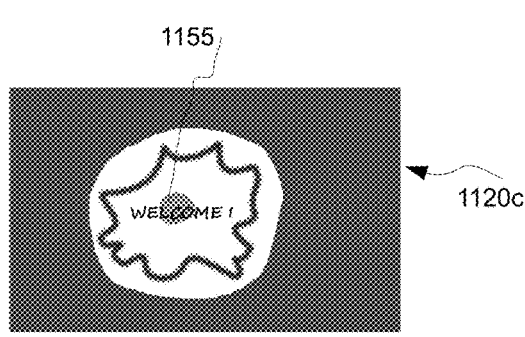

FIG. 11D shows the current "working layer" (1120*c*), which now shows a combination of the aforementioned layers and path/region, i.e. the user's chosen "UPIP blob", but also shows the UPB's selection's "interior region" colored (1155) with a new set of PIP properties, thus forming what is herein referred to as "inner PIPs" or "interior PIPs". For example, colored by the user's "x-fill" or "z-fill" or bucket-fill, or colored automatically (such as with a user-selected, pre-selected color) by the software's computation of the UPB region's "interior PIPs".

Figure 11E:
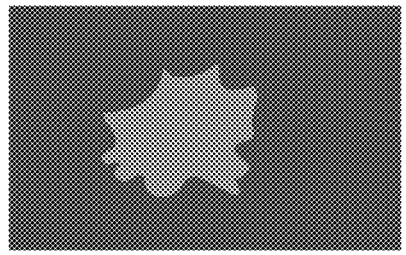

FIG. 11E shows the resulting "flats layer" (1130) computed by an implementation of the present inventions. The grayscale and anti-aliased "speech balloon" is now perfectly flatted/trapped by this "flats layer" (i.e., with the comics' colors joining in the exact center of the "speech balloon" lines).

Figure 11F:
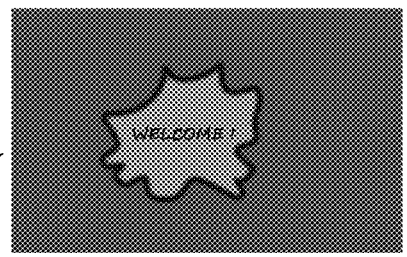

FIG. 11F shows the "working layer" (1120*d*), which shows the final "production image", which in this case, according to the user's choice, is a "Multiply mode" combination of the "line art layer" (1110) and the current/computed "flats layer" (1130).

Figure 11G:
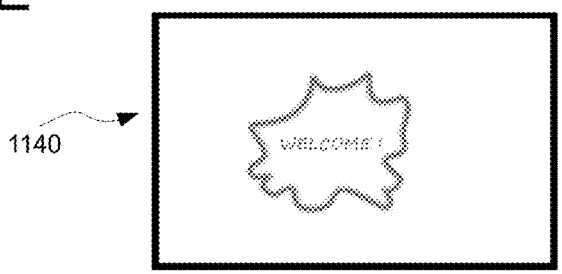

FIG. 11G shows a "working layer" (1140), which here shows a "Screen mode"—rather than a "Multiply mode"—combination of the "line art layer" (1110) and the current/computed "flats layer" (1130). It shows that the comics' colors join in the exact center of the line art's lines. That is, the herein-disclosed coloring process resulted in a perfectly flatted/trapped art product. Furthermore, resulted in a perfectly flatted/trapped result, after almost no effort on the part of the user. The user simply chose a color for the "speech balloon", then quickly brushed the UPB in a quick and rough circular shape. The grayscale and anti-aliased and irregularly-shaped "speech balloon" was then perfectly flatted and trapped—in a fraction of a second (by the prototype software of the present inventions).

In particular, the user did not need to use the comics industry-standard approach of scaling the line art to large size, thresholding it to pure black-and-white, then carefully and laboriously dragging a "lasso" tool through the centers of the irregularly-shaped lines.

FIGS. 12A-12E illustrate an exemplary workflow in the context of (what is herein referred to as) "coloring-book"-style flatting, particularly in which anti-aliased or grayscale or multi-color (or two-color) graphics are colored, flatted, and trapped (i.e., colors touch in the centers of the lines, as is shown), in this case by simply using two small "color blobs" ("PIP blobs", or "segmentation blobs", each herein disclosed).

FIG. 12A depicts an exemplary instance of a user's line art—or alternatively, depicts a "line art layer" (1210) with the user's line art—which in this case is a grayscale and anti-aliased "speech balloon" for a comics page.

FIG. 12B depicts an instance of an exemplary software application's (implementing the herein-disclosed inventions) "working layer" (1220*a*), in this case showing a combination of the "line art layer" and a "flats/blobs layer". This combination shows the user's "blue"-colored "color blob" (1250*a*) and "red"-colored "color blob" (1250*b*)—each of which the user placed on the "flats/blobs layer"—set by use of a PB and/or a pixel editor.

FIG. 12C shows the resulting "flats layer" (1230) computed by an implementation of the present inventions. The grayscale and anti-aliased "speech balloon" is now perfectly flatted/trapped by this "flats layer" (i.e., with the comics' colors joining in the exact center of the "speech balloon" lines).

FIG. 12D shows the "working layer" (1220*b*), which shows the final "production image", which in this case, according to the user's choice, is a "Multiply mode" combination of the "line art layer" (1210) and the current/computed "flats layer" (1230).

FIG. 12E shows a "working layer" (1240), which here shows a "Screen mode"—rather than a "Multiply mode"—combination of the "line art layer" (1210) and the current/computed "flats layer" (1230). It shows that the comics' colors join in the exact center of the line art's lines. That is, the herein-disclosed coloring process resulted in a perfectly flatted/trapped art product. Furthermore, resulted in a perfectly flatted/trapped result, after almost no effort on the part of the user. The user simply put two quick lines with desired colors. The grayscale and anti-aliased and irregularly-shaped "speech balloon" was then perfectly flatted and trapped—in a fraction of a second (by the prototype software of the present inventions).

In particular, the user did not need to use the comics industry-standard approach of scaling the line art to large size, thresholding it to pure black-and-white, then carefully and laboriously dragging a "lasso" tool through the centers of the irregularly-shaped lines.

FIGS. 13A-13D illustrate an exemplary workflow in the context of "bucket-fill clean-up"-style flatting (herein disclosed), particularly in which anti-aliased or grayscale or multi-color (or two-color) graphics are colored, flatted, and trapped (i.e., colors touch in the centers of the lines), in this case by simply using two "bucket fills".

Figure 13A:
FIGS. 13A-13D illustrate an exemplary workflow in the context of "bucket-fill clean-up"-style flatting (herein disclosed), particularly in which anti-aliased or grayscale or multi-color (or two-color) graphics are colored, flatted, and trapped (i.e., colors touch in the centers of the lines), in this case by simply using two "bucket fills".

FIG. 13A depicts an exemplary instance of a user's line art—or alternatively, depicts a "line art layer" (1310) with the user's line art—which in this case is a grayscale and anti-aliased "speech balloon" for a comics page.

Figure 13B:
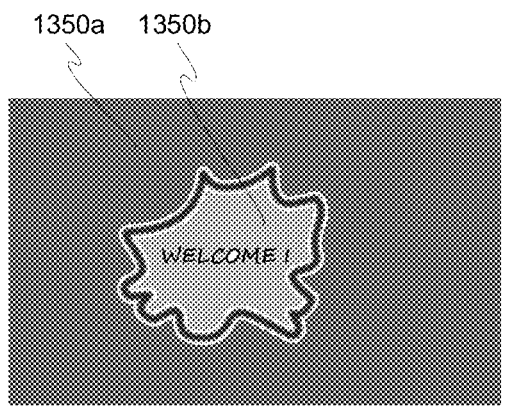

FIG. 13B depicts an instance of an exemplary software application's (implementing the herein-disclosed inventions) "working layer" (1320*a*), in this case showing a combination of the "line art layer" and a "flats/blobs layer". This combination shows the user's "blue"-colored bucket fill (1350*a*) and "red"-colored bucket fill (1350*b*)—each of which the user placed on the "flats/blobs layer". I.e., the bucket fills create large "color blobs", or "PIP blobs".

Note: FIG. 13B shows that, as is typical for bucket fills, there is an uncolored rim near the anti-aliased pixels, and shows that the inner regions of the text letters are uncolored. These are common problems with bucket fills, and are primarily what motivated the present inventions.

Figure 13C:
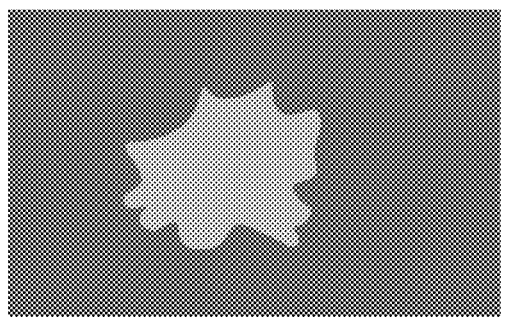

FIG. 13C shows the resulting "flats layer" (1330) computed by an implementation of the present inventions. The grayscale and anti-aliased "speech balloon" is now perfectly flatted/trapped by this "flats layer" (i.e., with the comics' colors joining in the exact center of the "speech balloon" lines).

Figure 13D:

FIG. 13D shows the "working layer" (1320*b*), which shows the final "production image", which in this case, according to the user's choice, is a "Multiply mode" combination of the "line art layer" (1310) and the current/computed "flats layer" (1330).

Again, indeed, the coloring process resulted in a perfectly flatted/trapped art product. Furthermore, resulted in a perfectly flatted/trapped result, after almost no effort on the part of the user. The user simply put two quick clicks with a "bucket fill" tool. The grayscale and anti-aliased and irregularly-shaped "speech balloon" was then perfectly flatted and trapped—in a fraction of a second (by the prototype software of the present inventions).

In particular, the user did not need to use the comics industry-standard approach of scaling the line art to large size, thresholding it to pure black-and-white, then carefully and laboriously dragging a "lasso" tool through the centers of the irregularly-shaped lines.

30. Discussion of the Inventions

FIGS. 14A-14F illustrate an example of using the present disclosure to color line art and graphics containing large gaps and discontinuities, by using quick and rough encircling, in this case applied to grayscale and gradient graphics.

FIG. 14A depicts an exemplary instance of a user's line art—or alternatively, depicts a "line art layer" (1410) with the user's line art—which in this case is grayscale and anti-aliased and gradient and/or multi-colored, with shading and with an extremely large gap due to the shading and lighting of the "sphere" object. (If multi-colored, the user can for example optionally choose to temporarily transform it to a grayscale image, for easier computation.)

In preparation for "back-to-front" flatting, the exemplary user fills the "flats/blobs layer" with a single base/starting color. FIG. 14B depicts an instance of an exemplary software application's (implementing the herein-disclosed inventions) "working layer" (1420*a*), in this case showing a combination of the "line art layer" and the "flats/blobs layer". According to the user's choice, the combination is a "Multiply mode" combination of the specified layers.

FIG. 14C shows the current "working layer" (1420*b*), which shows the aforementioned "Multiply mode" combination, but also shows a highlighted path/region (1460) that shows the pixels affected by the user's use of the UPB. Specifically, the pixels that the user changes from PIPs to UPIPs, using the UPB. That is, shows the location of a user-chosen "UPIP blob". Alternatively, the path/region can be tinted, or not shown, or etc., based on the user's preferences.

FIG. 14D shows the current "working layer" (1420*c*), which shows a combination of the aforementioned layers and path/region, but also shows the UPB's selection's "interior region" colored (1455) with a new set of PIP properties. For example, colored by the user's "x-fill" or "z-fill" or bucket-fill, or colored automatically (such as with a user-selected, pre-selected color) by the software's computation of the UPB region's "interior PIPs".

Figure 14E:
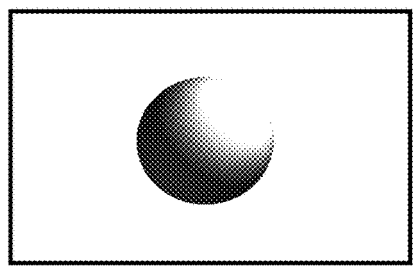
Figure 14E:
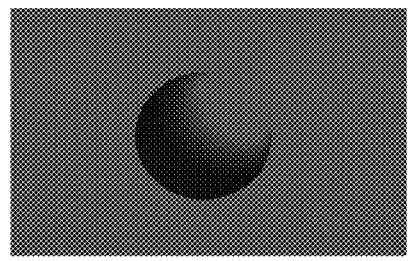
Figure 14E:
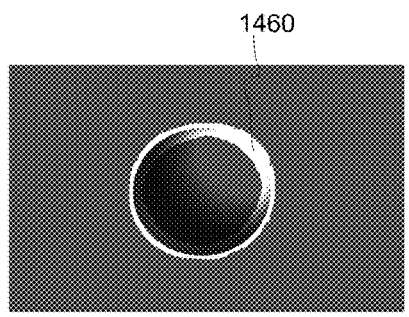
Figure 14E:
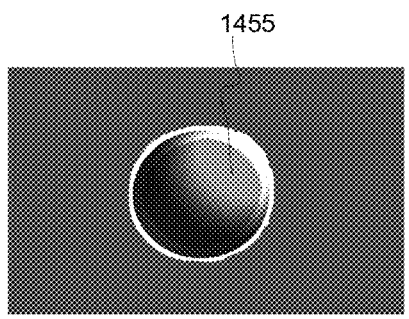
Figure 14E:
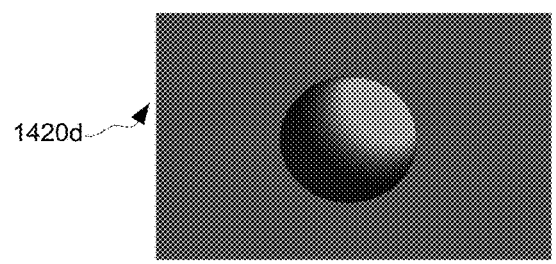

FIG. 14E shows the "working layer" (1420*d*), which shows the final "production image", which in this case, according to the user's choice, is a "Multiply mode" combination of the "line art layer" (1410) and the current/computed "flats layer" (1430).

Figure 14F:
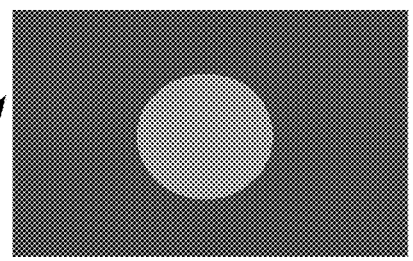

FIG. 14F shows the resulting "flats layer" (1430) computed by an implementation of the present inventions. The complex line art is thus now colored/flatted, and with subtle trapping.

Note: in this case, the user used the UPB freely, but the UPB can alternatively allow the user to brush with chosen styles, such as to "line to" chosen points, or to select circular or rectangular or Bezier lines, etc., for ease. In this case, a circle-plotting UPB would create a precise selection. Regardless, the present example shows that the coloring/flatting/trapping results are excellent, including in this case, with the user roughly and freely brushing with the UPB.

Note: the present example used simple "standard flow" for the "PIP blobs". This was acceptable, since the object's grayscale gradient lets a "standard flow" accurately join the background and foreground (sphere object) colors. In contrast, if the sphere object had a large black zone in the shaded area, then the user can preferably use an "opposite flow" PIP blob for the black zone.

31. Discussion of the Inventions

FIGS. 15A-15F illustrate an exemplary workflow, in which comics panels are quickly and easily colored, flatted, and trapped—such as prior to coloring the comics line art in the panels—by quick and rough encircling of the comics panels, by application of the herein-disclosed "UPB tool"; in this case, for anti-aliased line art, and in this case for "back-to-front"-style flatting; and furthermore show the accuracy of the resulting flatting and trapping.

Figure 15A:
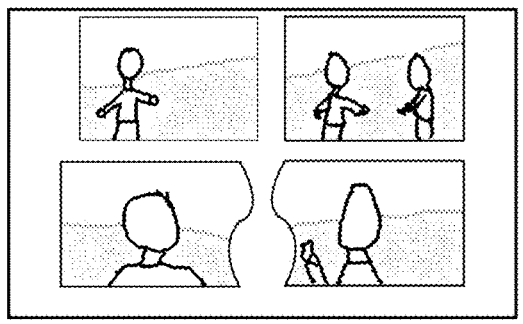
FIGS. 15A-15F illustrate an exemplary workflow, in which comics panels are quickly and easily colored, flatted, and trapped—such as prior to coloring the comics line art in the panels—by quick and rough encircling of the comics panels, by application of the herein-disclosed "UPB tool"; in this case, for anti-aliased line art, and in this case for "back-to-front"-style flatting; and furthermore show the accuracy of the resulting flatting and trapping.

FIG. 15A depicts an exemplary instance of a user's line art—or alternatively, depicts a "line art layer" (1510) with the user's line art—which in this case is a grayscale or multi-colored and anti-aliased comics page with comics panels.

Figure 15B:
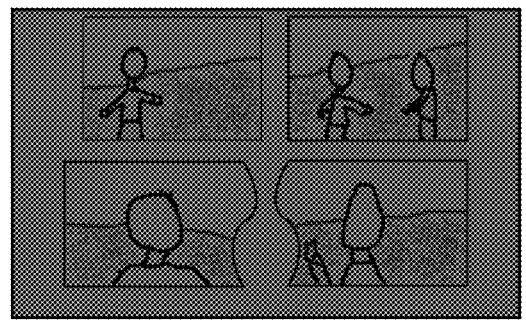

In preparation for "back-to-front" flatting, the exemplary user fills the "flats/blobs layer" with a single base/starting color. FIG. 15B depicts an instance of an exemplary software application's (implementing the herein-disclosed inventions) "working layer" (1520*a*), in this case showing a combination of the "line art layer" and the "flats/blobs layer". According to the user's choice, the combination is a "Multiply mode" combination of the specified layers.

Figure 15C:
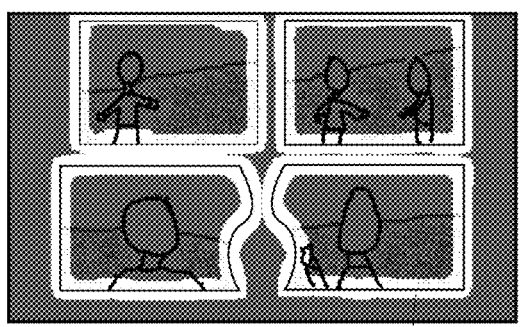

FIG. 15C shows the current "working layer" (1520*b*), which shows the aforementioned "Multiply mode" combination, but also shows a highlighted path/region (1560)—one of multiple such—that shows the pixels affected by the user's use of the UPB. Specifically, the pixels that the user changes from PIPs to UPIPs, using the UPB. That is, shows the location of a user-chosen "UPIP blob". Alternatively, the paths/regions can be tinted, or not shown, or etc., based on the user's preferences.

Figure 15D:
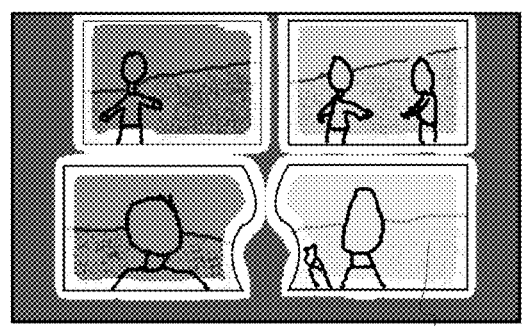

FIG. 15D shows the current "working layer" (1520*c*), which shows a combination of the aforementioned layers and paths/regions, but also shows the UPB's selection's "interior regions" colored—such as "interior region" (1555), one of multiple—with a new set of PIP properties. For example, colored by the user's "x-fill" or "z-fill" or bucket-fill, or colored automatically (such as with a user-selected, pre-selected color) by the software's computation of the UPB regions' "interior PIPs".

Figure 15E:
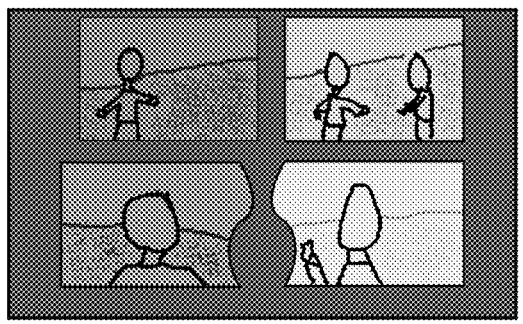

FIG. 15E shows the "working layer" (1520*d*), which shows the final "production image", which in this case, according to the user's choice, is a "Multiply mode" combination of the "line art layer" (1510) and the current/computed "flats layer" (1530).

Figure 15F:
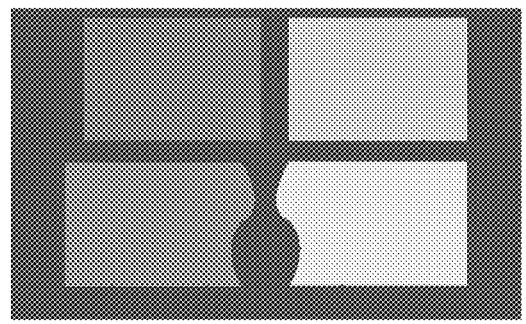

FIG. 15F shows the resulting "flats layer" (1530) computed by an implementation of the present inventions. The grayscale and anti-aliased outer edge of each "comics panel" is successfully flatted and trapped.

FIGS. 16A-16D illustrate an exemplary workflow, in which comics panels are quickly and easily colored, flatted, and trapped—such as prior to coloring the comics line art in the panels—by quick and rough placement of simple "color blobs" ("PIP blobs", herein disclosed); in this case, for anti-aliased line art, and in this case for what is herein referred to as "coloring-book"-style flatting; and furthermore show the accuracy of the resulting flatting and trapping.

Figure 16A:
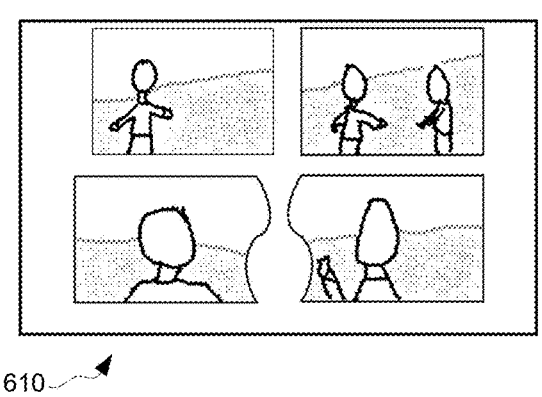
FIGS. 16A-16D illustrate an exemplary workflow, in which comics panels are quickly and easily colored, flatted, and trapped—such as prior to coloring the comics line art in the panels—by quick and rough placement of simple "color blobs" ("PIP blobs", herein disclosed); in this case, for anti-aliased line art, and in this case for what is herein referred to as "coloring-book"-style flatting; and furthermore show the accuracy of the resulting flatting and trapping.

FIG. 16A depicts an exemplary instance of a user's line art—or alternatively, depicts a "line art layer" (1610) with the user's line art—which in this case is a grayscale or multi-colored and anti-aliased comics page with comics panels.

Figure 16B:
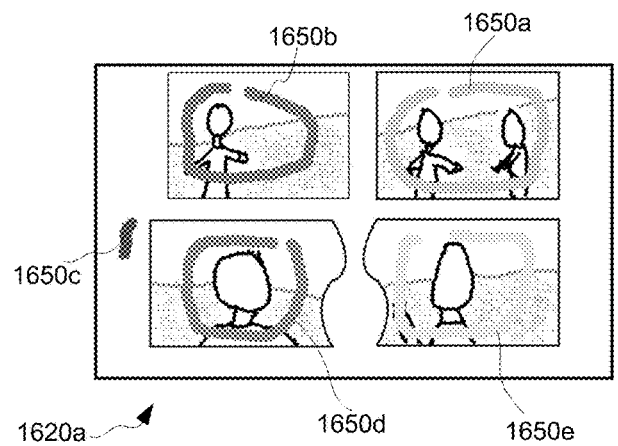

FIG. 16B depicts an instance of an exemplary software application's (implementing the herein-disclosed inventions) "working layer" (1620*a*), in this case showing a combination of the "line art layer" and a "flats/blobs layer". This combination shows the user's different-colored color blobs (1650*a*-1650*e*)—which the user placed on the "flats/blobs layer"—set by use of a PB and/or a pixel editor. Of course, the panels' colors do not need to be different.

Figure 16C:
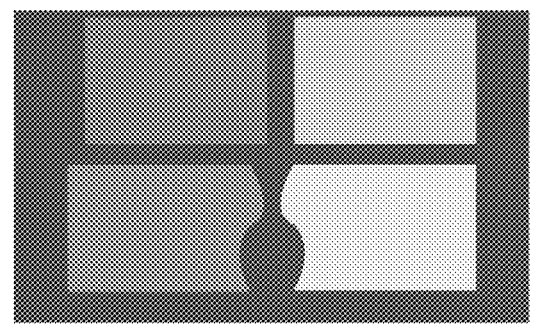

FIG. 16C shows the resulting "flats layer" (1630) computed by an implementation of the present inventions. The grayscale and anti-aliased outer edge of each "comics panel" is successfully flatted and trapped.

Figure 16D:
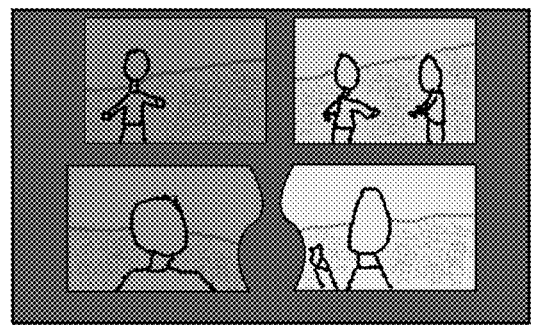

FIG. 16D shows the "working layer" (1620*b*), which shows the final "production image", which in this case, according to the user's choice, is a "Multiply mode" combination of the "line art layer" (1610) and the current/computed "flats layer" (1630).

32. Discussion of the Inventions

FIGS. 17A-17D illustrate an exemplary gap-processing workflow, in which gaps' "color leaks" are controlled in the context of what is herein referred to as "coloring-book"-style flatting; for example, different gaps are chosen to leak or not leak colors; in this case, applied to anti-aliased line art.

Figure 17A:
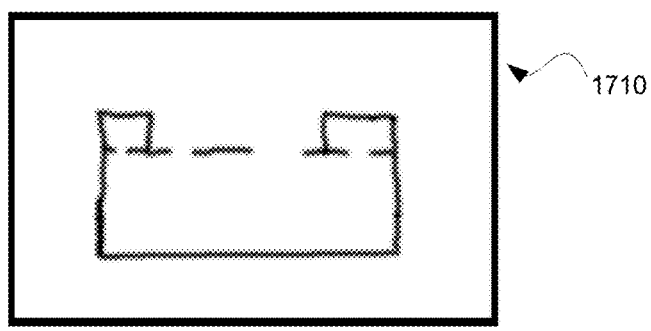
FIGS. 17A-17D illustrate an exemplary gap-processing workflow, in which gaps' "color leaks" are controlled in the context of what is herein referred to as "coloring-book"-style flatting; for example, different gaps are chosen to leak or not leak colors; in this case, applied to anti-aliased line art.

FIG. 17A depicts an exemplary instance of a user's line art—or alternatively, depicts a "line art layer" (1710) with the user's line art—which in this case is anti-aliased, and with different-sized gaps.

Figure 17B:
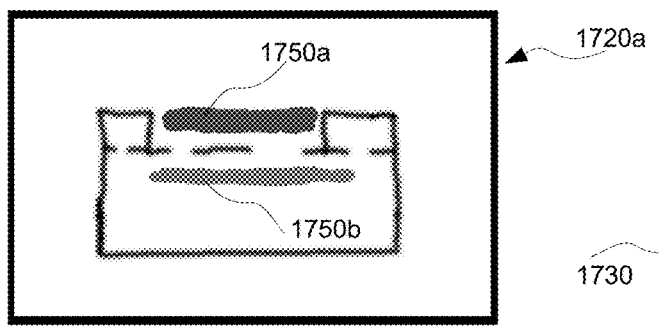

FIG. 17B depicts an instance of an exemplary software application's (implementing the herein-disclosed inventions) "working layer" (1720*a*), in this case showing a combination of the "line art layer" and a "flats/blobs layer". This combination shows the user's different-colored color blobs (1750*a*, 1750*b*)—which the user placed on the "flats/blobs layer"—set by use of a PB and/or a pixel editor.

Furthermore, FIG. 17B illustrates one of the herein-discussed approaches for controlling gap leaks. Specifically, the user puts different-colored "PIP blobs" on opposite sides of the gaps that the user wants to act as "blocks" for blocking the color flows, and does not put "PIP blobs" on opposite sides of the gaps that the user wants colors to freely flow across.

Figure 17C:
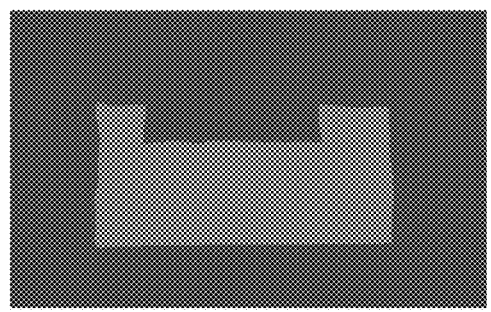

FIG. 17C shows the resulting "flats layer" (1730) computed by an implementation of the present inventions. Note: as shown, the anti-aliased line art is successfully flatted and trapped, and the gap leaks are successfully controlled in ways chosen by the user.

Figure 17D:
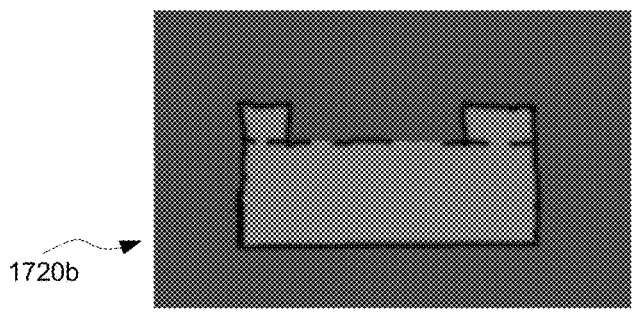

FIG. 17D shows the "working layer" (1720*b*), which shows the final "production image", which in this case, according to the user's choice, is a "Multiply mode" combination of the "line art layer" (1710) and the current/computed "flats layer" (1730).

FIGS. 18A-18G illustrate an exemplary gap-processing workflow, in which gaps' "color leaks" are controlled in the context of "back-to-front"-style flatting; for example, different gaps are chosen to leak or not leak colors; and furthermore show that the trapping was accurate.

Figure 18A:
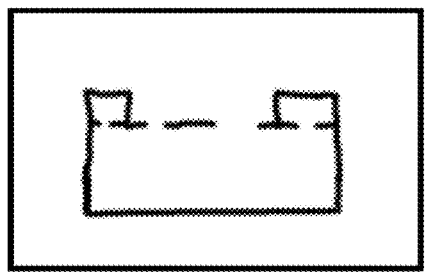
FIGS. 18A-18G illustrate an exemplary gap-processing workflow, in which gaps' "color leaks" are controlled in the context of "back-to-front"-style flatting; for example, different gaps are chosen to leak or not leak colors; and furthermore show that the trapping was accurate.

FIG. 18A depicts an exemplary instance of a user's line art—or alternatively, depicts a "line art layer" (1810) with the user's line art—which in this case is anti-aliased, and with different-sized gaps.

Figure 18B:
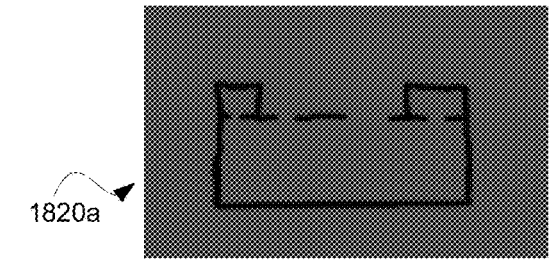

In preparation for "back-to-front" flatting, the exemplary user fills the "flats/blobs layer" with a single base/starting color. FIG. 18B depicts an instance of an exemplary software application's (implementing the herein-disclosed inventions) "working layer" (1820*a*), in this case showing a combination of the "line art layer" and the "flats/blobs layer". According to the user's choice, the combination is a "Multiply mode" combination of the specified layers.

Figure 18C:
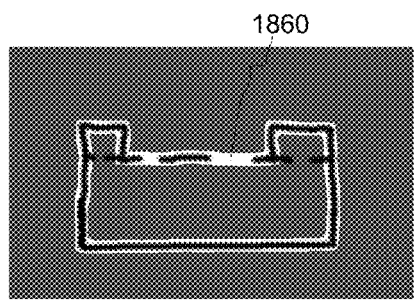

FIG. 18C shows the current "working layer" (1820*b*), which shows the aforementioned "Multiply mode" combination, but also shows a highlighted path/region (1860) that shows the pixels affected by the user's use of the UPB. Specifically, the pixels that the user changes from PIPs to UPIPs, using the UPB. Specifically, shows the location of a user-chosen "UPIP blob". Alternatively, the path/region can be tinted, or not shown, or etc., based on the user's preferences.

Figure 18D:
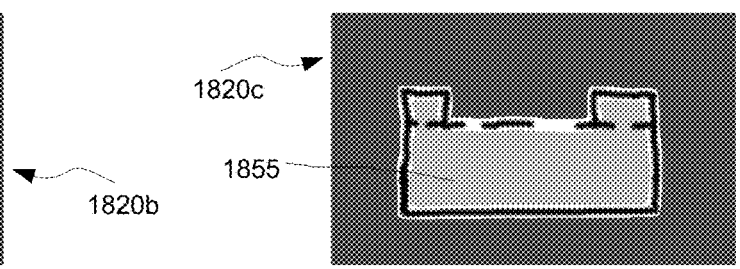

FIG. 18D shows the current "working layer" (1820*c*), which shows a combination of the aforementioned layers and path/region, but also shows the UPB's selection's "interior region" colored (1855) with a new set of PIP properties. For example, colored by the user's "x-fill" or "z-fill" or bucket-fill, or colored automatically (such as with a user-selected, pre-selected color) by the software's computation of the UPB region's "interior PIPs".

Furthermore, FIG. 18C and FIG. 18D illustrate one of the herein-discussed approaches for controlling gap leaks. Specifically, the user selects the object by using the UPB, and uses the UPB in the gaps that the user wants to act as "blocks" for blocking the color flows, and does not use the UPB in the gaps that the user wants colors to freely flow across.

Figure 18E:
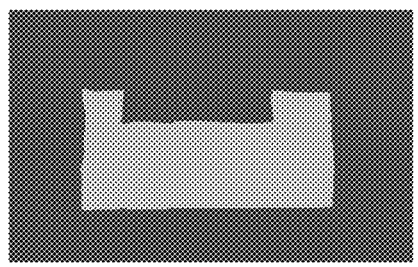

FIG. 18E shows the resulting "flats layer" (1830) computed by an implementation of the present inventions. Note: as shown, the anti-aliased line art is successfully flatted and trapped, and the gap leaks are successfully controlled in ways chosen by the user.

Figure 18F:
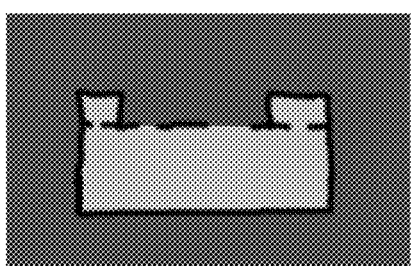

FIG. 18F shows the "working layer" (1820*d*), which shows the final "production image", which in this case, according to the user's choice, is a "Multiply mode" combination of the "line art layer" (1810) and the current/computed "flats layer" (1830).

Figure 18G:
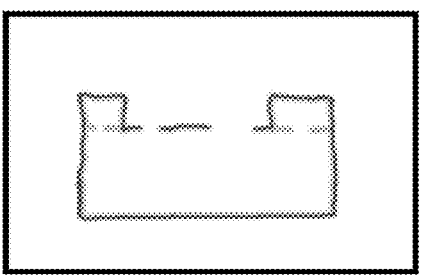

FIG. 18G shows a "working layer" (1840), which here shows a "Screen mode"—rather than a "Multiply mode"—combination of the "line art layer" (1810) and the current/computed "flats layer" (1830). It shows that the comics' colors join in the exact center of the line art's lines. That is, the herein-discussed coloring process resulted in a perfectly flatted/trapped art product. Furthermore, resulted in a perfectly flatted/trapped result, after almost no effort on the part of the user. The user simply chose a color for the art's "object", then quickly and roughly encircled the object by using the UPB. The art's anti-aliased "object" was then perfectly flatted and trapped—in a fraction of a second (by the prototype software for the present inventions).

In particular, the user did not need to use the comics industry-standard approach of scaling the line art to large size, thresholding it to pure black-and-white, then carefully and laboriously dragging a "lasso" tool through the centers of the art's lines.

FIGS. 19A-19E illustrate an exemplary gap-processing workflow, in which gaps' "color leaks" are controlled by "artist's blue lines" (herein disclosed), and particularly, in this case by shaped "artist's blue lines"; for example, controlling the location, extent, and shape, of the color leaks in the gaps, as shown.

Figure 19A:
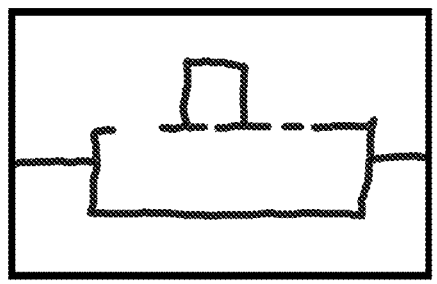
FIGS. 19A-19E illustrate an exemplary gap-processing workflow, in which gaps' "color leaks" are controlled by "artist's blue lines" (herein disclosed), and particularly, in this case by shaped "artist's blue lines"; for example, controlling the location, extent, and shape, of the color leaks in the gaps, as shown.

FIG. 19A depicts an exemplary instance of a user's line art—or alternatively, depicts a "line art layer" (1910) with the user's line art—which in this case is anti-aliased, and with different-sized gaps.

Figure 19B:
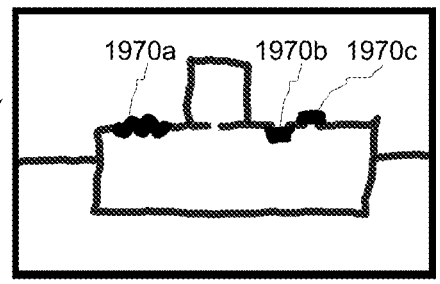

FIG. 19B depicts an instance of an exemplary software application's (implementing the herein-disclosed inventions) "working layer" (1920*a*), in this case showing the user's modified line art or "line art layer"—or, alternatively, showing a combination of the user's original "line art layer" (1910) with the user's "artist's blue lines layer", and thus the user's "artist's blue lines" (1970*a*-1970*c*) as shown.

Furthermore, FIG. 19B illustrates one of the herein-discussed approaches for controlling gap leaks. Specifically, the user puts extra line art, or "artist's blue lines", in the gaps that the user wants to act as "blocks" for blocking the color flows. Furthermore, the user can select the position and shape of the gap fills, which will yield similar positions and shapes when the coloring process is complete. Furthermore, as shown, the user can use large and rough line art when filling the gaps, thus showing the robustness, flexibility, and ease-of-use of the present inventions.

Figure 19C:
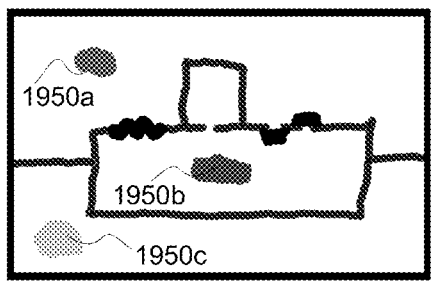

FIG. 19C depicts an instance of an exemplary software application's (implementing the herein-disclosed inventions) "working layer" (1920*b*), in this case showing a combination of the "line art layer" (and possibly the "artist's blue lines layer") and a "flats/blobs layer". This combination shows the user's different-colored "color blobs" (1950*a*-1950*c*)—which the user placed on the "flats/blobs layer"—set by use of a PB and/or a pixel editor.

Figure 19D:
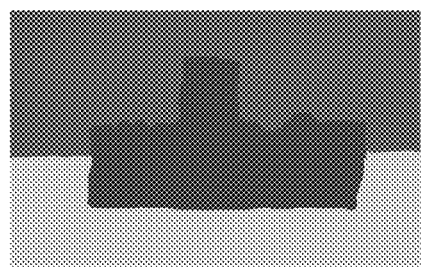

FIG. 19D shows the resulting "flats layer" (1930) computed by an implementation of the present inventions. Note: as shown, the anti-aliased line art is successfully flatted and trapped, and the gap leaks are successfully controlled in ways chosen by the user.

Figure 19E:
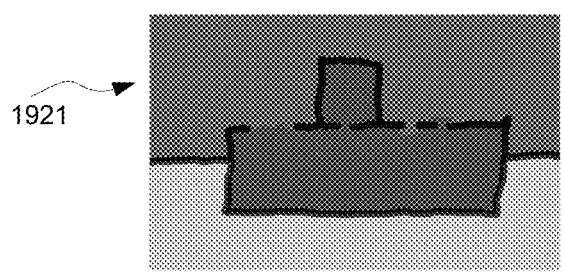

FIG. 19E shows the "working layer" (1921), which shows the final "production image", which in this case, according to the user's choice, is a "Multiply mode" combination of the original "line art layer" (1910)—i.e., not the modified line art layer and not with the artist's blue lines—and the current/computed "flats layer" (1930).

FIGS. 20A-20E illustrate an exemplary gap-processing workflow, in which gaps' "color leaks" are controlled by quickly-placed "circular blue lines" (herein disclosed); and furthermore demonstrate the robustness of the herein-disclosed methods, by in this example using unnecessarily large and roughly-placed "circular blue lines".

Figure 20A:
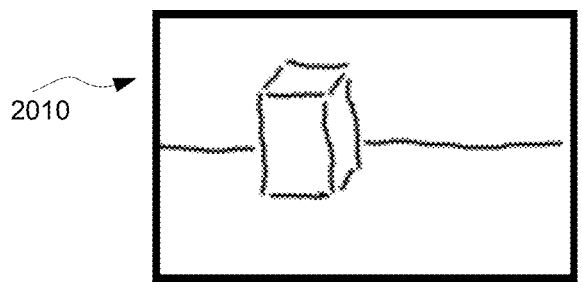
FIGS. 20A-20E illustrate an exemplary gap-processing workflow, in which gaps' "color leaks" are controlled by quickly-placed "circular blue lines" (herein disclosed); and furthermore demonstrate the robustness of the herein-disclosed methods, by in this example using unnecessarily large and roughly-placed "circular blue lines".

FIG. 20A depicts an exemplary instance of a user's line art—or alternatively, depicts a "line art layer" (2010) with the user's line art—which in this case is anti-aliased, and with different-sized gaps.

Figure 20B:
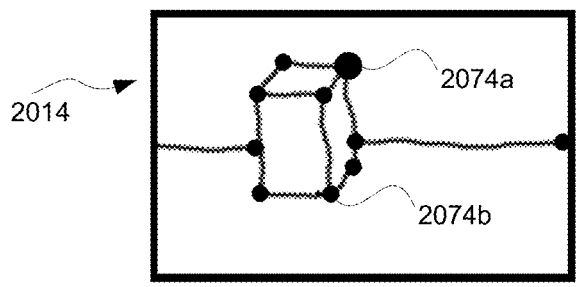

FIG. 20B depicts an exemplary instance of the user's modified line art—or alternatively, depicts a combination (2014) of the user's original "line art layer" (2010) with the user's "artist's blue lines layer". Specifically, the user's circular "artist's blue lines" ("circular blue lines"), such as examples (2074*a*, 2074*b*), are shown.

Furthermore, FIG. 20B illustrates one of the herein-discussed approaches for controlling gap leaks. Specifically, the user puts extra line art, or "artist's blue lines", in the gaps that the user wants to act as "blocks" for blocking the color flows. Furthermore, the "artist's blue lines" here are circular, which are quickly and easily applied, for example each with a single click of a circular brush. Furthermore, as shown, the user can use large and rough "circular blue lines" when filling the gaps. Preferably, the user centers the "circular blue lines" at the chosen gaps, or reasonably centers them, i.e. a significant shift in the circles' positions might result in a corresponding shift in the coloring/flatting/trapping.

Figure 20C:
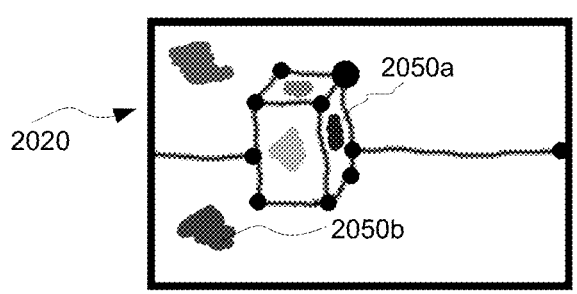

FIG. 20C depicts an instance of an exemplary software application's (implementing the herein-disclosed inventions) "working layer" (2020), in this case showing a combination of the "line art layer" (and possibly the "artist's blue lines layer") and a "flats/blobs layer". This combination shows the user's different-colored "color blobs" (which the user placed on the "flats/blobs layer")—for example, "color blobs" (2050*a*, 2050*b*)—set by use of a PB and/or a pixel editor.

Figure 20D:
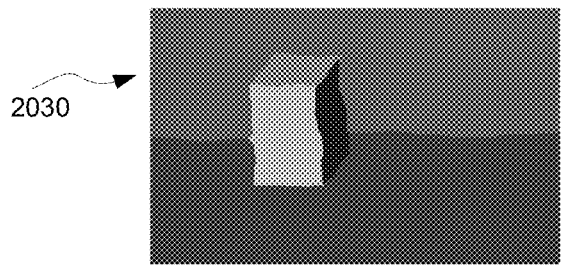

FIG. 20D shows the resulting "flats layer" (2030) computed by an implementation of the present inventions. Note: as shown, the anti-aliased line art is successfully flatted and trapped, and the gap leaks are successfully controlled in ways chosen by the user.

Figure 20E:
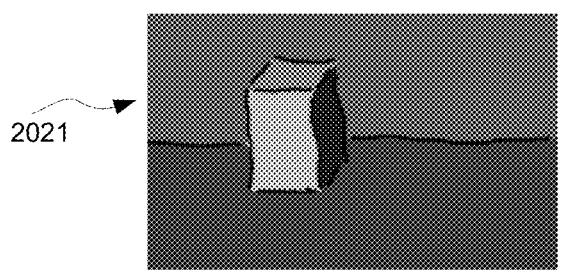

FIG. 20E shows a "working layer" (2021), which shows the final "production image", which in this case, according to the user's choice, is a "Multiply mode" combination of the original "line art layer" (2010)—i.e., not the modified line art layer and not with the artist's blue lines—and the current/computed "flats layer" (2030).

33. Discussion of the Inventions

Figure 21A:
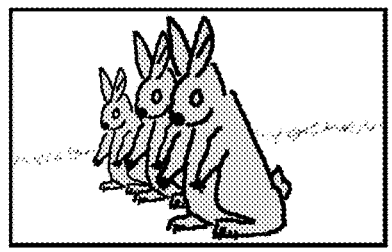
FIGS. 21A-21O illustrate an exemplary workflow for "back-to-front"-style flatting (and trapping), in the context of the present inventions; in this case, for anti-aliased and grayscale and disconnected gappy line art; and furthermore demonstrate quick rough encircling of items; and furthermore demonstrate the herein-disclosed "z-fill".

FIGS. 21A-21O illustrate an exemplary workflow for "back-to-front"-style flatting (and trapping), in the context of the present inventions; in this case, for anti-aliased and grayscale and disconnected gappy line art; and furthermore demonstrate quick rough encircling of items; and furthermore demonstrate the herein-disclosed "z-fill".

FIG. 21A depicts an exemplary instance of a user's line art—or alternatively, depicts a "line art layer" (2110) with the user's line art—which in this case is grayscale and anti-aliased and/or multi-colored, and includes gaps. (If multi-colored, the user can for example optionally choose to temporarily transform it to a grayscale image, for easier computation.)

Figure 21B:
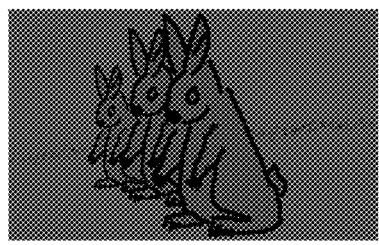

In preparation for "back-to-front" flatting, the exemplary user fills the "flats/blobs layer" with a single base/starting color. FIG. 21B depicts an instance of an exemplary software application's (implementing the herein-disclosed inventions) "working layer" (2120a), in this case showing a combination of the "line art layer" and the "flats/blobs layer". According to the user's choice, the combination is a "Multiply mode" combination of the specified layers.

Figure 21C:
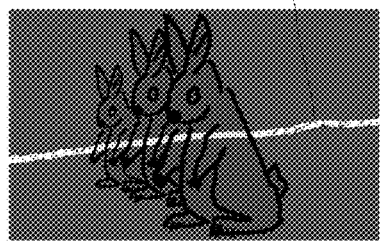

FIG. 21C shows the current "working layer" (2120b), which shows the aforementioned "Multiply mode" combination, but also shows a highlighted path/region (2161) that shows the pixels affected by the user's use of the UPB. Specifically, the pixels that the user changes from PIPs to UPIPs, using the UPB. Specifically, shows the location of a user-chosen "UPIP blob" (which in this case does not encircle a set of PIPs). Alternatively, the path/region can be tinted, or not shown, or etc., based on the user's preferences.

Figure 21D:
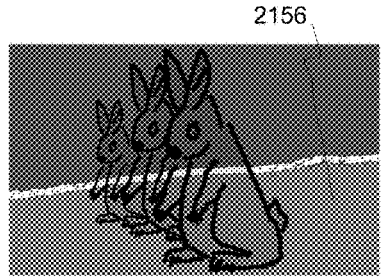

FIG. 21D shows the current "working layer" (2120c), which shows a combination of the aforementioned layers and path/region, and also shows a colored region (2156) which the user colored with a new set of PIP properties. For example, colored by the user's "z-fill", or "x-fill", or bucket-fill.

Next, one of the herein-disclosed coloring methods is applied to the image points.

Figure 21E:
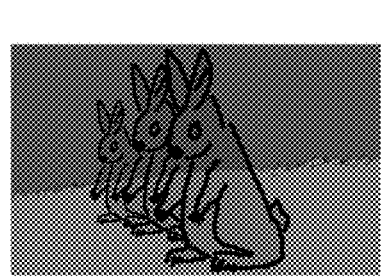

FIG. 21E shows the current "working layer" (2120d), which shows a preliminary "production image", which in this case, according to the user's choice, is a "Multiply mode" combination of the "line art layer" (2110) and the current/computed "flats layer" (which resulted from running the aforementioned coloring method).

The user now has a nicely flatted "back-to-front"-style flatting, of the "grass" area, despite the fact that the grass has numerous gaps, and is anti-aliased and grayscale or multi-colored. The user will now repeat the herein-disclosed techniques, to further color/flat/trap the line art.

Figure 21F:
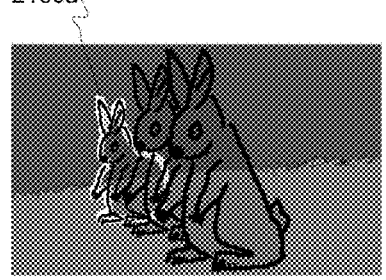

FIG. 21F shows the current "working layer" (2120e), which shows the aforementioned "Multiply mode" combination, but also shows a highlighted path/region (2160a) that shows the pixels affected by the user's use of the UPB. Specifically, the pixels that the user changes from PIPs to UPIPs, using the UPB. Specifically, shows the location of a user-chosen "UPIP blob". Alternatively, the path/region can be tinted, or not shown, or etc., based on the user's preferences.

Note: as shown in FIG. 21F, the user does not need to accurately outline the selected character. Here "back-to-front" flatting is being used, thus the user simply brushes the UPB broadly on the rightmost side of the selected character. This erroneously-large encircling will get fixed when the next character is colored.

Figure 21G:
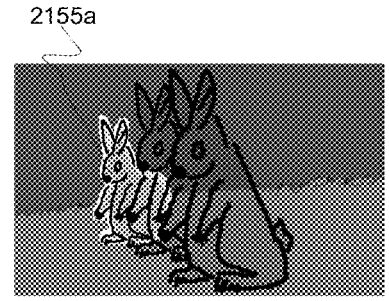

FIG. 21G shows the current "working layer" (2120f), which shows a combination of the aforementioned layers and path/region, but also shows the UPB's selection's "interior region" colored (2155a) with a new set of PIP properties. For example, colored by the user's "z-fill", or "x-fill", or bucket-fill, or colored automatically (such as with a user-selected, pre-selected color) by the software's computation of the UPB region's "interior PIPs".

Next, one of the herein-disclosed coloring methods is applied to the image points.

Figure 21H:
Figure 21:
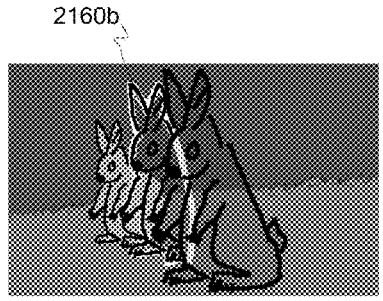

FIG. 21H shows the "working layer" (2120g), which shows a preliminary "production image", which in this case, according to the user's choice, is a "Multiply mode" combination of the "line art layer" (2110) and the current/computed "flats layer" (which resulted from running the aforementioned coloring method).

FIG. 21I shows the current "working layer" (2120h), which shows the aforementioned "Multiply mode" combination, but also shows a highlighted path/region (2160b) that shows the pixels affected by the user's use of the UPB. Specifically, the pixels that the user changes from PIPs to UPIPs, using the UPB. Specifically, shows the location of a user-chosen "UPIP blob". Alternatively, the path/region can be tinted, or not shown, or etc., based on the user's preferences.

Note: as shown in FIG. 21I, the user does not need to accurately outline the selected character. Here "back-to-front" flatting is being used, thus the user simply brushes the UPB quickly and inaccurately on the rightmost side of the selected character. This quick and erroneous encircling will get fixed when the next character is colored.

Figure 21J:
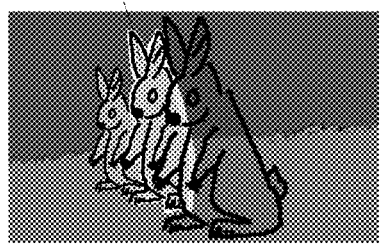

FIG. 21J shows the current "working layer" (2120i), which shows a combination of the aforementioned layers and path/region, but also shows the UPB's selection's "interior region" colored (2155b) with a new set of PIP properties. For example, colored by the user's "z-fill", or "x-fill", or bucket-fill, or colored automatically (such as with a user-selected, pre-selected color) by the software's computation of the UPB region's "interior PIPs".

Next, one of the herein-disclosed coloring methods is applied to the image points.

Figure 21K:
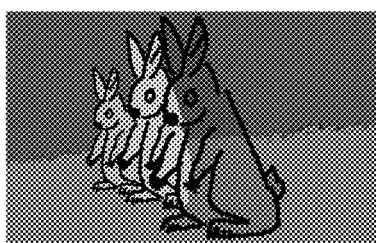

FIG. 21K shows the "working layer" (2120j), which shows a preliminary "production image", which in this case, according to the user's choice, is a "Multiply mode" combination of the "line art layer" (2110) and the current/computed "flats layer" (which resulted from running the aforementioned coloring method).

Figure 21L:
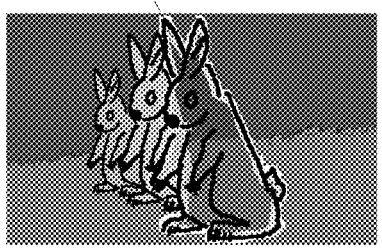

FIG. 21L shows the current "working layer" (2120k), which shows the aforementioned "Multiply mode" combination, but also shows a highlighted path/region (2160c) that shows the pixels affected by the user's use of the UPB. Specifically, the pixels that the user changes from PIPs to UPIPs, using the UPB. Specifically, shows the location of a user-chosen "UPIP blob". Alternatively, the path/region can be tinted, or not shown, or etc., based on the user's preferences.

Figure 21M:
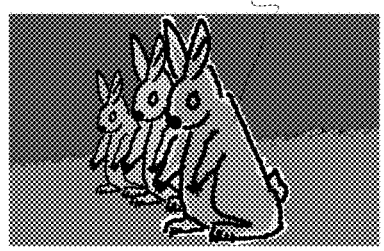

FIG. 21M shows the current "working layer" (2120m), which shows a combination of the aforementioned layers and path/region, but also shows the UPB's selection's "interior region" colored (2155c) with a new set of PIP properties. For example, colored by the user's "z-fill", or "x-fill", or bucket-fill, or colored automatically (such as with a user-selected, pre-selected color) by the software's computation of the UPB region's "interior PIPs".

Next, one of the herein-disclosed coloring methods is applied to the image points.

Figure 21N:
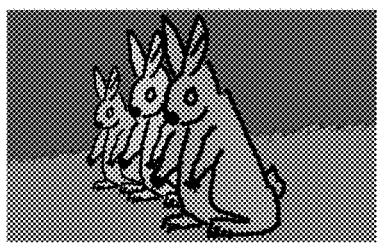
Figure 21:
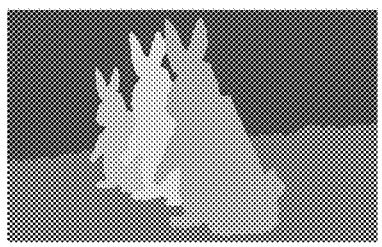

FIG. 21N shows the "working layer" (2120n), which shows the final "production image", which in this case, according to the user's choice, is a "Multiply mode" combination of the "line art layer" (2110) and the current/computed "flats layer" (2130).

FIG. 21O shows the resulting "flats layer" (2130) computed by an implementation of the present inventions. The anti-aliased and grayscale or multi-colored line art has successful coloring/flatting/trapping.

Figure 22A:
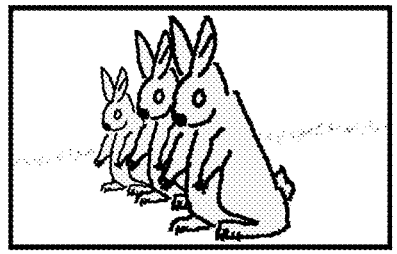
FIGS. 22A-22O illustrate an exemplary workflow for (herein-disclosed) "hybrid back/front"-style flatting (and trapping), in the context of the present inventions; and furthermore demonstrate quick rough encircling of items, including partial encirclings; and furthermore demonstrate the herein-disclosed "x-fill".

FIGS. 22A-22O illustrate an exemplary workflow for (herein-disclosed) "hybrid back/front"-style flatting (and trapping), in the context of the present inventions; and furthermore demonstrate quick rough encircling of items, including partial encirclings—and including cutting across prior-colored items; and furthermore demonstrate the herein-disclosed "x-fill".

FIG. 22A depicts an exemplary instance of a user's line art—or alternatively, depicts a "line art layer" (2210) with the user's line art—which in this case is grayscale and anti-aliased and/or multi-colored, and includes gaps. (If multi-colored, the user can for example optionally choose to temporarily transform it to a grayscale image, for easier computation.)

Figure 22B:

In preparation for "hybrid back/front"-style flatting, the exemplary user fills the "flats/blobs layer" with a single base/starting color. FIG. 22B depicts an instance of an exemplary software application's (implementing the herein-disclosed inventions) "working layer" (2220a), in this case showing a combination of the "line art layer" and the "flats/blobs layer". According to the user's choice, the combination is a "Multiply mode" combination of the specified layers.

Figure 22C:

FIG. 22C shows the current "working layer" (2220b), which shows the aforementioned "Multiply mode" combination, but also shows a highlighted path/region (like in the prior examples) that shows the pixels affected by the user's use of the UPB. Specifically, the pixels that the user changes from PIPs to UPIPs, using the UPB. Specifically, shows the location of a user-chosen "UPIP blob" (which here encircles a set of PIPs). Alternatively, the path/region can be tinted, or not shown, or etc., based on the user's preferences.

Figure 22D:
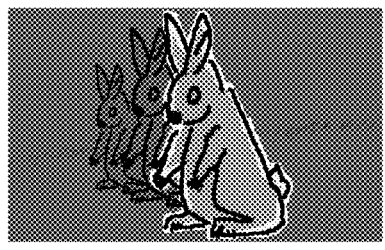

FIG. 22D shows the current "working layer" (2220c), which shows a combination of the aforementioned layers and path/region, and also shows a colored region (like in the prior examples) which the user colored with a new set of PIP properties. For example, colored by the user's "z-fill", or "x-fill", or bucket-fill.

Next, one of the herein-disclosed coloring methods was applied to the image points.

Figure 22E:
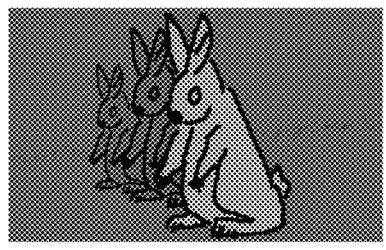

FIG. 22E shows the current "working layer" (2220d), which shows a preliminary "production image", which in this case, according to the user's choice, is a "Multiply mode" combination of the "line art layer" (2210) and the current/computed "flats layer" (which resulted from running the aforementioned coloring method).

The user now has a nicely flatted/trapped area. The user will now repeat the herein-disclosed techniques, to further color/flat/trap the line art.

Figure 22F:
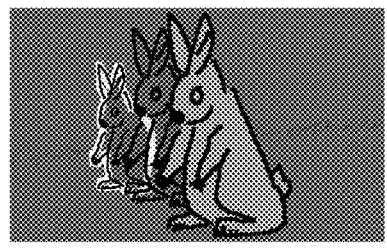

FIG. 22F shows the current "working layer" (2220e), which shows the aforementioned "Multiply mode" combination, but also shows a highlighted path/region (like in the prior examples) that shows the pixels affected by the user's use of the UPB. Specifically, the pixels that the user changes from PIPs to UPIPs, using the UPB. Specifically, shows the location of a user-chosen "UPIP blob". Alternatively, the path/region can be tinted, or not shown, or etc., based on the user's preferences.

Note: as shown in FIG. 22F, the user does not need to accurately outline the selected character. The user simply brushes the UPB broadly on the rightmost side of the selected character. This erroneously-large encircling will get fixed when the next character is colored.

Figure 22G:
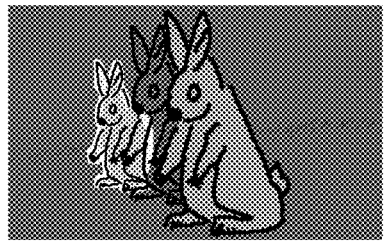

FIG. 22G shows the current "working layer" (2220f), which shows a combination of the aforementioned layers and path/region, but also shows the UPB's selection's "interior region" colored (like in the prior examples) with a new set of PIP properties. For example, colored by the user's "z-fill", or "x-fill", or bucket-fill, or colored automatically (such as with a user-selected, pre-selected color) by the software's computation of the UPB region's "interior PIPs".

Next, one of the herein-disclosed coloring methods was applied to the image points.

Figure 22H:
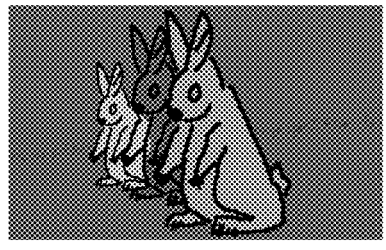
Figure 22:
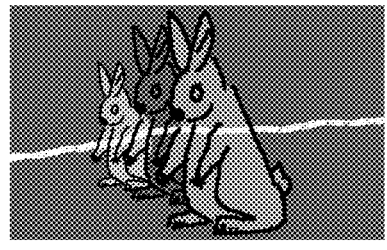

FIG. 22H shows the "working layer" (2220g), which shows a preliminary "production image", which in this case, according to the user's choice, is a "Multiply mode" combination of the "line art layer" (2210) and the current/computed "flats layer" (which resulted from running the aforementioned coloring method).

FIG. 22I shows the current "working layer" (2220h), which shows the aforementioned "Multiply mode" combination, but also shows a highlighted path/region (like in the prior examples) that shows the pixels affected by the user's use of the UPB. Specifically, the pixels that the user changes from PIPs to UPIPs, using the UPB. Specifically, shows the location of a user-chosen "UPIP blob". Alternatively, the path/region can be tinted, or not shown, or etc., based on the user's preferences.

Note: as shown in FIG. 22I, the user swipes the UPB along the gappy "grass", and for ease swipes it across the characters. This quick swipe will get fixed when the coloring method runs.

Figure 22J:
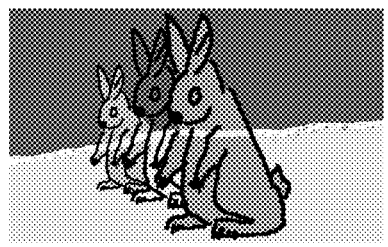

FIG. 22J shows the current "working layer" (2220i), which shows a combination of the aforementioned layers and path/region, but also shows the UPB's selection's lower zone colored (like in prior examples) with a new set of PIP properties. For example, colored by the user's "x-fill", or bucket-fill. Note: a "z-fill" was not used here, because the user wants to keep intact the current colorings of the characters.

Next, one of the herein-disclosed coloring methods was applied to the image points.

Figure 22K:
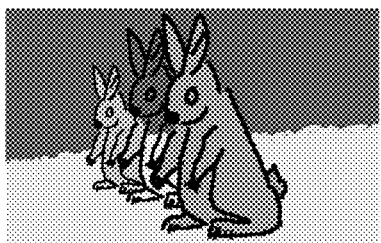

FIG. 22K shows the "working layer" (2220j), which shows a preliminary "production image", which in this case, according to the user's choice, is a "Multiply mode" combination of the "line art layer" (2210) and the current/computed "flats layer" (which resulted from running the aforementioned coloring method).

Figure 22L:
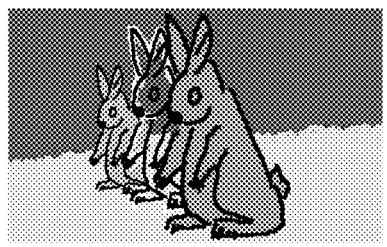

FIG. 22L shows the current "working layer" (2220k), which shows the aforementioned "Multiply mode" combination, but also shows a highlighted path/region (like in prior examples) that shows the pixels affected by the user's use of the UPB. Specifically, the pixels that the user changes from PIPs to UPIPs, using the UPB. Specifically, shows the location of a user-chosen "UPIP blob". Alternatively, the path/region can be tinted, or not shown, or etc., based on the user's preferences.

Note that, for ease, the user does not need to encircle the entire character, because the user will use "x-fills" in the next step. I.e., the prior-colored characters will block the coloring.

Figure 22M:
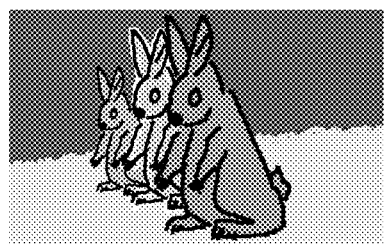

FIG. 22M shows the current "working layer" (2220*m*), which shows a combination of the aforementioned layers and path/region, but also shows the semi-encircled character colored (like in the prior examples) with a new set of PIP properties. For example, colored by the user's "x-fill", or bucket-fill.

Next, one of the herein-disclosed coloring methods was applied to the image points.

Figure 22N:
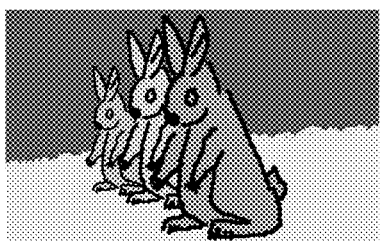
Figure 22:
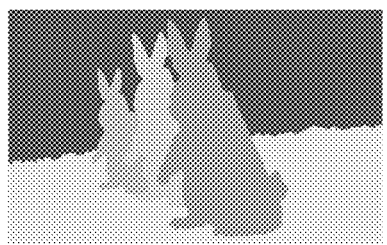

FIG. 22N shows the "working layer" (2220*n*), which shows the final "production image", which in this case, according to the user's choice, is a "Multiply mode" combination of the "line art layer" (2210) and the current/computed "flats layer" (2230).

FIG. 22O shows the resulting "flats layer" (2230) that was computed, in the prior coloring step, by an implementation of the present inventions. The anti-aliased and grayscale or multi-colored line art has successful coloring/flatting/trapping.

34. Discussion of the Inventions

FIGS. 23A-23E illustrate an exemplary workflow, for quickly or efficiently coloring complex "strands", particularly when the background is disjoint, such as for example in the case of "green screen" or "chroma key" processing; in this example, two small "color blobs" ("PIP blobs", herein disclosed) are able to color a complex and grayscale and mottled and anti-aliased and blurred section of thick strands; and furthermore demonstrate the disclosed "jump distance" property, and the disclosed "opposite flow" status.

Figure 23A:
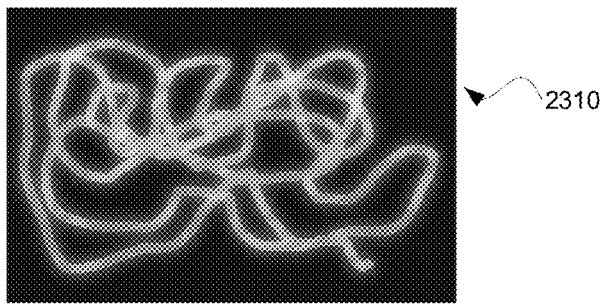
FIGS. 23A-23E illustrate an exemplary workflow, for quickly or efficiently coloring complex "strands", particularly when the background is disjoint, such as for example in the case of "green screen" or "chroma key" processing; in this example, two small "color blobs" ("PIP blobs", herein disclosed) are able to color a complex and grayscale and mottled and anti-aliased and blurred section of thick strands; and furthermore demonstrate the disclosed "jump distance" property, and the disclosed "opposite flow" status.

FIG. 23A depicts an exemplary instance of a user's art—or alternatively, depicts a "line art layer" (2310) with the user's art—which in this case is grayscale and anti-aliased, and with complex "strands" and numerous disjointed background elements.

Figure 23B:
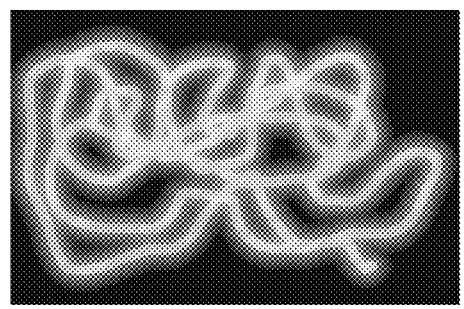

FIG. 23B depicts the user's or computer's modification of the user's line art—or alternatively, depicts the "line art layer" but now with the modified line art (2313). In this case, the user chose to slightly lighten the art, for greater contrast prior to applying the coloring/flatting methods, in order for the "opposite flow" to more easily process the art.

Figure 23C:
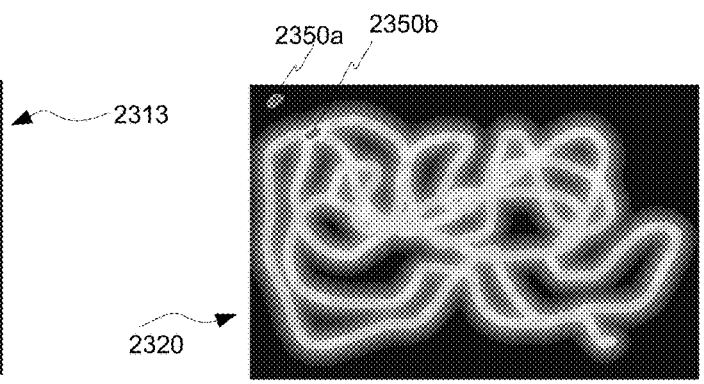

FIG. 23C depicts an instance of an exemplary software application's (implementing the herein-disclosed inventions) "working layer" (2320), in this case showing a combination of the current "line art layer" (2313) and a "flats/blobs layer". This combination shows the user's different-colored "color blobs" (2350*a*, 2350*b*), which the user placed on the "flats/blobs layer", and which the user set by use of a PB and/or a pixel editor—and shows a "color blob" (2350*a*) with "opposite flow" flow status and a "jump distance", set by use of a PB.

Figure 23D:
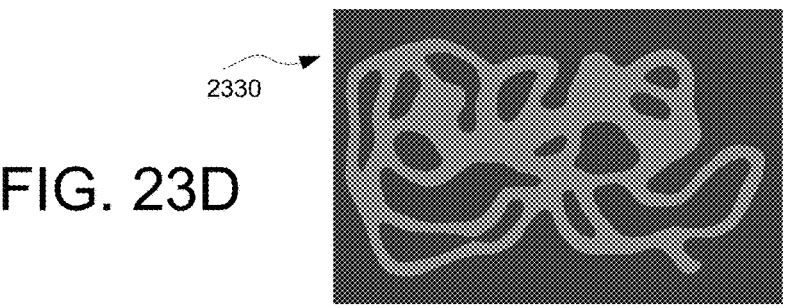

FIG. 23D shows the resulting "flats layer" (2330) computed by an implementation of the present inventions.

Figure 23E:
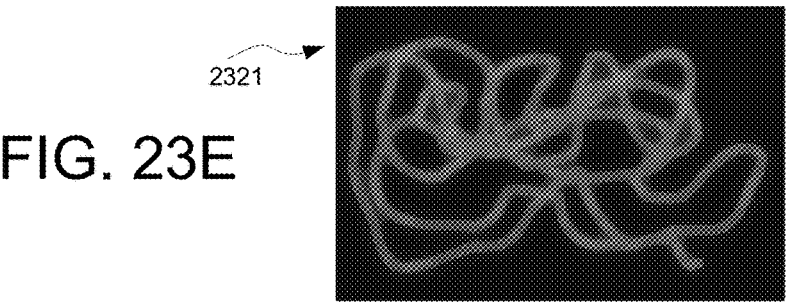

FIG. 23E shows a "working layer" (2321), which shows the final "production image", which in this case, according to the user's choice, is a "Multiply mode" combination of the original "line art layer" (2310)—not the modified "line art layer" (2313)—and the current/computed "flats layer" (2330).

35. Discussion of the Inventions

FIGS. 24A-24I illustrate an exemplary workflow, for creating accurately-joined checkerboard patterns where the squares join perfectly at their corners; and furthermore illustrate an example of using "artist's blue lines" (herein disclosed) to create adjoining colored subregions; and furthermore show that the present disclosure is robust and therefore permits thick "artist's blue lines" and guiding lines; and furthermore demonstrate the disclosed "priority" property; in this case, applied to anti-aliased line art.

Figure 24A:
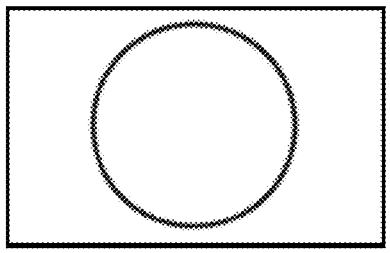
FIGS. 24A-24I illustrate an exemplary workflow, for creating accurately-joined checkerboard patterns where the squares join perfectly at their corners; and furthermore illustrate an example of using "artist's blue lines" (herein disclosed) to create adjoining colored subregions; and furthermore show that the present disclosure is robust and therefore permits thick "artist's blue lines" and guiding lines; and furthermore demonstrate the disclosed "priority" property; in this case, applied to anti-aliased line art.

FIG. 24A depicts an exemplary instance of a user's "line art layer" (2410) with the user's line art, which in this case is anti-aliased.

Figure 24B:
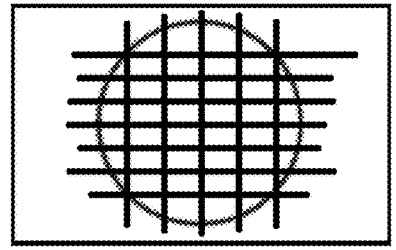

FIG. 24B depicts the exemplary user's modification of the line art (2414), or alternatively depicts the "line art layer" combined with "artist's blue lines". In this case, the user chose to prepare a grid of guiding lines, for creating checkerboard patterns.

To show the robustness of the herein-disclosed methods, the guiding lines are anti-aliased and unnecessarily thick.

Figure 24C:
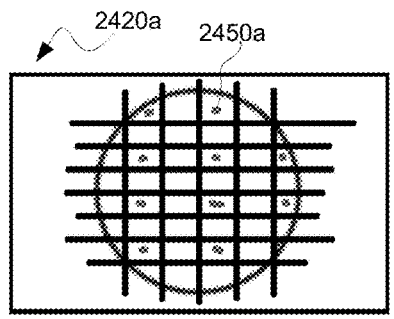

FIG. 24C depicts an instance of the "working layer" (2420*a*), in this case showing a combination of the "line art layer", possibly "artist's blue lines", and a "flats/blobs layer". This combination shows the user's "color blobs"—such as exemplary "blob" (2450*a*)—which the user placed on the "flats/blobs layer", and which the user set by use of a PB and/or a pixel editor—and these "color blobs" were each assigned the same "color" and "high priority", set by use of a PB. (The specific priority settings, discussed here, will generate excellent and consistent joins between the checkboard squares.)

Figure 24D:
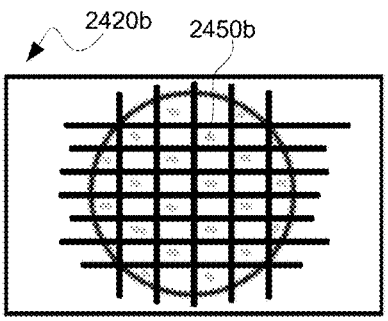

FIG. 24D depicts the current "working layer" (2420*b*), in this case showing a combination of the "line art layer", possibly "artist's blue lines", and new "flats/blobs layer"—with the prior blobs not shown, for easier working. This combination shows the user's newest "color blobs"—such as exemplary blob (2450*b*)—which the user placed on the new "flats/blobs layer", and which the user set by use of a PB and/or a pixel editor—and these color blobs were each assigned the same "color" (but different from the prior color blobs), with lower "priority" than the prior blobs.

Figure 24E:
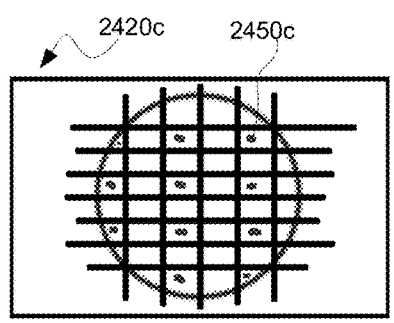

FIG. 24E depicts the current "working layer" (2420*c*), in this case showing a combination of the "line art layer", possibly "artist's blue lines", and new "flats/blobs layer"—with the prior blobs not shown, for easier working. This combination shows the user's newest "color blobs"—such as exemplary blob (2450*c*)—which the user placed on the new "flats/blobs layer", and which the user set by use of a PB and/or a pixel editor—and these color blobs were each assigned the same "color" (but different from the prior color blobs), with lowest "priority".

Figure 24F:
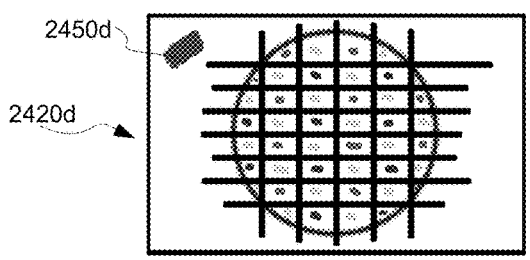

FIG. 24F depicts the current "working layer" (2420*d*), in this case showing a combination of the "line art layer", possibly "artist's blue lines", and the "flats/blobs layers" now combined into a single "flats/blobs layer". This combination shows the user's new "color blob" (2450*d*), which the user placed on the "flats/blobs layer", by use of a PB and/or a pixel editor.

Figure 24G:
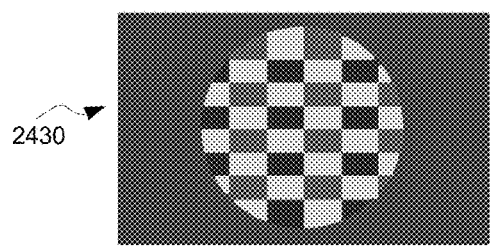

FIG. 24G shows the resulting "flats layer" (2430) computed by an implementation of the present inventions.

Figure 24H:
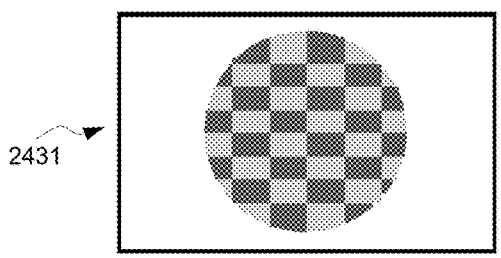
Figure 24:
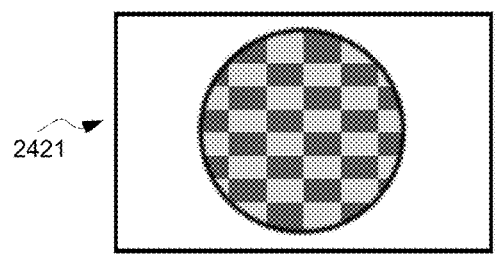

FIG. 24H shows a modified "flats layer" (2431), which is the prior "flats layer" but after the user used "x-fills" or bucket fills, or color swaps, to set the checkerboard's final two colors, not the three prioritized colors used for easily creating the excellent and consistent joins between checkers.

FIG. 24I shows the "working layer" (2421), which here shows the final "production image", which in this case, according to the user's choice, is a "Multiply mode" combination of the original line art or "line art layer" (2410), and the user's modified "flats layer" (2431).

36. Discussion of the Inventions

FIGS. 25A-25D illustrate an exemplary workflow and approach, for quickly and easily coloring, flatting, and trapping "spikes", in the context of what is herein referred to as "coloring book"-style flatting; and furthermore illustrate "gap control".

Figure 25A:
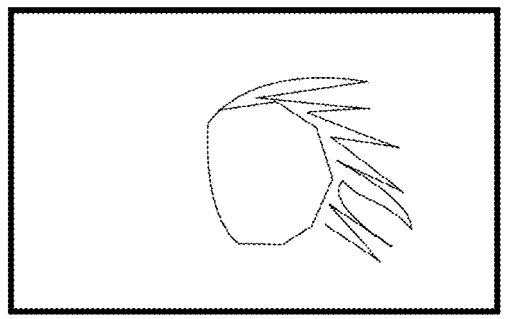
FIGS. 25A-25D illustrate an exemplary workflow and approach, for quickly and easily coloring, flatting, and trapping "spikes", in the context of what is herein referred to as "coloring book"-style flatting; and furthermore illustrate "gap control".

FIG. 25A depicts an exemplary instance of a user's "line art layer" (2510) with the user's line art, which here is anti-aliased.

Figure 25B:
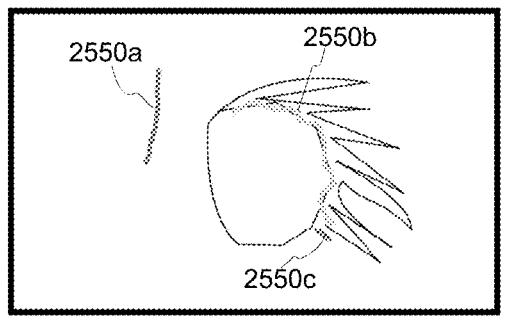

FIG. 25B depicts an instance of the "working layer" (2520a), in this case showing a combination of the "line art layer" and a "flats/blobs layer". This combination shows the user's "color blobs"—(2550a) has the outer area's color, (2550b-2550c) has character color—which were set with a PB and/or pixel editor.

Figure 25C:
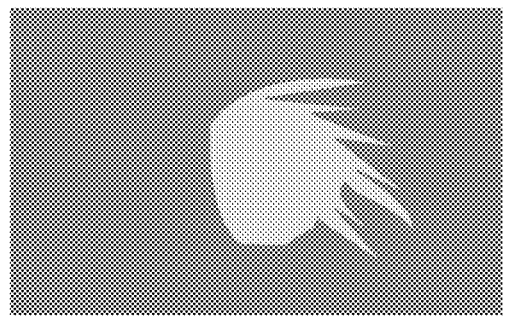

FIG. 25C shows the resulting "flats layer" (2530) computed by an implementation of the present inventions.

Figure 25D:
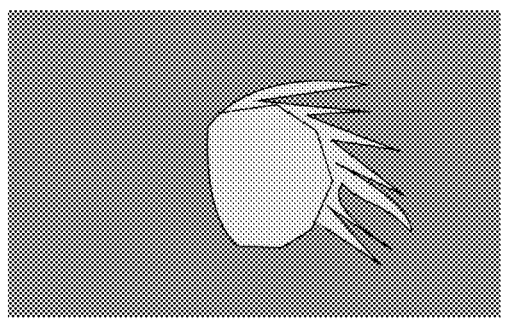

FIG. 25D shows the "working layer" (2520b), which here shows the final "production image", which in this case, according to the user's choice, is a "Multiply mode" combination of the original "line art layer" (2510), and the user's current "flats layer" (2530).

FIGS. 26A-26H illustrate an exemplary workflow and approach, for coloring, flatting, and trapping "spikes", in the context of "back-to-front"-style flatting; and furthermore illustrate quick "touch ups" with the herein-disclosed "UPB tool"; and furthermore illustrate "gap control". In particular, coloring such types of complex line art is a common problem in comics art, in the background art/field.

Figure 26A:
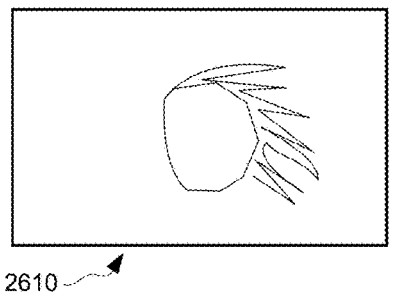
FIGS. 26A-26H illustrate an exemplary workflow and approach, for coloring, flatting, and trapping "spikes", in the context of "back-to-front"-style flatting; and furthermore illustrate quick "touch ups" with the herein-disclosed "UPB tool"; and furthermore illustrate "gap control".

FIG. 26A depicts an exemplary instance of a user's "line art layer" (2610) with the user's line art, which here is anti-aliased.

Figure 26B:
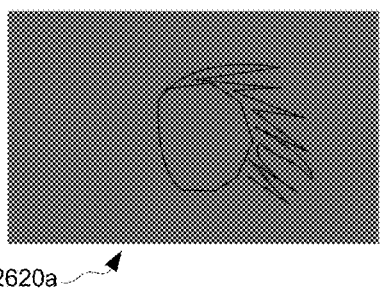

In preparation for "back-to-front" flatting, the exemplary user fills the "flats/blobs layer" with a single base/starting color. FIG. 26B depicts an instance of an exemplary software application's (implementing the herein-disclosed inventions) "working layer" (2620a), in this case showing a combination of the "line art layer" and the "flats/blobs layer". According to the user's choice, the combination is a "Multiply mode" combination of the layers.

Figure 26C:
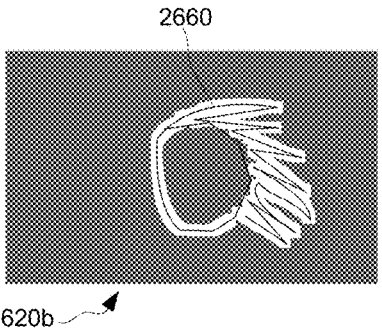

FIG. 26C shows the current "working layer" (2620b), which shows the aforementioned "Multiply mode" combination, but also shows a highlighted path/region (2660) that shows the pixels affected by the user's use of the UPB. Specifically, the pixels that the user changes from PIPs to UPIPs, using the UPB. That is, shows the location of a user-chosen "UPIP blob". Alternatively, the paths/regions can be tinted, or not shown, or etc., based on the user's preferences.

Figure 26D:
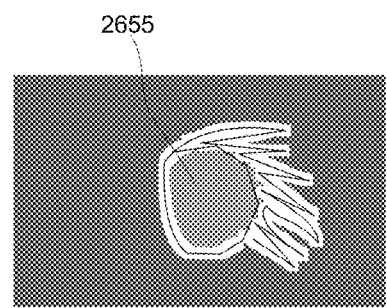

FIG. 26D shows the current "working layer" (2620c), which shows a combination of the aforementioned layers and paths/regions, but also shows the UPB's selection's "interior region" colored (2655) with a new set of PIP properties. For example, colored by the user's "x-fill" or "z-fill" or bucket-fill, or colored automatically (such as with a user-selected, pre-selected color) by the software's computation of the UPB region's "interior PIPs".

Next, the herein-disclosed coloring methods were applied.

Figure 26E:
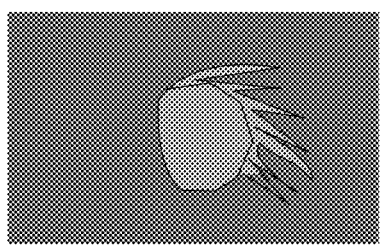

FIG. 26E shows the "working layer" (2620d), which according to the user's choice is a "Multiply mode" combination of the "line art layer" (2610) and the current/computed "flats layer".

For demonstration purposes, the UPB was insufficiently placed in the prior steps, thereby resulting in a color "leak", easily noticeable in the lowest "spike's" incomplete coloring.

Figure 26F:
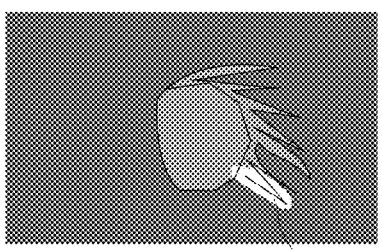

FIG. 26F shows the current "working layer" (2620e), but also shows a highlighted path/region (2667a) that shows the pixels affected by the user's use of the UPB. Specifically, the pixels that the user changes from PIPs to UPIPs, using the UPB. That is, shows the location of a user-chosen "UPIP blob". In this case, the "UPIP blob" is a quick "touch up", to fix the prior "leak". Note: "opposite flow" PIPs can be used for prioritizing the foreground object's color in the "spikes".

Next, the herein-disclosed coloring methods were applied.

Figure 26G:
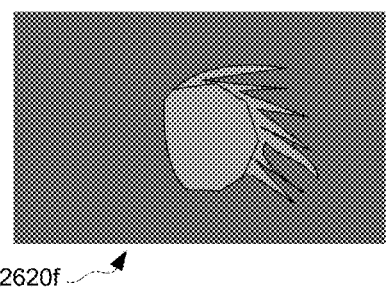

FIG. 26G shows the "working layer" (2620f), which here shows the final "production image", which in this case, according to the user's choice, is a "Multiply mode" combination of the original "line art layer" (2610), and the user's current "flats layer" (2630).

Figure 26H:
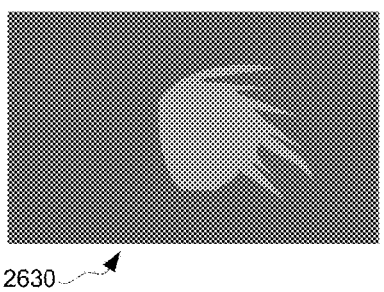

FIG. 26H shows the resulting "flats layer" (2630) computed by an implementation of the present inventions.

37. Discussion of the Inventions

FIGS. 27A-27F illustrate an exemplary workflow and approach, for using "back-to-front"-style flatting to color (or segment) art, including photographic images. In this case, coloring/colorizing a photograph—either grayscale or color. For color photos, the reference colors "iteration" step is often easier if the photo is temporarily transformed to grayscale, for the present example's segmentation of the photo.

FIG. 27A depicts an exemplary instance of a user's art—or alternatively, depicts a "line art layer" (2710) with the user's art—which in this case is a grayscale photo or color photo or temporarily-grayscale color photo.

Figure 27B:
Figure 27B:

FIG. 27B depicts the user's or computer's modification of the user's line art—or alternatively, depicts the "line art layer" but now with the modified line art (2713). In this case, the user chose to slightly darken the art, to facilitate the segmentation steps by temporarily increasing contrast.

In preparation for "back-to-front" flatting, the exemplary user fills the "flats/blobs layer" with a single base/starting color. FIG. 27C depicts an instance of an exemplary software application's (implementing the herein-disclosed inventions) "working layer" (2720a), in this case showing a combination of the "line art layer" and the "flats/blobs layer". According to the user's choice, the combination is a "Multiply mode" combination of the specified layers, but it also shows a highlighted path/region (2760) that shows the pixels affected by the user's use of the UPB. Specifically, the pixels that the user changes from PIPs to UPIPs, using the UPB. Specifically, shows the location of a user-chosen "UPIP blob" (which in this case encircles multiple sets or areas of PIPs). Alternatively, the path/region can be tinted, or not shown, or etc., based on the user's preferences.

Figure 27D:
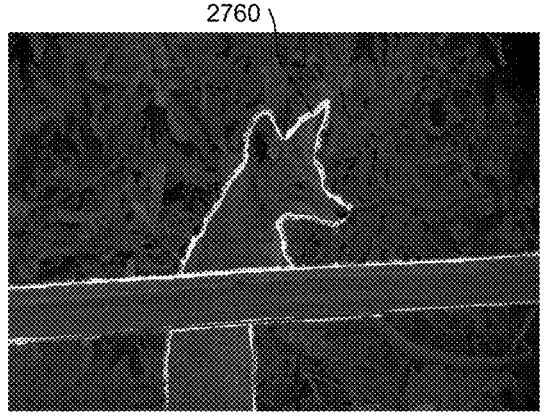
Figure 27D:
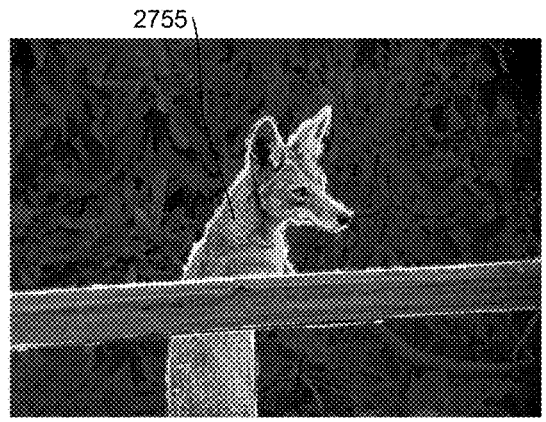

FIG. 27D shows the current "working layer" (2720b), which shows a combination of the aforementioned layers and path/region, and also shows colored "interior regions", including example (2755), which the user colored with a new set of PIP properties, such as colored by the user's "z-fill", or "x-fill", or bucket-fill. That is, shows the UPB's selection's "interior regions" colored with a new set of PIP properties.

Next, one of the herein-disclosed coloring methods was applied to the image points.

FIG. 27E shows the current "working layer" (2720c), which shows a "production image", which in this case, according to the user's choice, is a "Multiply mode" combination of the original "line art layer" (2710) or the original full-color photo or the modified "line art layer" (2713), and the current/computed "flats layer" (2730) which resulted from running the aforementioned coloring method.

Figure 27F:
Figure 27F:
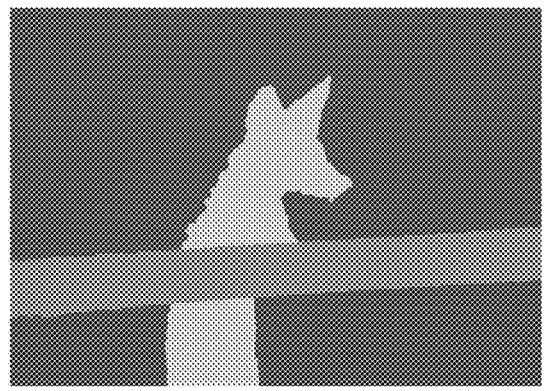

FIG. 27F shows the resulting "flats layer" (2730) computed by an implementation of the present inventions. The grayscale or multi-colored photo has successful coloring or segmentation. Tighter bounds on the image elements can be obtained by using the more complex "flows" disclosed herein.

38. Discussion of the Inventions

FIGS. 28A-28F demonstrate that the herein-disclosed "extension flow" coloring is robust and is able to yield tight color joins and tight segmentations, including in cases where the herein-disclosed "UPB tool" is placed awkwardly or roughly.

Figure 28A:
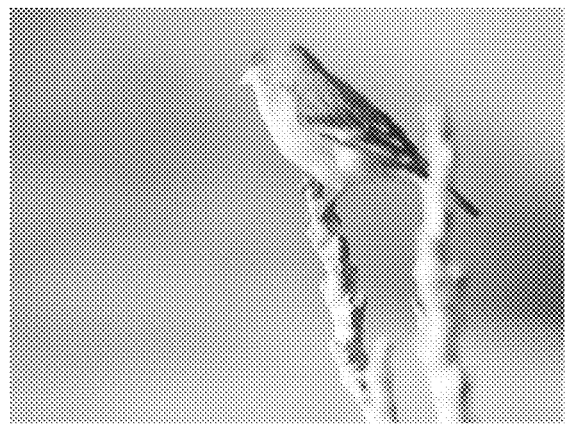
FIGS. 28A-28F demonstrate that the herein-disclosed "extension flow" coloring is robust and is able to yield tight color joins and tight segmentations, including in cases where the herein-disclosed "UPB tool" is placed awkwardly or roughly.

FIG. 28A depicts an exemplary instance of a user's art—or alternatively, depicts a "line art layer" (2810) with the user's art—which in this case is a grayscale photo or color photo or temporarily-grayscale color photo.

Figure 28B:
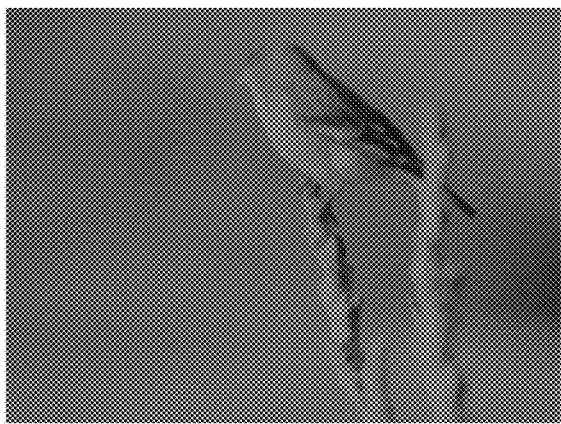

In preparation for "back-to-front" flatting, the exemplary user fills the "flats/blobs layer" with a single base/starting color. FIG. 28B depicts an instance of an exemplary software application's (implementing the herein-disclosed inventions) "working layer" (2820a), in this case showing a "Multiply mode" combination of the "line art layer" and the "flats/blobs layer".

Figure 28C:
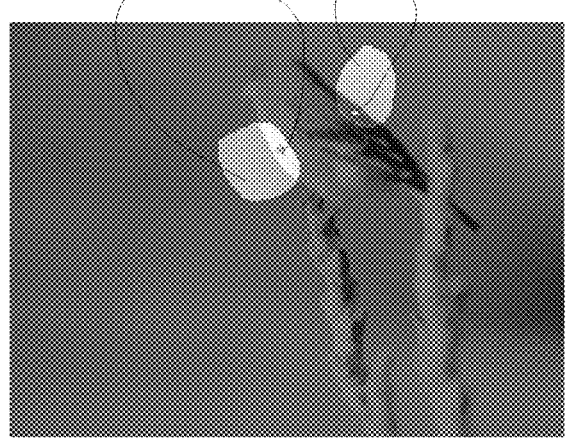

FIG. 28C shows the current "working layer" (2820b), which here shows a combination of the aforementioned layers and two "PIP blobs"—(2850a) set in a lighter-colored area of the photo's foreground, (2850b) set in a darker-colored area of the photo's foreground—with some chosen colors and with "extension flow", such as set by a PB. Prior to setting the "PIP blobs", the exemplary user first used the UPB to set the area to be processed, in this case by unnecessarily-large "UPIP blobs" (2862a, 2862b), thus showing the flexibility/robustness of the herein-disclosed inventions.

Next, one of the herein-disclosed coloring methods was applied to the image points.

Figure 28D:
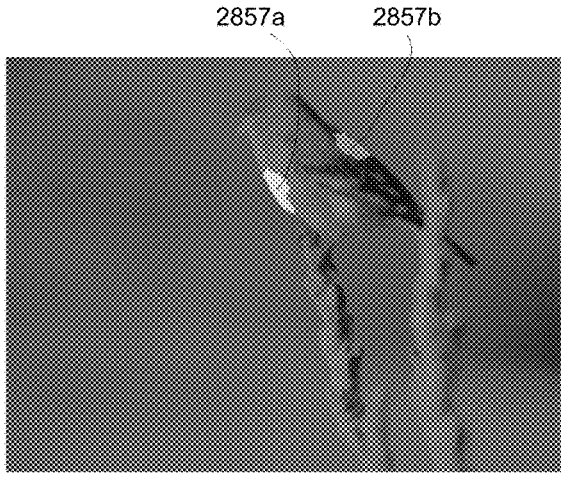

FIG. 28D shows the current "working layer" (2820c), which shows a "Multiply mode" combination of the original "line art layer" (2810) or a full-color photo, and the current/computed "flats layer" which resulted from running the aforementioned coloring method. The current "PIP blobs" (2857a, 2857b) are now coloring the prior-specified region—with accurate segmentation or coloring at the boundaries.

Figure 28E:
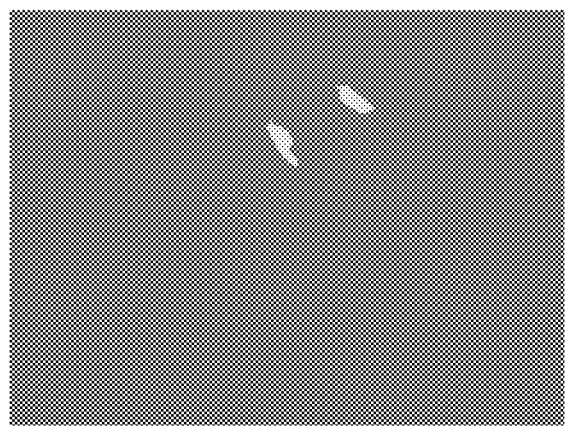

FIG. 28E shows the "flats layers" (2830) that resulted from running the aforementioned method.

Figure 28F:
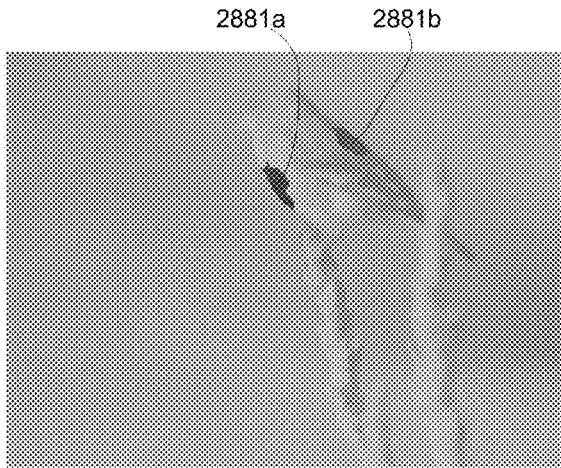

FIG. 28F shows a new "working layer" (2880), with new colorings, set by the user, for the background, foreground, plus the "segmentation blobs or color blobs" (2881a, 2881b).

FIGS. 29A-29D illustrate using the herein-disclosed "multi-multi-flow" to color complex graphics, in this example by using five small "color blobs" to accurately color multiple textured/complex/patterned regions.

Figure 29A:
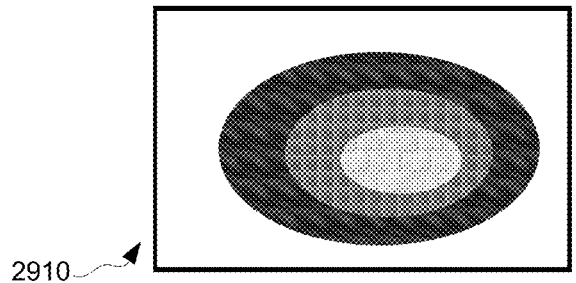
FIGS. 29A-29D illustrate using the herein-disclosed "multi-multi-flow" to color complex graphics, in this example by using five small "color blobs" to accurately color multiple textured/complex/patterned regions.

FIG. 29A shows a "line art layer" (2910), which shows a complex grayscale image (or multi-color image, or temporarily-grayscale color image), in this case with textured and different-colored regions.

Figure 29B:
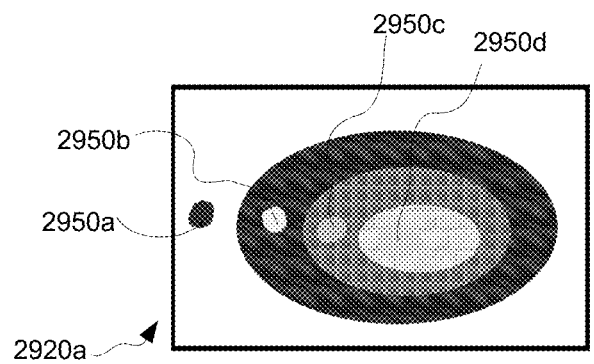

FIG. 29B shows the current "working layer" (2920a), which shows some "PIP blobs" (2950a-2950d), with some chosen colors and with "multi-multi-flow", such as set by a PB.

Figure 29C:
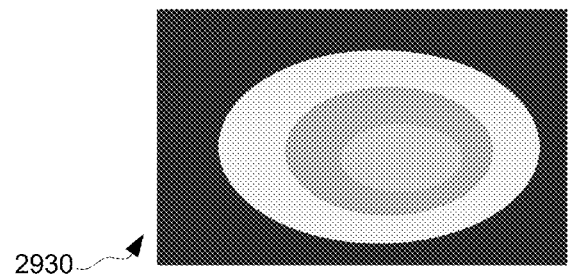

FIG. 29C shows the resulting "flats layer" (2930), resulting from running one of the herein-disclosed coloring/segmenting methods.

Note that the complex, multi-colored regions are each successfully segmented.

Figure 29D:
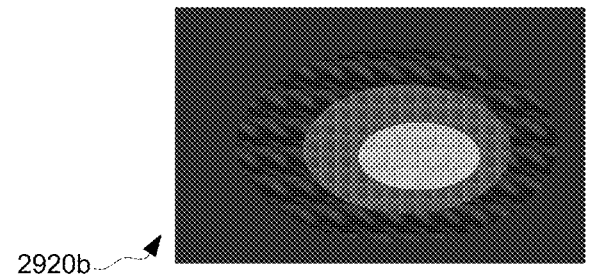

FIG. 29D shows the current "working layer" (2920b), which here shows a "Multiply mode" combination of the "line art layer" (2910) and "flats layer" (2930), which shows the "production image".

39. Discussion of the Inventions

FIGS. 30A-30H illustrate quick and easy coloring/flatting/trapping of rough sketches, including in this example rough sketches with large numbers of line art gaps; and furthermore illustrate using the resulting coloring and/or segmentation to add textures and/or special effects (such as shadows, or gradients, etc.) to the graphics, including (for example) for producing animation frames.

Figure 30A:
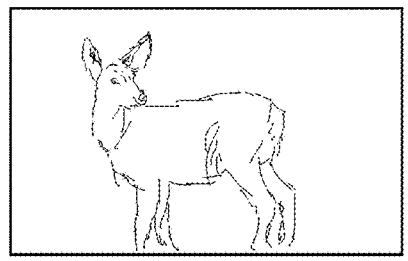
FIGS. 30A-30H illustrate quick and easy coloring/flatting/trapping of rough sketches, including in this example rough sketches with large numbers of line art gaps; and furthermore illustrate using the resulting coloring and/or segmentation to add textures and/or special effects (such as shadows, or gradients, etc.) to the graphics, including (for example) for producing animation frames.

FIG. 30A shows the "line art layer" (3010), which shows the user's exemplary line art, which here is an anti-aliased rough sketch with numerous line art "gaps".

Figure 30B:
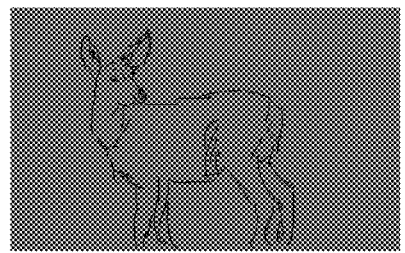

Next, in preparation for "back-to-front flatting", the user filled the "flats layer" with a single color. FIG. 30B shows the current "working layer" (3020a), which shows a "Multiply mode" combination of the "line art layer" and current "flats layer".

Figure 30C:
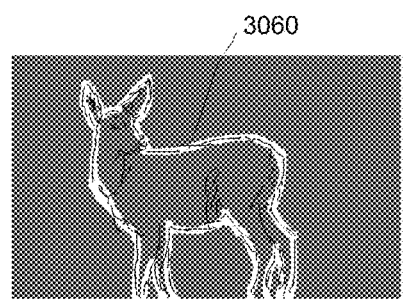

FIG. 30C shows the "working layer" (3020b), which shows the aforementioned combination of layers, and a "UPIP blob" (3060), set by a UPB, quickly and roughly outlining the character in the sketch.

Figure 30D:
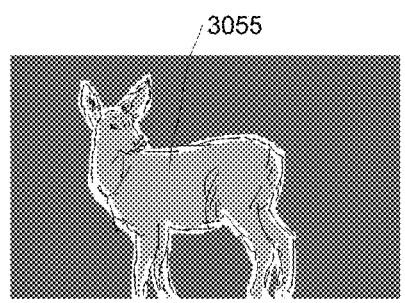

FIG. 30D shows the "working layer" (3020c), which shows the same things as in FIG. 30C, and now also shows a large "PIP blob" (3055), set either by the user or by automatic fill of the UPIP blob's "interior region".

Figure 30E:
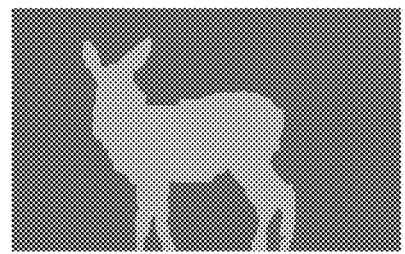
Figure 30F:
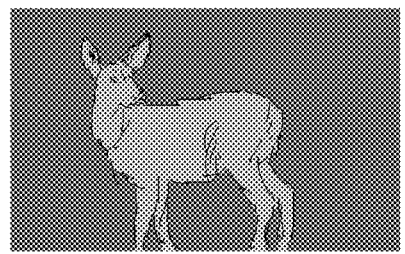

FIG. 30E shows the current "flats layer" (3030), computed by the herein-disclosed methods. FIG. 30F shows the "working layer" (3020d), which here is a "Multiply mode" combination of the "line art layer" (3010) and current "flats layer" (3030). This is a possible "production image", but let's assume the user wants to modify it with some extra effects.

Note that the character, which was an anti-aliased and "gappy" rough sketch, is successfully colored or segmented.

Figure 30G:
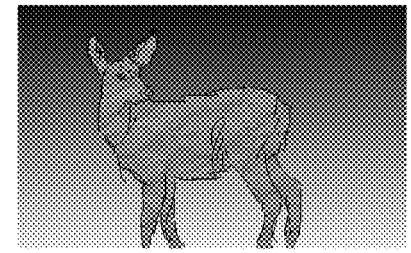

FIG. 30G shows the "working layer" (3022a), but now the "flats layer" (3030)—which was successfully colored/segmented as shown in FIG. 30E—has been modified by the user, with some effects. In this case, the background region, which was successfully segmented, was easily switched, such as with a cut-paste, to a colorful gradient effect, and the character region—successfully segmented—was easily switched to a complex texture. This is a possible alternative "production image".

Figure 30H:
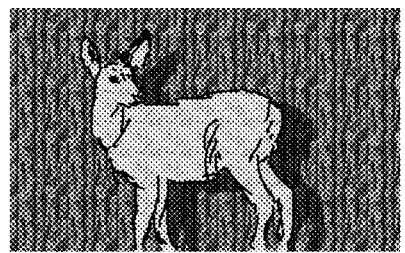

FIG. 30H shows the "working layer" (3022b), but now the "flats layer" (3030) has been modified by the user, with some new texture effects, plus thicker line art, plus a "shadow effect" which was based on the character's successful segmentation shown in FIG. 30E.

40. Discussion of the Inventions

FIGS. 31A-31F demonstrate that the present disclosure's techniques are equally applicable to photographed line art and photographed art; and furthermore illustrate using the coloring or segmentation to add textures and/or special effects (such as shadows, etc.) to the photographic graphics.

Figure 31A:
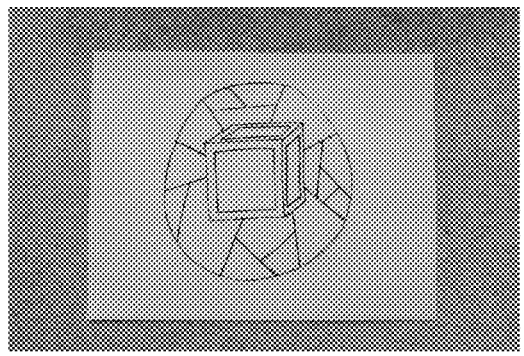
FIGS. 31A-31F demonstrate that the present disclosure's techniques are equally applicable to photographed line art and photographed art; and furthermore illustrate using the coloring or segmentation to add textures and/or special effects (such as shadows, etc.) to the photographic graphics.

FIG. 31A shows a "line art layer" (3111), or alternatively the user's art, where in this case the user's art is a photograph of the user's line art.

Figure 31B:
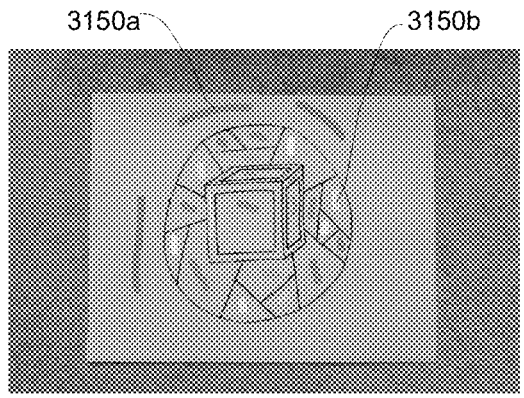

FIG. 31B shows the "working layer" (3120a), which shows a combination of the "line art layer" (3111) and the user's "PIP blobs", such as exemplary "PIP blobs" (3150a, 3150b), where (3150a) sets the background or enclosing color, and (3150b) sets one of the foreground elements' color.

Figure 31C:
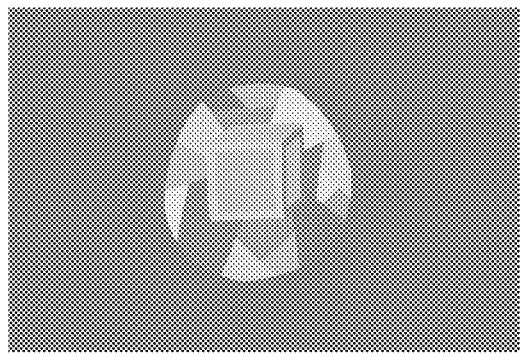

FIG. 31C shows the "flats layer" (3130) computed by one of the herein-disclosed methods.

Figure 31D:
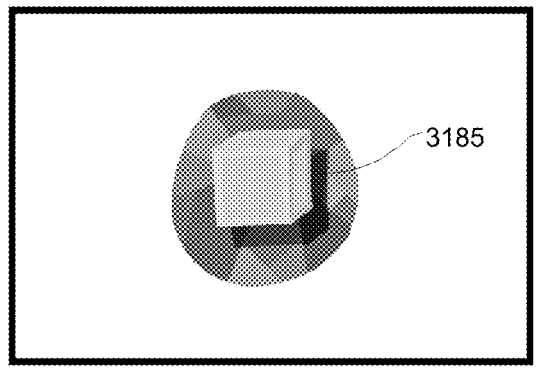

FIG. 31D shows a modified "flats layer" (3132), where the computed flats colors are modified, such as by the user, to their final colors. The user also added a "shadow effect" (3185), based on the shape of the "cube" object's computed flats, i.e. segmentation.

Figure 31E:
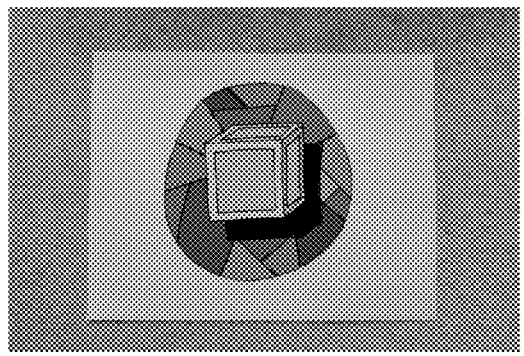

FIG. 31E shows the "working layer" (3120b), which is the "production image", which here is a "Multiply mode" combination of the "line art layer" (3111) and the modified "flats layer" (3132).

Figure 31F:
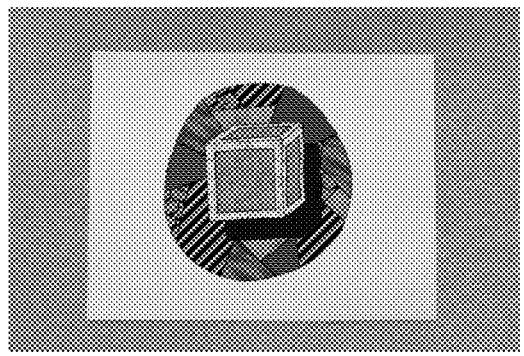

FIG. 31F shows a new "working layer" (3122), which is similar to that in FIG. 31E, except now the modified "flats layer" (3132) was again modified, in this case with color and texture effects in the flatted or segmented regions.

41. Discussion of the Inventions

FIGS. 32A-32F illustrate steps for an exemplary technique for compositing graphics, in this case compositing a photographic image with the colored/flatted/trapped line art; and furthermore show that the disclosed compositing accurately blends the graphics; note that this technique can also be used to create composites to generate motion frames, for example such as combining actors with cartoons.

Figure 32A:
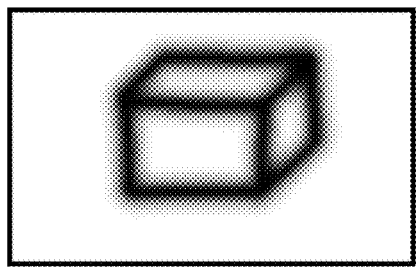
FIGS. 32A-32F illustrate steps for an exemplary technique for compositing graphics, in this case compositing a photographic image with the colored/flatted/trapped line art; and furthermore show that the disclosed compositing accurately blends the graphics; note that this technique can also be used to create composites to generate motion frames, for example such as combining actors with cartoons.

FIG. 32A shows the "line art layer" (3210), which here shows the user's art or line art, in this case anti-aliased line art.

Figure 32B:
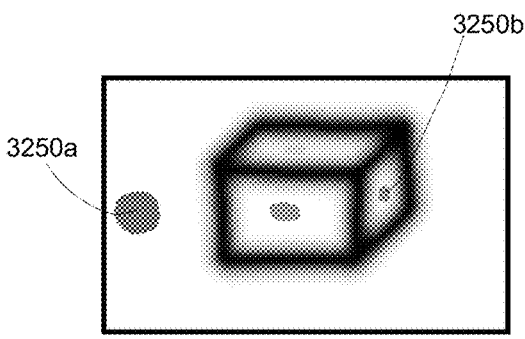

FIG. 32B shows the "working layer" (3220a), which here shows a "Multiply mode" combination of the "line art layer" (3210) and the "flats layer", where the "flats layer" has some exemplary "PIP blobs"—e.g., (3250a) which is placed in the background region, (3250b) which is placed in a foreground or object region, here a cube-like object. Alternatively, the line art and "PIP blobs" can be placed on a single layer, with the line art pixels tagged as "UPIP" status, and the color blobs tagged as "PIP" status. In such a case, for ease, grayscale pixels signify "UPIPs", colored pixels signify "PIPs".

Figure 32C:
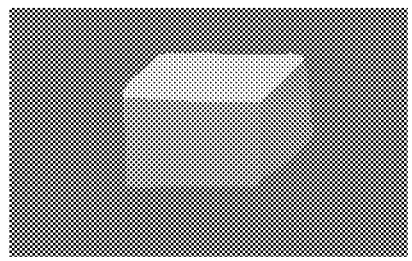

FIG. 32C shows the "flats layer" (3230) resulting from running the herein-disclosed methods. Thus, coloring and/or segmenting the foreground object or character, and line art elements. Alternatively, in the single layer option, the Figure shows the resulting single layer, after running the herein-disclosed methods, which produces the flats, shown here.

Figure 32D:
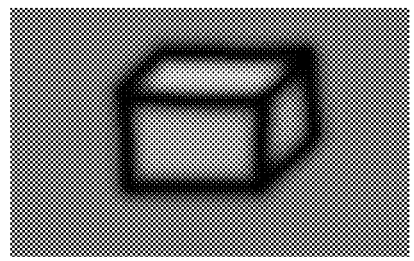

FIG. 32D shows the "working layer" (3220b), which here is a "Multiply mode" combination of the "line art layer" (3210) and the computed "flats layer" (3230).

The user now wants to "composite" the colored/segmented line art, onto a different image, in this case a full-color photograph. For example, for producing a frame, compositing actors with animation. In this case, putting the colored cartoon cube-like object onto a photographic image.

For the "compositing" step, the user starts, in this case, with the full-color photo as the background. Next, for example, the user, or computer, copy-pastes the different object segments which were computed on the "flats layer" (3230), such as the object segment that resulted from the exemplary "PIP blob" (3250b), e.g. object segment (3288) which here represents the rightmost side of the line art's cube-like object. Next, for example, the user, or computer, performs a "Multiply mode" combination of this combined image and the original "line art". I.e., a "Multiply mode" is preferred, but not required, to combine the line art with the underlying image. E.g., the cube object's line art might be pasted, or pasted with alphas based on the grayscales, or etc.

Figure 32E:
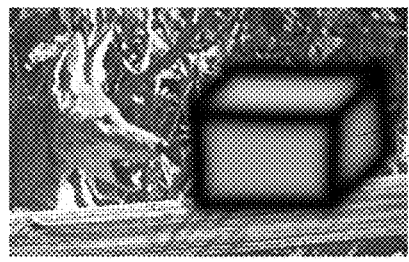

FIG. 32E shows the result of these steps. It shows a "working layer" (3220c), which shows the background photographic image, optionally full color, and the pasted flats/segments of the cube-like object, i.e. the object segments in the "flats layer" (3230), for example the "PIP blob" or segment (3288) representing the rightmost side of the cube-like object, where this segment corresponds to the user's original "PIP blob" (3250b) that was put in the cube-like object's rightmost side element. The Figure also shows a copy of the original "line art" (3289), which is now placed correctly on top of the cube-like object's segments, and combined with a "Multiply mode" combination onto the underlying image.

Note: the pasted flats segments, and the copy of the line art, can be placed anywhere on the image. Preferably, the segments and line art are treated as a group, and can thus be easily placed on any image or frame, including slid around for better placement in the production workflow.

Figure 32F:
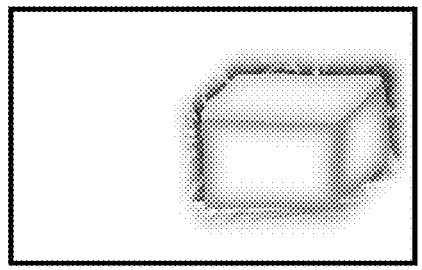

FIG. 32F shows a "working layer" (3240) showing a difference or "Screen mode" combination, not a "Multiply mode" combination. It shows that the object was successfully flatted/trapped, with the foreground and background meeting exactly in the center of the line art's lines.

FIGS. 33A-33E demonstrate that the present disclosure's techniques are robust, in this case by showing a segmentation specified by way of a thick white rope (rather than black line art); and furthermore illustrate how to use the coloring or segmentation in order to composite multiple items, in this case multiple photographic images.

FIG. 33A shows the "line art layer" (3311), which here shows the user's art, in this case the art is a photograph. The photograph is grayscale, or color, or temporarily-grayscale color photo.

In this example, to show the robustness of the herein-disclosed coloring/segmenting methods, a mottled rope object, in the photo, will constitute the line art, rather than black lines as line art.

FIG. 33B shows the "working layer" (3320a), which here shows a "Multiply mode" combination of the "line art layer" (3311) and the "flats layer", where the "flats layer" has some exemplary "PIP blobs"—e.g., (3350a) which is one of a few placed in the background region, (3350b) which is placed in a foreground or object region, here the rope-enclosed region. Note that "opposite flow" was used, since the line art is now white rather than black. Alternatively, the line art and "PIP blobs" can be placed on a single layer, with the photo i.e. line art pixels tagged as "UPIP" status, and the "color blobs" tagged as "PIP" status.

FIG. 33C shows the "flats layer" (3330) resulting from running the herein-disclosed methods. Thus, coloring and/or segmenting the foreground object or character, and line art elements. Alternatively, in the single layer option, the Figure shows the resulting single layer, after running the herein-disclosed methods, which produces the flats, shown here.

FIG. 33D shows the "working layer" (3320b), which here is a "Multiply mode" combination of the "line art layer" (3311) and the computed "flats layer" (3330).

Figure 33E:
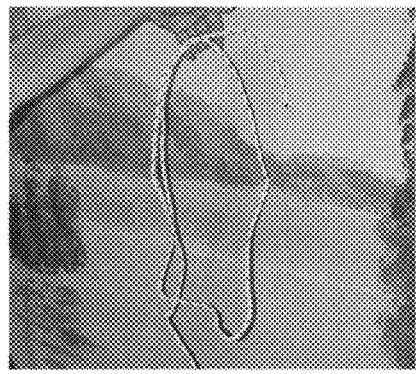
Figure 33E:
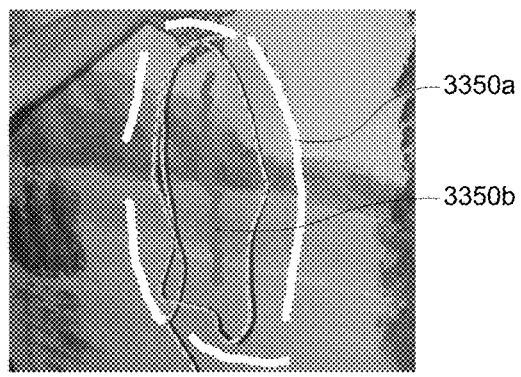
Figure 33E:
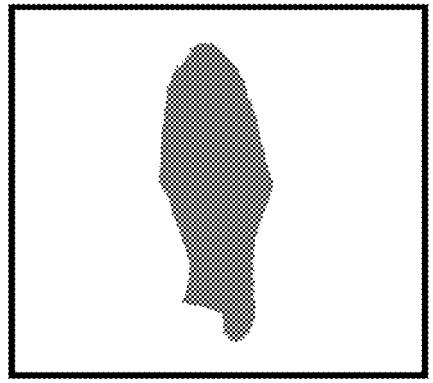
Figure 33E:
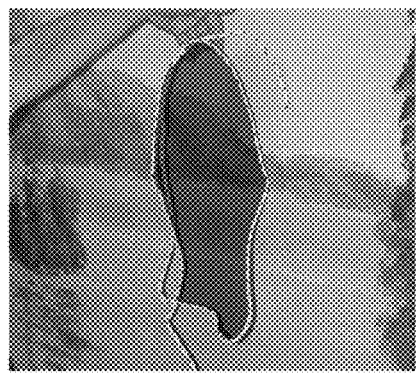
Figure 33E:
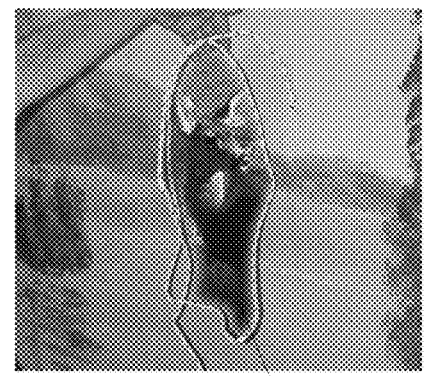

FIG. 33E shows a "working layer" (3323), where now the user replaced the "flats layer's" rope-encircled segmentation region, with a new photograph (3384) rather than a texture, in this case a color photo, pasted into the rope segmented region. For better blending, the new photo's outer area was blurred/blended and an alpha gradient was applied.

FIGS. 34A-34G demonstrate that the present disclosure's techniques can be used not just for compositing graphics (such as colored line art, or photographs, or photographs of line art), but can in addition be used for special effects, such as in this case a "transparency" effect, and in particular can be used for generating animation frames—in this case, animation frames showing a piece of the photographed line art (now colored, too) detaching then "flying" across the graphic; and furthermore demonstrate that the disclosed techniques can in addition be used for complex compositing of motion frames or animation frames, such as in this case quickly and easily combining a photographic image with multiple copies of the (now colored) photographed line art.

Figure 34A:
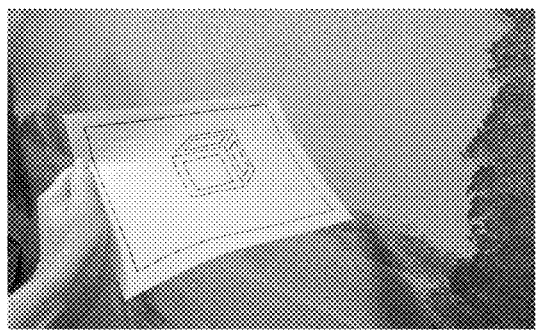
FIGS. 34A-34G demonstrate that the present disclosure's techniques can be used not just for compositing graphics (such as colored line art, or photographs, or photographs of line art), but can in addition be used for special effects, such as in this case a "transparency" effect, and in particular can be used for generating animation frames—in this case, animation frames showing a piece of the photographed line art (now colored, too) detaching then "flying" across the graphic; and furthermore demonstrate that the disclosed techniques can in addition be used for complex compositing of motion frames or animation frames, such as in this case quickly and easily combining a photographic image with multiple copies of the (now colored) photographed line art.

FIG. 34A shows the "line art layer" (3411)—here, the user's art is a color photograph, which also contains line art within the photo.

Figure 34B:
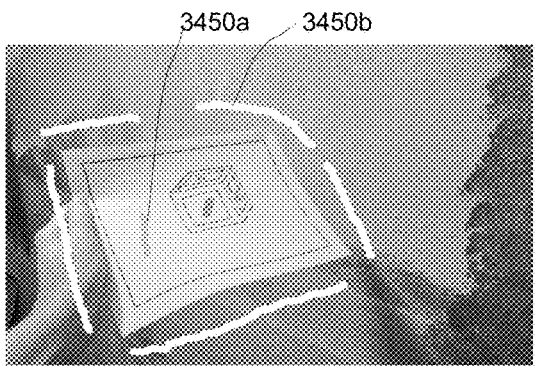

FIG. 34B shows the "working layer" (3420a), which here is a "Multiply mode" combination of the "line art layer" (3411) and the "flats layer" which in this case contains some "PIP blobs"—e.g., (3450a) which is one of a few blobs that color the cube-like object and its rectangle region, (3450b) which is one of a few blobs that color/segment the outer boundary of those elements.

Figure 34C:
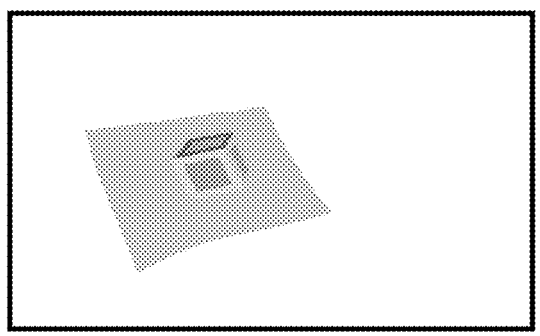

FIG. 34C shows the "flats layer" (3430) computed by running the herein-disclosed methods.

Figure 34D:
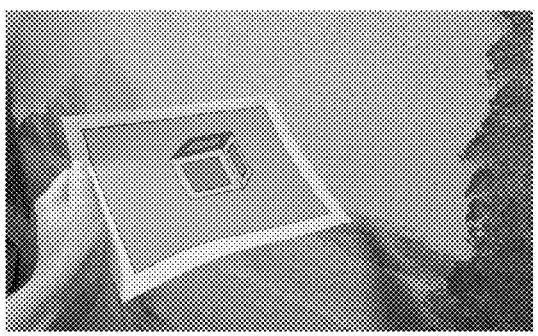

FIG. 34D shows the current "working layer" (3420b), which here is a "Multiply mode" combination of the "line art layer" (3411) and current "flats layer" (3430).

Note: it might be difficult to spot in the Figure, but the shading in the piece of paper in the photo has been preserved in the coloring, because of the choice of a "Multiply mode" combination. This is a useful effect for realistic coloring, or keeping shadows, highlights, etc. Alternatively, the user can e.g. lighten the paper in the photo, if the user does not want the paper's shading preserved.

Figure 34E:
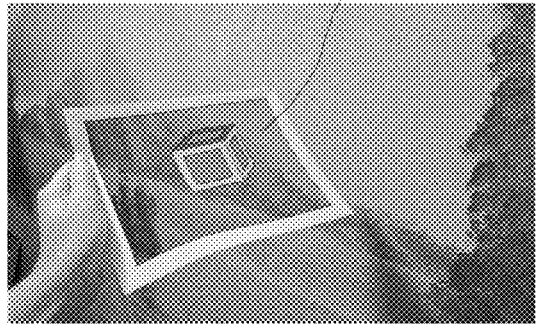

FIG. 34E shows the "working layer" (3424), which results from the user creating a transparency effect, by modifying the original "flats layer" (3430) by for example, in this case, copy-pasting a clean photo of the background painting, but segmented by the rectangular-like region that was successfully colored/segmented in the original "flats layer" (3430). This segmented subphoto (3486), pasted onto the "line art layer" or "flats layer", creates this transparency effect.

Figure 34F:
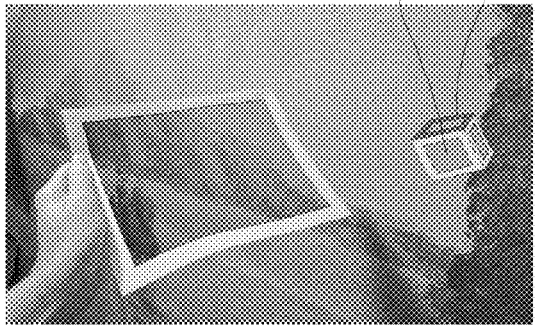

FIG. 34F shows the "working layer" (3425), which results from the user cutting out the "line art layer's" cube-like object, and cutting out the "flats layer's" cube-like object, then shifting the position of the cube-like object, using techniques such as those discussed for FIGS. 32A-32F. For example, by shifting the "flats layer's" cube-like segments, such as object segment (3488a), and the object's line art (3489a).

Figure 34G:
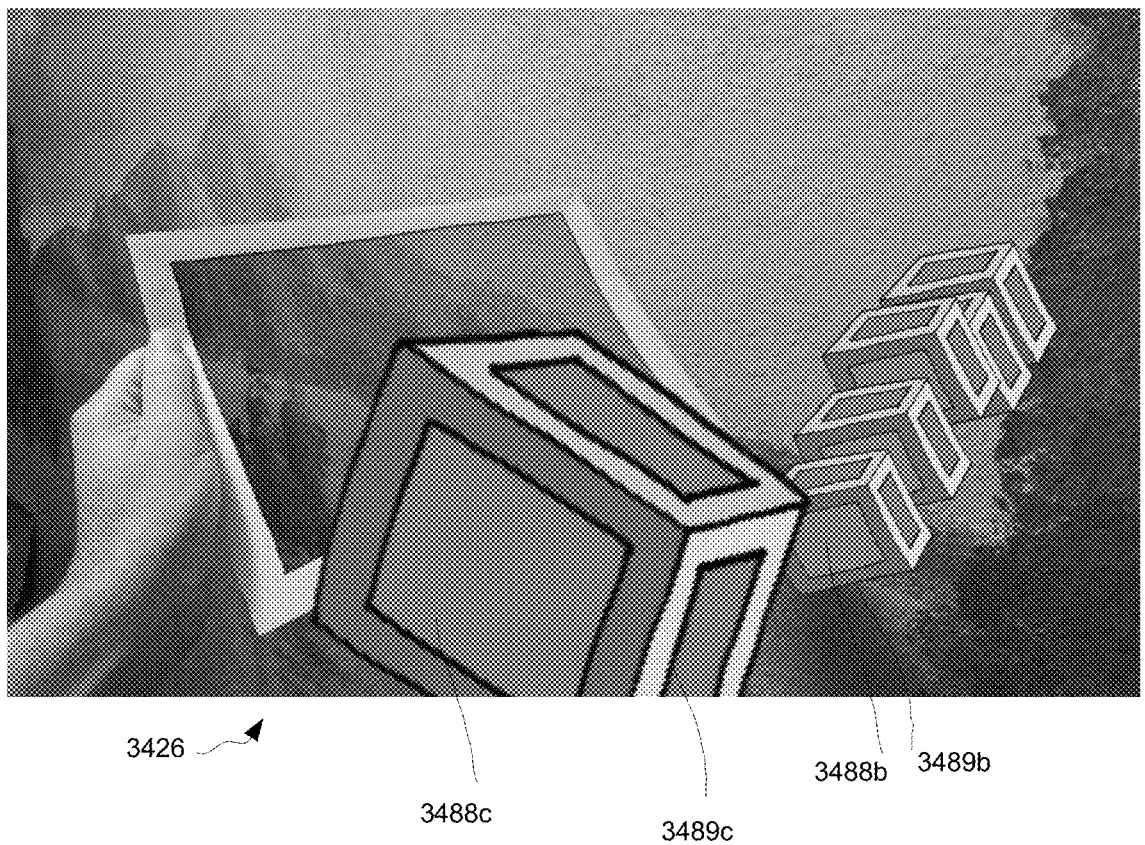

FIG. 34G shows the "working layer" (3426), here demonstrating effective "compositing" with the herein-disclosed methods. In this case, the steps discussed for FIGS. 32A-32F were applied repeatedly, using the cube-like object's flats/segments/colorings—such as (3488b)—and the cube-like object's line art—such as (3489b). In addition, for extra effects, the cube-like object's flats/segments/colorings were scaled larger and rotated—such as element (3488c)—and the cube-like object's line art was similarly scaled larger and rotated (3489c). Of course, to omit blocky pixelation effects, it is recommended that when an object is scaled larger, its art should be re-scanned at a higher resolution, rather than simply rescaled with interpolation.

41, Part 2. Extra Tips and Comments

With such easy compositing, comics or animation can be facilitated with the herein-disclosed methods, such as by for example pre-creating the characters or elements of a comics panel, then just shifting them around the panel for quick changes in the locations. Or, re-using them by pre-creating them, then e.g. compositing them on multiple comics pages or animation frames. E.g., by treating the segmented sections, with its line art, as a group, as was discussed for FIG. 32.

Thus, e.g., the comics' "penciler" artists, "inker" artists, "flats" artists, "colorist" artists, etc., will not need to re-process each character for each comics panel, i.e. they can re-use each fully-rendered element, or fully-rendered backgrounds, etc.

Note: the "color flats" can be replaced by the "colorist" artist's final colors or color rendering prior to the compositing or re-use of elements. E.g., FIG. 30 and FIG. 31 and FIG. 33 show that the "color flats" segmentation or selection of elements can be changed with a copy-paste of textures, and similarly, can be changed by "colorist" artists to the final form of the elements, such as final color, shading, highlights, "rendering", etc. Then, these more complex segments can be composited, rather than the flats segments. I.e., the comics workflow can re-use or composite fully-rendered elements, not just "color flats" segments—e.g., the fully-rendered "flats layer" segments shown in FIGS. 30, 31, 33.

In addition, note that "Multiply mode" combinations of line art layers and flats layers is common in the comics workflow. In the context of the present inventions, where multiple composites might be combined, such as shown in FIG. 34, one option is to pre-combine or composite the character layers into a single layer, with e.g. "darkest line art pixel" combination rather than "Multiply mode" pixel combination. That is, with lighter-color line art, "Multiply mode" combinations cause irregular darkening of common line art pixels. Thus, a "darkest line art pixel" combination is preferable.

42. Discussion of the Inventions

Figure 35E:
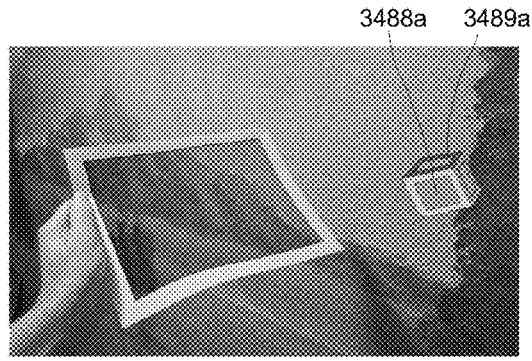
Figure 35E:
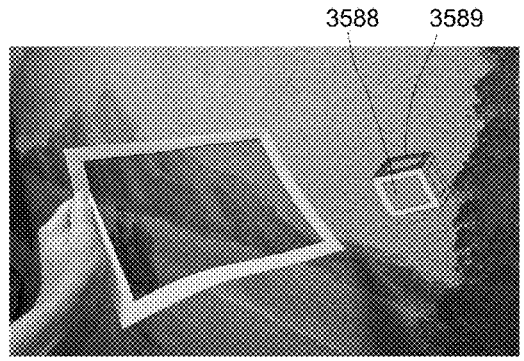
Figure 35E:
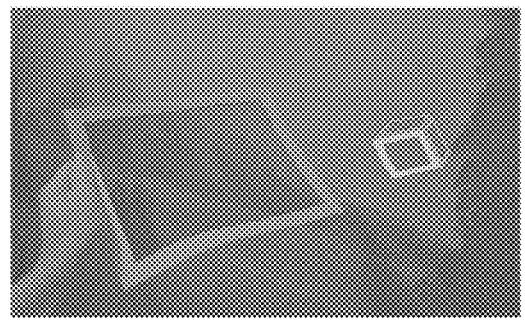
Figure 35E:
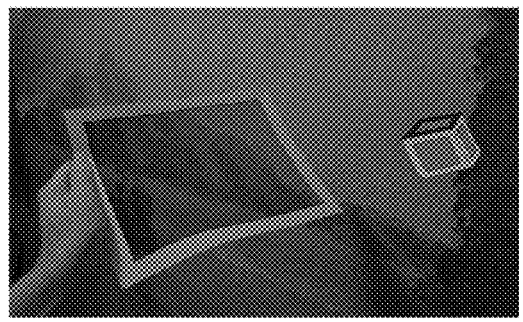
Figure 35E:
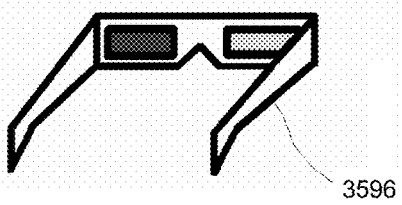
Figure 35E:
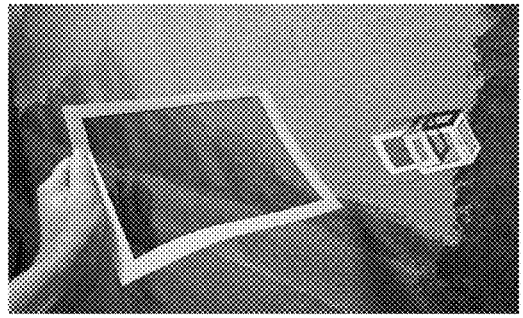

FIGS. 35A-35E show the herein-disclosed compositing feature used to easily create anaglyph "3D" effects in images, comics, animation, etc. FIG. 35A shows the same exemplary frame as in FIG. 34F, with the same "working layer" (3425), cube-like object segment (3488a)—one of multiple such—and cube-like object line art (3489a). FIG. 35B shows a new "working layer" (3525), with a new cube-like object segment (3588)—one of multiple such—and new cube-like object line art (3589). These new cube-like object segments and cube-like object line art, are the same as in FIG. 35A, and were produced as explained in the discussion of FIGS. 34A-34G and FIGS. 32A-32F, but positioned slightly more to the left compared to FIG. 35A, to create a stereoscopic "3D" effect. FIG. 35C shows a new image (3595a) or new layer, which is the image in FIG. 35B, but tinted to an anaglyph "3D" color, such as by eliminating the red color channel of the RGB-color image. FIG. 35D shows a new image (3595b) or new layer, which is the image in FIG. 35A, but tinted to an anaglyph "3D" color, such as by eliminating the blue and green channel of the RGB-color image. FIG. 35E shows a new image (3597) or new layer, which is a combination, such as a "Screen mode" combination, of the images in FIG. 35C and FIG. 35D. This is a "3D" anaglyph image, which is in conjunction with a pair of "3D" anaglyph glasses (3596). Of course, the images in FIG. 35A and FIG. 35B can be combined in alternative non-anaglyph ways, such as with different polarization, etc.

43. Discussion of the Inventions

The "Snap to Line Art" effect/method was discussed, in earlier sections.

FIG. 36 is a "computer program listing" of an exemplary embodiment of the herein-disclosed "Snap to Line Art" feature, for the case of multi-color (including grayscale, and anti-aliased) graphics.

FIG. 37 is a "computer program listing" of an alternative exemplary embodiment of the disclosed "Snap to Line Art" feature, for the case of grayscale graphics (including anti-aliased graphics, and including black-and-white graphics).

FIG. 38 is a "computer program listing" of an alternative exemplary embodiment of the disclosed "Snap to Line Art" feature, for the case of grayscale graphics (including anti-aliased graphics, and including black-and-white graphics).

FIG. 39 is a "computer program listing" of an alternative exemplary embodiment of the disclosed "Snap to Line Art" feature, for the case of grayscale graphics (including anti-aliased graphics, and including black-and-white graphics).

44. Additional Comments

It is to be understood that the above described embodiments are merely illustrative of numerous and varied other embodiments which may constitute applications of the principles of the present invention(s). Such other embodiments may be readily devised by those skilled in the art without departing from the spirit and scope of the invention(s) and it is intended that they be deemed within the scope of the invention(s).

45. Additional Comments Regarding the Claims

In the claims, each instance of the word "or" refers to an "inclusive or". That is, "A or B" means "A, or B, or A-and-B". The phrase "unpainted or painted" similarly is an "inclusive or", for purposes of generality, design-arounds, etc., but an "exclusive or" is a preferred mode.

In the present document, the phrase "in particular" or "particularly" is not intended as limiting, e.g. basically means "a particular or specific example which ought to be noted".

In the claims, the terms "first" and "second" are claims terms, specifying elements; i.e., not limiting, not specifying a sequence, etc.

What is claimed is:

1. A method for digitally coloring or segmenting comics art, animation art, line art, digital art, or digital graphics, the method comprising:
   (a) acquiring, by inputting into a processing device or storing in a memory, a set comprising a plurality of image points, wherein the processing device comprises the memory and a processor;
   (b) wherein each image point comprises a coordinate in an N-dimensional image space, wherein N is greater than or equal to 1;
   and wherein each image point further comprises a paint status of "unpainted" or "painted";
   and wherein each image point with "unpainted" paint status further comprises a first color;
   and wherein each image point with "painted" paint status further comprises a second color or a "segment affiliation", wherein the "segment affiliation" is a group identifier stored digitally in the memory;
   (c) performing, on the processor, at least one "iteration of reference colors", wherein each of the at least one "iteration of reference colors" comprises:
      (i) performing a list iteration through at least one "reference color", wherein the list iteration through at least one "reference color" comprises iterating through a monotonically-decreasing sequence of colors, wherein monotonically-decreasing is according to at least one user-selected or computer-selected color ordering;
      (ii) performing, for at least one "current reference color" encountered in the iteration through at least one "reference color", at least one "image point alteration";
   (d) wherein each of the at least one "image point alteration" comprises altering each of at least one first image point which has "unpainted" paint status and whose first color meets this criterion: greater than—or greater than or equal to—the "current reference color" in the list iteration through at least one "reference color", wherein greater than—or greater than or equal to—is as according to at least one user-selected or computer-selected color ordering;
   (e) wherein altering each of at least one first image point comprises changing, in the memory, each of the at least one first image point by:
      changing each of the at least one first image point's paint status from "unpainted" to "painted",
      and setting each of the at least one first image point's second color or "segment affiliation" equal to, or equal to a function of, a second image point's second color or "segment affiliation"; and
   (f) wherein a total number of unique "reference colors", is at least two.

2. The method of claim 1, further comprising: performing, on the processor, an alteration of at least one image point property for at least one image point, wherein the alteration of at least one image point property for at least one image point comprises a use of a cursor or a GUI element or an input device by a user, wherein each of the at least one image point property is first color or second color or segment affiliation or paint status.

3. The method of claim 1, wherein the total number of unique "reference colors", is at least three.

4. The method of claim 3, further comprising: performing, on the processor, an alteration of at least one image point property for at least one image point, wherein the alteration of at least one image point property for at least one image point comprises a use of a cursor or a GUI element or an input device by a user, wherein each of the at least one image point property is first color or second color or segment affiliation or paint status.

5. A system for digitally coloring or segmenting comics art, animation art, line art, digital art, or digital graphics, comprising:
   (a) a processing device and a memory configured to acquire, by way of an input interface, a set comprising a plurality of image points, wherein the processing device comprises the memory and a processor;
   (b) wherein each image point comprises a coordinate in an N-dimensional image space, wherein N is greater than or equal to 1;

and wherein each image point further comprises a paint status of "unpainted" or "painted";

and wherein each image point with "unpainted" paint status further comprises a first color;

and wherein each image point with "painted" paint status further comprises a second color or a "segment affiliation", wherein the "segment affiliation" is a group identifier stored digitally in the memory;

(c) wherein the processor is configured to perform at least one "iteration of reference colors", wherein each of the at least one "iteration of reference colors" comprises:

(i) performing a list iteration through at least one "reference color", wherein the list iteration through at least one "reference color" comprises iterating through a monotonically-decreasing sequence of colors, wherein monotonically-decreasing is according to at least one user-selected or computer-selected color ordering;

(ii) performing, for at least one "current reference color" encountered in the iteration through at least one "reference color", at least one "image point alteration";

(d) wherein each of the at least one "image point alteration" comprises altering each of at least one first image point which has "unpainted" paint status and whose first color meets this criterion: greater than—or greater than or equal to—the "current reference color" in the list iteration through at least one "reference color", wherein greater than—or greater than or equal to—is as according to at least one user-selected or computer-selected color ordering;

(e) wherein altering each of at least one first image point comprises changing, in the memory, each of the at least one first image point by:

changing each of the at least one first image point's paint status from "unpainted" to "painted", and setting each of the at least one first image point's second color or "segment affiliation" equal to, or equal to a function of, a second image point's second color or "segment affiliation"; and (f) wherein a total number of unique "reference colors", is at least two.

6. The system of claim 5, wherein the processor is further configured to perform an alteration of at least one image point property for at least one image point, wherein the alteration of at least one image point property for at least one image point comprises a use of a cursor or a GUI element or an input device by a user, wherein each of the at least one image point property is first color or second color or segment affiliation or paint status.

7. The system of claim 5, wherein the total number of unique "reference colors", is at least three.

8. The system of claim 7, wherein the processor is further configured to perform an alteration of at least one image point property for at least one image point, wherein the alteration of at least one image point property for at least one image point comprises a use of a cursor or a GUI element or an input device by a user, wherein each of the at least one image point property is first color or second color or segment affiliation or paint status.

9. A non-transitory computer-readable storage device storing instructions that when executed by a computer cause the computer to perform a method for digitally coloring or segmenting comics art, animation art, line art, digital art, or digital graphics, the method comprising:

(a) acquiring, by inputting into a processing device or storing in a memory, a set comprising a plurality of image points, wherein the processing device comprises the memory and a processor;

(b) wherein each image point comprises a coordinate in an N-dimensional image space, wherein N is greater than or equal to 1;

and wherein each image point further comprises a paint status of "unpainted" or "painted";

and wherein each image point with "unpainted" paint status further comprises a first color;

and wherein each image point with "painted" paint status further comprises a second color or a "segment affiliation", wherein the "segment affiliation" is a group identifier stored digitally in the memory;

(c) performing, on the processor, at least one "iteration of reference colors", wherein each of the at least one "iteration of reference colors" comprises:

(i) performing a list iteration through at least one "reference color", wherein the list iteration through at least one "reference color" comprises iterating through a monotonically-decreasing sequence of colors, wherein monotonically-decreasing is according to at least one user-selected or computer-selected color ordering;

(ii) performing, for at least one "current reference color" encountered in the iteration through at least one "reference color", at least one "image point alteration";

(d) wherein each of the at least one "image point alteration" comprises altering each of at least one first image point which has "unpainted" paint status and whose first color meets this criterion: greater than—or greater than or equal to—the "current reference color" in the list iteration through at least one "reference color", wherein greater than—or greater than or equal to—is as according to at least one user-selected or computer-selected color ordering;

(e) wherein altering each of at least one first image point comprises changing, in the memory, each of the at least one first image point by:

changing each of the at least one first image point's paint status from "unpainted" to "painted", and setting each of the at least one first image point's second color or "segment affiliation" equal to, or equal to a function of, a second image point's second color or "segment affiliation"; and (f) wherein a total number of unique "reference colors", is at least two.

10. The computer-readable storage device of claim 9, the method further comprising: performing, on the processor, an alteration of at least one image point property for at least one image point, wherein the alteration of at least one image point property for at least one image point comprises a use of a cursor or a GUI element or an input device by a user, wherein each of the at least one image point property is first color or second color or segment affiliation or paint status.

11. The computer-readable storage device of claim 9, wherein the total number of unique "reference colors", is at least three.

12. The computer-readable storage device of claim 11, the method further comprising: performing, on the processor, an alteration of at least one image point property for at least one image point, wherein the alteration of at least one image point property for at least one image point comprises a use of a cursor or a GUI element or an input device by a user, wherein each of the at least one image point property is first color or second color or segment affiliation or paint status.

\* \* \* \* \*